United States Patent
Tian et al.

(10) Patent No.: US 9,942,558 B2
(45) Date of Patent: Apr. 10, 2018

(54) INTER-LAYER DEPENDENCY INFORMATION FOR 3DV

(75) Inventors: Dong Tian, Plainsboro, NJ (US); Wang Lin Lai, Princeton, NJ (US)

(73) Assignee: THOMSON Licensing, Issy-les-Moulineaux (FR)

( * ) Notice: Subject to any disclaimer, the term of this patent is extended or adjusted under 35 U.S.C. 154(b) by 1123 days.

(21) Appl. No.: 13/318,418

(22) PCT Filed: Apr. 30, 2010

(86) PCT No.: PCT/US2010/001292
§ 371 (c)(1),
(2), (4) Date: Nov. 1, 2011

(87) PCT Pub. No.: WO2010/126613
PCT Pub. Date: Nov. 4, 2010

(65) Prior Publication Data
US 2012/0056981 A1    Mar. 8, 2012

Related U.S. Application Data

(60) Provisional application No. 61/215,154, filed on May 1, 2009, provisional application No. 61/215,874, filed
(Continued)

(51) Int. Cl.
*H04N 19/30* (2014.01)
*H04N 19/597* (2014.01)
*H04N 19/70* (2014.01)

(52) U.S. Cl.
CPC .......... *H04N 19/30* (2014.11); *H04N 19/597* (2014.11); *H04N 19/70* (2014.11)

(58) Field of Classification Search
CPC ....... H04N 19/30; H04N 19/597; H04N 19/70
(Continued)

(56) References Cited

U.S. PATENT DOCUMENTS

| 5,327,509 A | 7/1994 | Rich |
| 5,892,554 A | 4/1999 | DiCicco et al. |

(Continued)

FOREIGN PATENT DOCUMENTS

| CA | 2257533 | 9/2005 |
| CA | 2557533 | 9/2005 |

(Continued)

OTHER PUBLICATIONS

Tian et al., "View Synthesis Techniques for 3D Video", Applications of Digital Image Processing XXXII, Proceedings of SPIE, vol. 7443, 2009, Jun. 17, 2010, pp. 1-11.

(Continued)

*Primary Examiner* — Anner N Holder
(74) *Attorney, Agent, or Firm* — Brian J. Dorini; Xiaoan Lu

(57) ABSTRACT

Various implementations are directed to providing inter-layer dependency information. In one implementation, syntax elements are generated that indicate an inter-layer dependency structure among three-dimensional video (3DV) layers. Based on the inter-layer dependency structure, an inter-layer reference is identified for a picture from a layer of the 3DV layers. The picture is encoded based, at least in part, on the inter-layer reference. Corresponding decoding implementations are also provided. Additionally, in another implementation, a transmission priority and an indication of network congestion are used to determine whether to transmit data for a particular 3DV layer. The transmission priority is based on an inter-layer dependency structure among multiple 3DV layers. Another implementation is directed to a network abstraction layer unit that can explicitly identify and convey inter-layer references and corresponding dependencies.

27 Claims, 32 Drawing Sheets

Related U.S. Application Data on May 11, 2009, provisional application No. 61/310,497, filed on Mar. 4, 2010.

(58) Field of Classification Search
USPC .......................................................... 348/72
See application file for complete search history.

(56) References Cited

U.S. PATENT DOCUMENTS

| | | | |
|---|---|---|---|
| 7,058,027 B1* | 6/2006 | Alessi et al. ............... | 370/310.1 |
| 7,671,894 B2 | 3/2010 | Yea et al. | |
| 8,345,751 B2 | 1/2013 | Gunnewiek et al. | |
| 8,406,525 B2 | 3/2013 | Ma et al. | |
| 8,571,113 B2 | 10/2013 | Jeon et al. | |
| 8,854,428 B2 | 10/2014 | Suh et al. | |
| 2002/0027617 A1 | 3/2002 | Jeffers et al. | |
| 2002/0076080 A1 | 6/2002 | Hecht et al. | |
| 2002/0176025 A1 | 11/2002 | Kim et al. | |
| 2004/0119709 A1 | 6/2004 | Strom et al. | |
| 2005/0094726 A1 | 5/2005 | Park | |
| 2006/0146143 A1 | 7/2006 | Xin et al. | |
| 2006/0233239 A1* | 10/2006 | Sethi et al. ............... | 375/240.03 |
| 2007/0005795 A1 | 1/2007 | Gonzalez | |
| 2007/0024614 A1 | 2/2007 | Tam et al. | |
| 2007/0030356 A1 | 2/2007 | Yea et al. | |
| 2007/0041442 A1 | 2/2007 | Novelo | |
| 2007/0109409 A1 | 5/2007 | Yea et al. | |
| 2007/0121722 A1 | 5/2007 | Martinian et al. | |
| 2008/0117985 A1 | 5/2008 | Chen et al. | |
| 2008/0253671 A1 | 10/2008 | Choi et al. | |
| 2010/0020871 A1 | 1/2010 | Hannuksela et al. | |
| 2010/0020884 A1* | 1/2010 | Pandit .................. | H04N 19/597 |
| | | | 375/240.25 |
| 2010/0034260 A1 | 2/2010 | Shimizu et al. | |
| 2010/0046635 A1 | 2/2010 | Pandit et al. | |
| 2010/0091881 A1 | 4/2010 | Pandit et al. | |
| 2010/0118942 A1 | 5/2010 | Pandit et al. | |
| 2010/0165077 A1 | 7/2010 | Yin et al. | |
| 2010/0195716 A1 | 8/2010 | Klein Gunnewiek et al. | |
| 2010/0202535 A1 | 8/2010 | Fang et al. | |
| 2010/0226444 A1 | 9/2010 | Thevathasan et al. | |
| 2010/0231689 A1 | 9/2010 | Bruls et al. | |
| 2010/0284466 A1 | 11/2010 | Pandit et al. | |
| 2011/0064302 A1 | 3/2011 | Ma et al. | |
| 2011/0122131 A1 | 5/2011 | Bruls et al. | |
| 2011/0122230 A1 | 5/2011 | Boisson et al. | |
| 2011/0142289 A1 | 6/2011 | Barenbrug et al. | |
| 2011/0149037 A1 | 6/2011 | Van Der Horst et al. | |
| 2011/0211128 A1 | 9/2011 | Petrides | |
| 2011/0261050 A1 | 10/2011 | Smolic et al. | |
| 2011/0291988 A1 | 12/2011 | Bamji et al. | |
| 2012/0007948 A1 | 1/2012 | Suh et al. | |
| 2012/0007951 A1 | 1/2012 | Fogel | |
| 2012/0044322 A1 | 2/2012 | Tian et al. | |
| 2012/0050475 A1 | 3/2012 | Tian et al. | |
| 2012/0056981 A1 | 3/2012 | Tian et al. | |
| 2013/0033586 A1 | 2/2013 | Hulyalkar | |
| 2013/0162773 A1 | 6/2013 | Tian et al. | |
| 2013/0162774 A1 | 6/2013 | Tian et al. | |
| 2013/0176394 A1 | 7/2013 | Tian et al. | |

FOREIGN PATENT DOCUMENTS

| | | | |
|---|---|---|---|
| CN | 101166282 | 4/2008 | |
| CN | 101242530 | 8/2008 | |
| CN | 101292538 | 10/2008 | |
| CN | 101309411 | 11/2008 | |
| CN | 101415114 | 4/2009 | |
| EP | 172709 | 11/2006 | |
| EP | 1806930 | 7/2007 | |
| EP | 2197217 | 6/2010 | |
| EP | 2464122 | 6/2012 | |
| FR | WO 2010/010077 * | 1/2010 | ............... H04N 7/26 |
| JP | 9-27969 A | 1/1997 | |
| JP | 2005130428 | 5/2005 | |
| JP | 2008022549 | 1/2008 | |
| JP | 2008172749 | 7/2008 | |
| JP | 2009513074 | 3/2009 | |
| JP | 2009532931 | 9/2009 | |
| JP | 2010531604 | 9/2010 | |
| NL | WO 2006/137000 * | 12/2006 | ............... G06T 1/00 |
| WO | WO2005083636 | 9/2005 | |
| WO | WO2007047736 | 4/2007 | |
| WO | WO2007080223 | 7/2007 | |
| WO | WO2007081189 | 7/2007 | |
| WO | WO2007081926 | 7/2007 | |
| WO | WO2007114609 | 10/2007 | |
| WO | WO2007126511 | 11/2007 | |
| WO | WO2008047316 | 4/2008 | |
| WO | WO-2008051381 | 5/2008 | |
| WO | WO2008054100 | 5/2008 | |
| WO | WO2008133455 | 11/2008 | |
| WO | WO2008156318 | 12/2008 | |
| WO | WO-2009001255 | 12/2008 | |
| WO | WO2009130561 | 10/2009 | |
| WO | WO2010010077 | 1/2010 | |
| WO | WO2010096189 | 8/2010 | |
| WO | WO2010126608 | 11/2010 | |
| WO | WO2010126612 | 11/2010 | |
| WO | WO2010126613 | 11/2010 | |

OTHER PUBLICATIONS

Lopez et al., "3DV EE3 results on lovebird1 and leavinglaptop sequence," MPEG Meeting Oct. 13-17, 2008, Busan, ISO/IEC JTC1/SC29/WG11, No. M15802, 8 pages, Oct. 9, 2008.

Kerbiriou et al., "Looking for an Adequate Quality Criterion for Depth Coding", SPIE (Proceedings of), Jun. 17, 2010, pp. 1-11.

Series H: Audiovisual and Multimedia Systems Infrastructure of audiovisual services—Coding of moving video, Advanced video coding for generic audiovisual services, ITU-T (Telecommunication Standardization Sector of ITU, H.264, (Mar. 2009), pp. 1-664.

Office Action for related U.S. Appl. No. 13/138,956 dated Jan. 26, 2015.

Office Action for related U.S. Appl. No. 13/138,956 dated Jul. 2, 2014.

Office Action for related U.S. Appl. No. 13/318,412 dated Dec. 27, 2014.

Office Action for U.S. Appl. No. 13/318,412 dated Mar. 27, 2014.

International Search Report for PCT/US2010/001291 dated Nov. 30, 2010.

Office Action for U.S. Appl. No. 13/318,418 dated Dec. 24, 2014.

International Search Report for PCT/US2010/001292 dated Oct. 22, 2010.

International Search Report for PCT/US2011/049877 dated Nov. 4, 2011.

International Search Report for PCT/US2011/049881 dated Nov. 3, 2011.

International Search Report for PCT/US2011/049886 dated Nov. 3, 2011.

International Search Report for PCT/US2010/001286 dated Nov. 18, 2010.

Marpe, Detlev, et.al., "The H. 264/MPEG4 advanced video coding standard and its applications." Communications Magazine, IEEE 44.8 (2006): 134-143.

Mahmoudi, Mona, and Guillermo Sapiro. Sparse representations for three-dimensional range data restoration. No. IMA-Preprint-SER-2280. Minnesota Univ Minneapolis Inst for Mathematics and Its Applications, 2009.

U.S. Office Action for Related U.S. Appl. No. 13/822,031 dated Jun. 3, 2015.

CN Search Report for CN Appln No. 2010800296072 dated Mar. 26, 2014.

CN Search Report for corresponding CN Appln No. 2010800298716 dated Jan. 17, 2014.

CN Search Report for Corresponding Appln No. 2010800296161 dated Mar. 14, 2014.

CN Search Report for Corresponding Appl No. 2010800296161 dated Dec. 5, 2014.

(56) References Cited

OTHER PUBLICATIONS

Final Office Action for Related U.S. Appl. No. 13/822,031 dated Jan. 15, 2016.
Notice of Grant for Related U.S. Appl. No. 13,822,064 dated Apr. 27, 2015.
Bruls et al., "Philips 3DV EE1,2,3,4 Results", ISO/IEC JTC1/SC29/WG11, Coding of Moving Pictures and Audio, Lausanne Switzerland, Feb. 2009, pp. 1-17.
Chen et al., "WD 4 Reference Software for MVC, Section MVC Software Manual", 29, JVT Meeting, Nov. 19, 2008, Geneva, Switzerland, pp. 1-26.
Chen et al., "Operation Point and View Dependency Change SEI Messages for MVC", JVT of ISO/IEC MPEG & ITU-T VCEG, Document: JVT-W038, San Jose, California, Apr. 21-27, 2007.
Pandit et al., "H.264/AVC Extension for MVC Using SEI Message", JVT of ISO/IEC MPEG & ITU-T VCEG, Docment: JVT-X061, Geneva Switzerland, Jun. 29-Jul. 6, 2007, pp. 1-14.
Chen et al., On MVC Reference Picture List Construction, JVT of ISO/IEC MPEG & ITU-T VCEG, Document: JVT-V043, Marrakech, Morocco, Jan. 13-19, 2007.
Oh et al., "H.264-Based Depth Map Sequence Coding Using Motion Informatin of Corresponding Texture Video", Advances in Image ad Video Technology Lecture Notes in Computer Science, LNCS, Berlin, DE, Jan. 1, 2006, pp. 898-907.
Fehn et al., "Study of Some MPEG Tools Related to 3-D Video", ISO/IEC JTC1/SC29/WG11, MPEG02/M8423, Fairfax, May 2002.
Merkle et al., "Efficient Compression of Multi-view Depth Data Based on MVC", 3DTV Conference 2007, IEEE, PI, May 1, 2007, pp. 1-4.
Bruls et al., "Options for a New Efficient, Compatible, Flexible 3D Standard", Image Processing (ICIP), 2009, 16th IEEE International Conference, Nov. 7, 2009, pp. 3497-3500.
Huo et al., "A Flexible Reference Picture Selection Method for Spatial Direct Mode in Multview Video Coding", 2008 Congress on Image and Signal Processing, IEEE Explore, 2008, pp. 268-272.
Sullivan et al., Editors' Draft Revision to ITU-T Rec. H.264/ISO/IEC 14496-10 Advanced Video Coding—In Preparation for ITU-T SG 16 AAP Consent (In Integrated Form), JTV of ISO/IEC MPEG & ITU-T VCEG, Document: JVT-AA007, Geneva, CH, Jan. 29-Feb. 3, 2009.
ISO/IEC 23002-3 International Standard, Information Technology—MPEG Video Technologies—Part 3: Representation of Auxiliary Video and Supplemental Information, First Edition, Oct. 15, 2007.
Yip et al.: "Joining Source and Channel Coding for H.264 Compliant Stereoscopic Video Transmission", 2005 IEEE, CCECE/CCGEI, Saskatoon, May 2005.
Morvan et al.: "System Architecture for Free-Viewpoint Video and 3D-TV", 2008 IEEE, Apr. 15, 2008, p. 925-932.
Morvan et al.: "Design Considerations for 3D-TV Video Architecture" 2008 IEEE.
Shimizu et al.: A Backward Compatible 3D Scene Coding Uswing Residual Prediction, ICASSP 2008.
Grewatch S et al; "Sharing of motion vectors in 3D video coding" Image Processing, Oct. 24, 2004, vol. 5, pp. 3271-3274.
Bruls_et al: Proposal to Amendment MPEG-C Part 3, Coding of Moving Pictures and Audio, Jul. 2007, Lausanne.
International Search Report dated Oct. 22, 2010.
ISO/IEC 23002-3 International Standard, Information Technology—MPEG Video Technologies—Part 3: Representation of Auxiliary Video and Supplemental Information, Committee Draft, Jan. 19, 2007, 32 Pages.
Ho et al., "Overview of Mutliview Video Coding," Gwangju Institute of Science and Technology (GIST), Jun. 27-30, 2007, pp. 5-12.
Shimizu et al. "Free Viewpoint Scalable Multiview Video Coding Using Panoramic Mosaic Depth Maps," NTT Cyber Space Laboratories, NTT Corp., Japan, Aug. 2008, pp. 1141-1144.

\* cited by examiner

US 9,942,558 B2

INTER-LAYER DEPENDENCY INFORMATION FOR 3DV

CROSS-REFERENCE TO RELATED APPLICATIONS

This application claims the benefit, under 35 U.S.C. § 365 of International Application PCT/US2010/01292, filed 30 Apr. 2010, which was published in accordance with PCT Article 21(2) on 04 Nov. 2010 in English and which claims the benefit of the filing date of U.S. Provisional Application Ser. No. 61/215,154 filed on May 1, 2009, entitled "3D Video Coding Formats," the filing date of U.S. Provisional Application Ser. No. 61/215,874 filed on May 11, 2009, entitled "Reference Pictures for 3D Video," and the filing date of U.S. Provisional Application Ser. No. 61/310,497, filed on Mar. 4, 2010, entitled "Extended SPS for 3DV sequences," the contents of each of which are hereby incorporated by reference in their entirety for all purposes.

TECHNICAL FIELD

Implementations are described that relate to coding systems. Various particular implementations relate to three-dimensional (3D) video coding schemes.

BACKGROUND

To facilitate new video applications, such as three-dimensional television (3DTV) and free-viewpoint video (FVV), 3D Video (3DV) data formats comprising both conventional 2D video and depth maps can be utilized such that additional views can be rendered at the user end. Examples of such 3DV formats include 2D plus depth (2D+Z), which includes a two-dimensional (2D) video and its corresponding depth map, and Layered Depth Video (LDV), which includes 2D+Z and an occlusion video plus an occlusion depth. Other examples of such 3DV formats include Multiview plus Depth (MVD) and Disparity Enhanced Stereo (DES). MVD is an extension of 2D+Z, as it includes multiple 2D+Z from different viewpoints. In turn, DES is composed of two LDVs from two different view points. Another example 3DV format is Layer Depth Video plus Right View (LDV+R) which is composed of one LDV of a left view and the 2D video of the right view. How to convey (encode and transmit) the data in all these formats is a challenging issue, as different components are used jointly at the user end to decode 3DV content.

SUMMARY

According to a general aspect, syntax elements are generated that indicate an inter-layer dependency structure among three-dimensional video (3DV) layers. Based on the inter-layer dependency structure, an inter-layer reference is identified for a picture from a layer of the 3DV layers. The picture is encoded based, at least in part, on the inter-layer reference.

According to another general aspect, a video signal or video signal structure includes one or more syntax portions for syntax elements that indicate an inter-layer dependency structure among three-dimensional video (3DV) layers. The video signal or video signal structure also includes one or more picture portions for an encoded picture that is encoded based, at least in part, on an inter-layer reference from the inter-layer dependency structure. The encoded picture and the syntax elements are provided for use in decoding the encoded picture.

According to another general aspect, an encoded picture is accessed from a bitstream. The picture describes three-dimensional video (3DV) information for a particular 3DV layer, from a given view, at a given time. Syntax elements are accessed that indicate an inter-layer dependency structure for a set of 3DV layers that includes the particular 3DV layer. The encoded picture is decoded based, at least in part, on the inter-layer dependency structure.

According to another general aspect, a transmission priority is accessed for a particular three-dimensional video (3DV) layer of multiple 3DV layers. The transmission priority is based on an inter-layer dependency structure among the multiple 3DV layers. It is determined whether to transmit encoded data belonging to the particular 3DV layer. The determination of whether to transmit is based on the transmission priority for the particular 3DV layer and based on an indication of network congestion.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

As understood in the art, a basic tenet of 3D Video (3DV) is typically to provide different views of a scene or an object to each eye of a user so that a user is able to perceive depth of the scene or object. Additionally, to enhance a user experience, a virtual view other than the views being transmitted may be rendered, for example, to adjust the baseline distance for a different perceived depth range. To achieve one or more of these goals, as noted above, 3D Video (3DV) representation formats may include various layers, such as video, depth, and perhaps more supplemental information, such as 2D+Z (MVD) and LDV (DES). To better illustrate the concept of depth and other supplemental information for 3DV content, reference is made to FIGS. 1 and 2.

Figure 1:
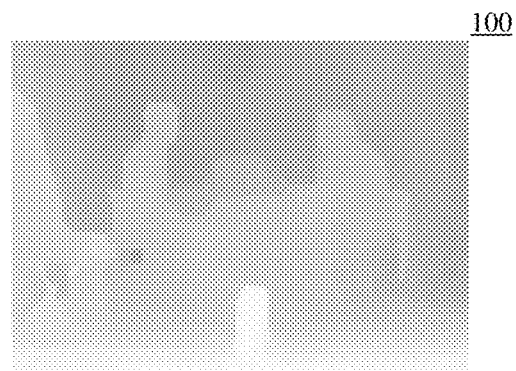
FIG. 1 is an example of a depth map.
Figure 2:
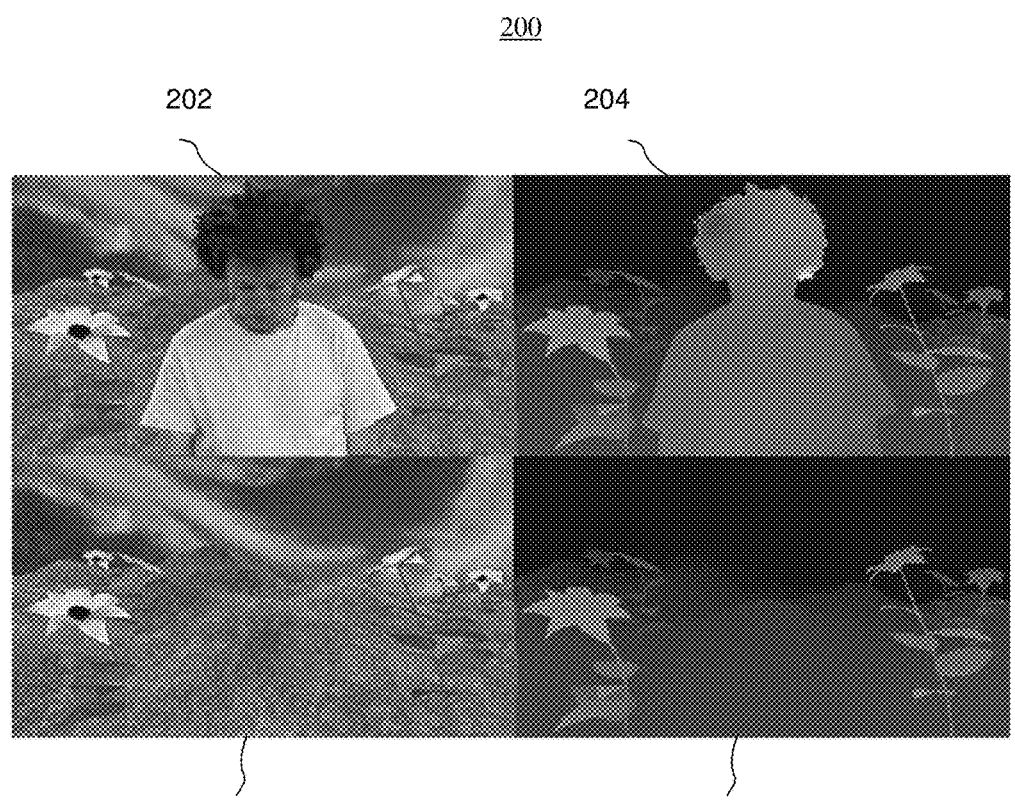
FIG. 2 is an example showing the four components of the LDV format.

FIG. 1 provides an example of a depth map 100 corresponding to a conventional video. In addition, FIG. 2 includes an example of the four components in the LDV format: 2D video 202 plus depth (Z) 204 and an occlusion video 206 for the same scene along with an occlusion depth 208. Encoding and transmission of the above-described data formats are challenging in many respects. For example, besides coding efficiency, functionalities such as synchronization and backward compatibility (for conventional monoscopic 2D video) should also preferably be provided so that a legacy Advanced Video Coding (AVC)/Multiview Coding (MVC) decoder can extract a viewable video from the bitstream.

One solution that can address at least some of these issues is simulcast, where each view and/or layer is encoded and transmitted independently. This approach may use multiple encoders and decoders to encode and decode the separate views/layers, respectively, and to synchronize the views/layers into a viewable image at the system level or application level. For example, Moving Picture Experts Group (MPEG)-C Part 3 (International Organization for Standardization (ISO)/International Electrotechnical Commission (IEC) 23002-3) specifies a system framework for 2D+Z. Typical implementations use synchronization at a system level between the video and depth. The video and depth can be coded using any existing video coding standard. However, in typical implementations the encoding of the video and depth are decoupled. Thus, the cost of simulcast is typically multiplied by the number of views and/or layers transmitted. Furthermore, because different views and/or layers are encoded separately, any redundancy among views and/or layers is typically not in any way exploited to achieve higher encoding efficiency.

In contrast, one or more implementations described herein may permit inter-layer coding to exploit redundancy between layers, and thereby to achieve higher encoding efficiency, in addition to backward compatibility of AVC/MVC systems. In particular, one or more implementations provide means to permit synchronization of views and/or layers at a coding level to attain at least some of these benefits. For example, in at least one implementation described herein, a novel 3DV prefix Network Abstraction Layer (NAL) unit and a novel 3DV NAL unit header extension on the NAL unit design of AVC are proposed to efficiently enable inter-layer coding and synchronization of views/layers. The high level syntax signals how the 3DV components can be extracted from bitstreams, such as AVC and Scalable Video Coding (SVC)/MVC bitstreams. Thus, this approach has the advantage in that there is no need for synchronization between different 3DV components at the system level, as the 3DV components can be coupled in the coded bitstream (such as SVC layers, or MVC views). Another potential benefit is that inter-layer or inter-view redundancy can be removed when encoded in this manner. Further, the novel NAL unit design can be compatible with MVC and can also permit compatibility with any future encapsulating coding techniques to achieve enhanced compression efficiency.

As discussed herein below, to enable synchronization for different views/layers at the coding level as opposed to the system level, one or more implementations associate 3DV NAL unit designs with a 3DV view identifier (ID) and a 3DV layer ID. Moreover, to better exploit inter-view/layer redundancy, inter-view/layer predictions are employed to provide higher coding efficiency as compared to AVC with interleaving methods. In addition, NAL unit designs for 3DV supplemental layers may achieve full backward compatibility while enabling the development of new coding modes/tools without affecting 2D view layer compatibility with MVC/AVC.

Various embodiments are directed to the configuration of a reference list to permit encoding and decoding of bitstreams including 3DV content by employing multiple-reference prediction. For example, for 3DV coding structures, there may be at least three possible types of reference pictures, including, for example: temporal reference pictures, inter-view reference pictures, and reference pictures from different 3DV layers. Reference pictures from different 3DV layers may include, for example, a 2D video layer used as reference for a depth layer. At least one embodiment described in this application provides the concept and implementation of how to arrange the three types of reference pictures in a reference picture list. For example, when encoding a macroblock (MB) in prediction mode, an encoder can signal which picture is, or pictures are, used as reference among multiple reference pictures that are available. Here, an index in the list can indicate which reference picture is used. As discussed further herein below, one or more embodiments can provide one or more inter-layer reference pictures in the list in order to enable inter-layer prediction.

As noted above, one or more embodiments provide many advantages, one of which is potential compatibility with MVC. That is, when a 3DV bitstream according to one of these embodiments is fed to a legacy MVC decoder, the 2D video (for example, specified as layer 0 below) can be decoded and outputted. To further aid compatibility with MVC while at the same time permitting efficient coding of 3DV content using a variety of layers, various embodiments are additionally directed to the construction and signaling of a sequence parameter set (SPS). As understood by those of skill in the technical field, an SPS can specify common properties shared between pictures of a sequence of pictures. Such common properties may include, for example, picture size, optional coding modes employed, and a macroblock to slice group map, each of which may optionally be shared between pictures in a sequence. For at least one embodiment, an extension of SPS is employed to signal novel sequence parameters that are used for encoding and decoding 3DV content. Moreover, a separate and novel NAL unit type can be utilized for the extended SPS. The extended SPS can be used by network devices, such as a router, to adapt the bitrate of 3DV content streaming, as discussed further herein below.

Prior to discussing embodiments in specific detail, some discussion of terms employed is provided to facilitate understanding of the concepts described.

Terminology:

A "2D video" layer is generally used herein to refer to the traditional video signal.

A "depth" layer is generally used herein to refer to data that indicates distance information for the scene objects. A "depth map" is a typical example of a depth layer.

An "occlusion video" layer is generally used herein to refer to video information that is occluded from a certain viewpoint. The occlusion video layer typically includes background information for the 2D video layer.

An "occlusion depth" layer is generally used herein to refer to depth information that is occluded from a certain viewpoint. The occlusion depth layer typically includes background information for the depth layer.

A "transparency" layer is generally used herein to refer to a picture that indicates depth discontinuities or depth boundaries. A typical transparency layer has binary information, with one of the two values indicating positions for which the depth has a discontinuity, with respect to neighboring depth values, greater than a particular threshold.

A "3DV view" is defined herein as a data set from one view position, which is different from the "view" used in MVC. For example, a 3DV view may include more data than the view in MVC. For the 2D+Z format, a 3DV view may include two layers: 2D video plus its depth map. For the LDV format, a 3DV view may include four layers: 2D video, depth map, occlusion video, and occlusion depth map. In addition, a transparency map can be another layer data type within a 3DV view, among others.

A "3DV layer" is defined as one of the layers of a 3DV view. Examples of 3DV layers are, for example, 2D view or video, depth, occlusion video, occlusion depth, and transparency map. Layers other than 2D view or video are also defined as "3DV supplemental layers". In one or more embodiments, a 3DV decoder can be configured to identify a layer and distinguish that layer from others using a 3dv_layer_id. In one implementation, 3dv_layer_id is defined as in the Table 1. However, it should be noted that the layers may be defined and identified in other ways, as understood by those of ordinary skill in the art in view of the teachings provided herein.

TABLE 1

3DV layers

| Value of 3dv_layer_id | Description |
| --- | --- |
| 0 | 2D video |
| 1 | Depth |
| 2 | Occlusion video |
| 3 | Occlusion depth |
| 4 | Transparency map |
| >=5 | Reserved |

Figure 3:
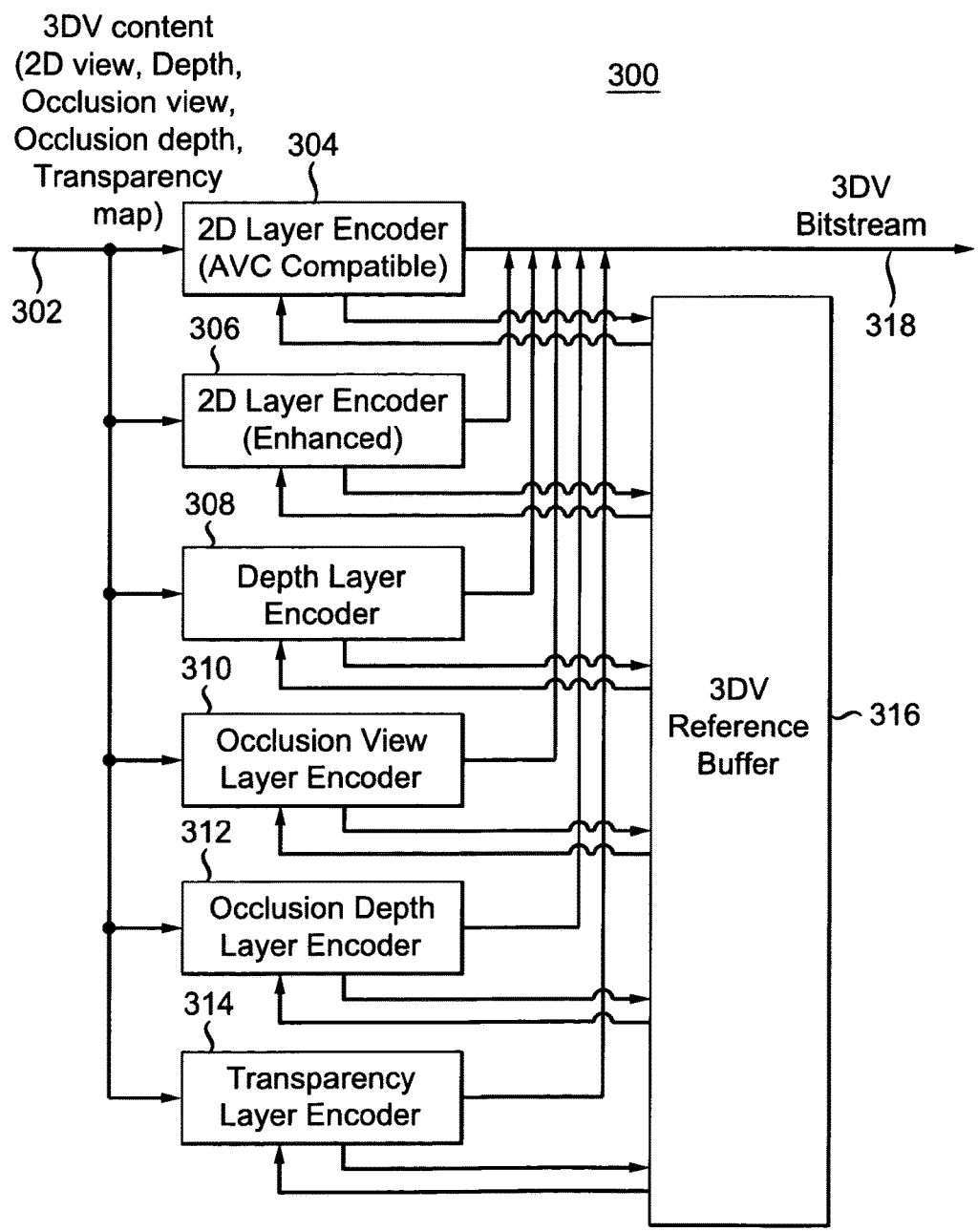
FIG. 3 is a block/flow diagram of an implementation of a 3DV encoder.
Figure 4:
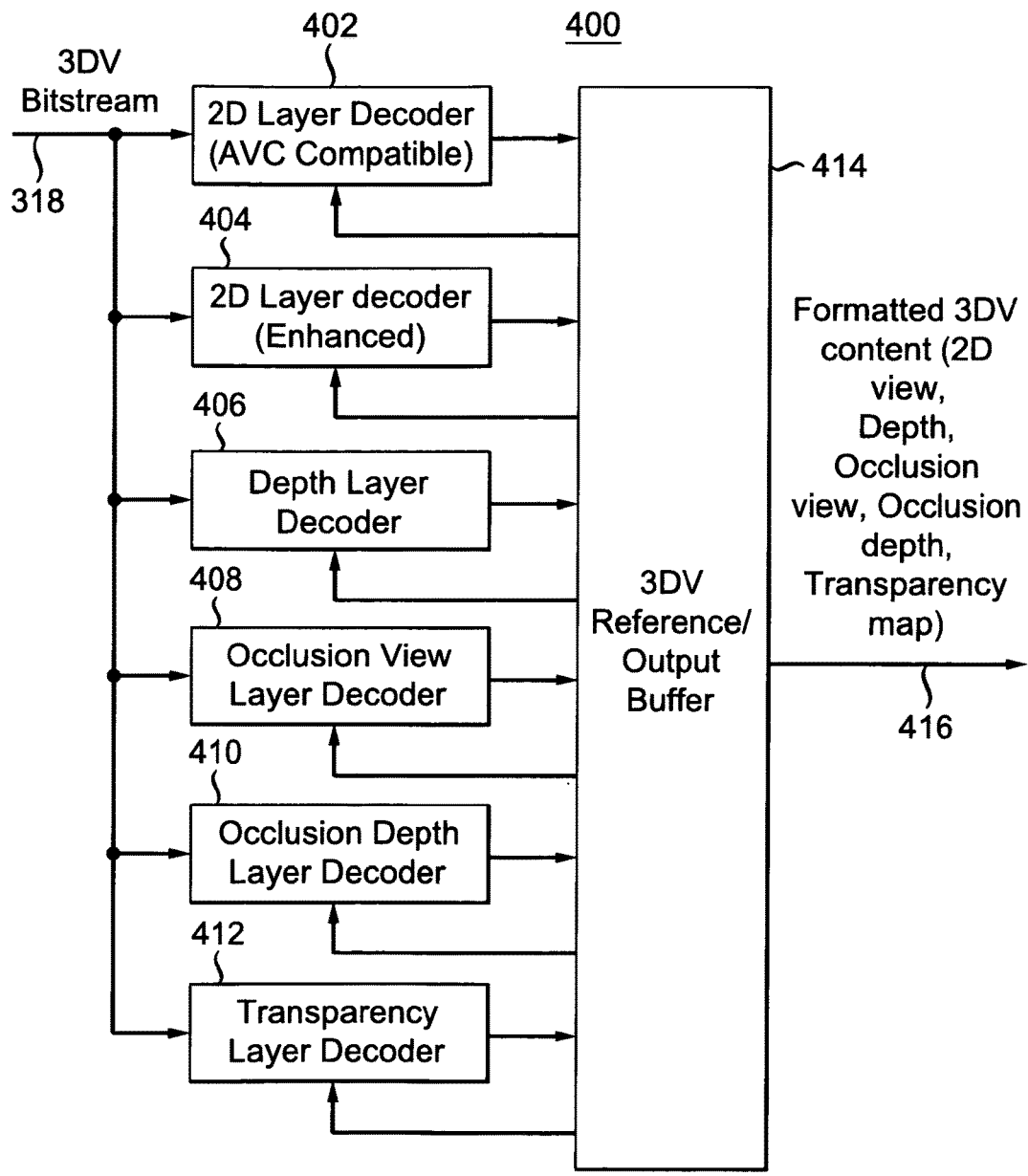
FIG. 4 is a block/flow diagram of an implementation of a 3DV decoder.

FIGS. 3 and 4 illustrate a high-level generic 3DV encoder 300 and decoder 400, respectively. The encoder 300/decoder 400 is composed of layer encoders/decoders and a 3DV reference buffer. For example, a 3DV content signal 302, which may include, for example, 2D view, depth, occlusion view, occlusion depth, and transparency map layers, is input to the various layer encoders as shown in FIG. 3. Specifically, the encoder system/apparatus 300 includes a 2D layer encoder 304 configured to encode 2D layers, which may be AVC compatible, an enhanced 2D layer encoder 306 configured to encode enhanced 2D layers, a depth layer encoder 308 configured to encode depth layers, an occlusion view layer encoder 310 configured to encode occlusion view layers, an occlusion depth layer encoder 312 configured to encode occlusion depth layers, and a transparency layer encoder 314 configured to encode transparency layers. Thus, each layer can be encoded using a different encoder and/or encoding technique.

An enhanced 2D layer is generally used herein to distinguish such a layer from a layer that is compatible with AVC, MVC, SVC, or some other underlying standard. For example, enhanced 2D layers are typically not compatible with MVC because such layers allow new coding tools, such as, for example, using inter-layer references. Such layers are, therefore, generally not backward compatible with MVC.

Note that the term "enhanced 2D layer" (or supplemental layer) may also be used to refer to layers that could be coded with MVC, but which would not be expected to be displayed and so are not typically described as being coded with MVC. For example, a series of depth layers could be treated by MVC as a series of pictures and could be coded by MVC. However, it is not typical to display depth layers, so it is often desirable to have a different way of identifying and coding such layers, other than by using MVC.

Each layer can also use a different reference. The reference may be from a different layer than the picture/block being encoded (decoded). The references from different layers may be obtained from a 3DV Reference Buffer 316 (3DV Reference/Output Buffer 414). As shown in FIG. 3, each layer encoder is in signal communication with the 3DV reference buffer 316 to permit various modes of encoding of the input signal 302 to generate an output signal 318.

By utilizing the 3DV Reference Buffer 316, each layer of the 3DV format can be encoded using references from its own layer, such as, for example, temporal references and/or inter-view references within the same layer with motion and/or disparity compensation, and/or using inter-layer prediction between the various layers. For example, an inter-layer prediction may reuse motion information, such as, for example, motion vector, reference index, etc., from another layer to encode the current layer, also referred to as motion skip mode. In this way, the output signal 318 may be interleaved with various layer information for one or more 3DV views. The inter-layer prediction may be of any kind of technique that is based on the access of the other layers.

With regard to the decoder system/apparatus 400, system 400 includes various layer decoders to which signal 318 may be input as shown in FIG. 4. In particular, the encoder system/apparatus 400 includes a 2D layer decoder 402, which may be AVC compatible, configured to decode 2D layers, an enhanced 2D layer decoder 404 configured to decode enhanced 2D layers, a depth layer decoder 406 configured to decode depth layers, an occlusion view layer decoder 408 configured to decode occlusion view layers, an occlusion depth layer decoder 410 configured to decode occlusion depth layers, and/or a transparency layer decoder 412 configured to decode transparency layers.

As illustrated in FIG. 4, each layer decoder is in signal communication with a 3DV reference/output buffer 414, which can be configured to parse decoded layer information received from the layer decoders and to determine how the layers included in the input signal fit into a structure that supports 3D processing. Such 3D processing may include, for example, coding of 3D layers as described herein or rendering (synthesizing) of additional pictures at a receiver or display unit. Rendering may use, for example, depth pictures to warp a 2D video and/or occlusion pictures to fill in holes of a rendered picture with background information In addition, the 3DV reference/output buffer 414 can be configured to generate an output signal 416 in a 3DV compatible format for presentation to a user. The formatted 3DV content signal 416 may, of course, include, for example, 2D view, depth, occlusion view, occlusion depth, and transparency map layers. The output buffer may be implemented together with the reference buffer, as shown in FIG. 4, or, alternatively in other embodiments, the reference and output buffers may be separated.

Other implementations of the encoder 300 and the decoder 400 may use more or fewer layers. Additionally, different layers than those shown may be used.

It should be clear that the term "buffer", as used in the 3DV Reference Buffer 316 and in the 3DV Reference/Output Buffer 414, is an intelligent buffer. Such buffers may be used, for example, to store pictures, to provide references (or portions of references), and to reorder pictures for output. Additionally, such buffers may be used, for example, to perform various other processing operations such as, for example, hypothetical reference decoder testing, processing of marking commands (for example, memory management control operations in AVC), and decoded picture buffer management.

Figure 5:
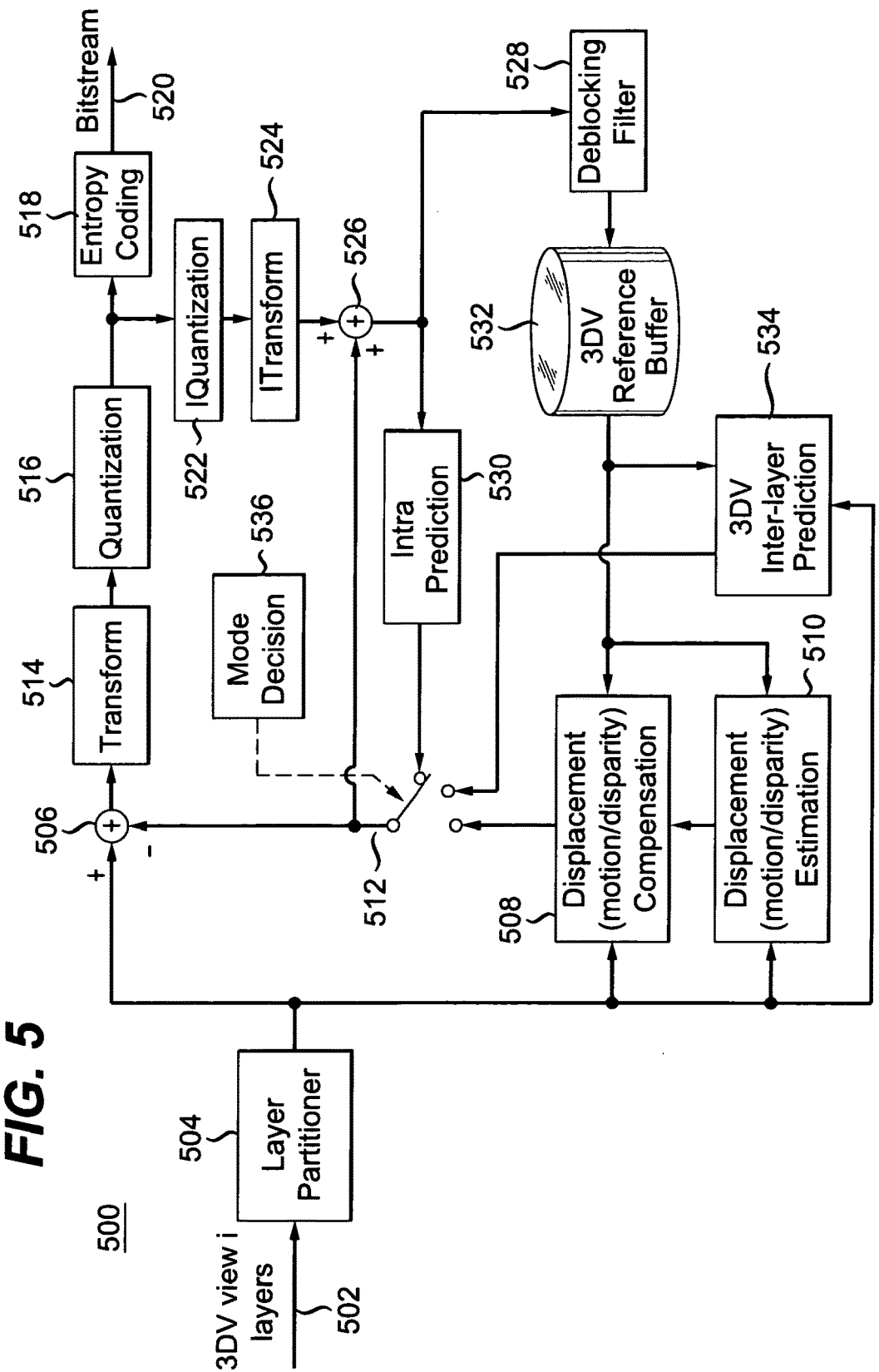
FIG. 5 is a block/flow diagram of an implementation of a 3DV layer encoder.
Figure 6:
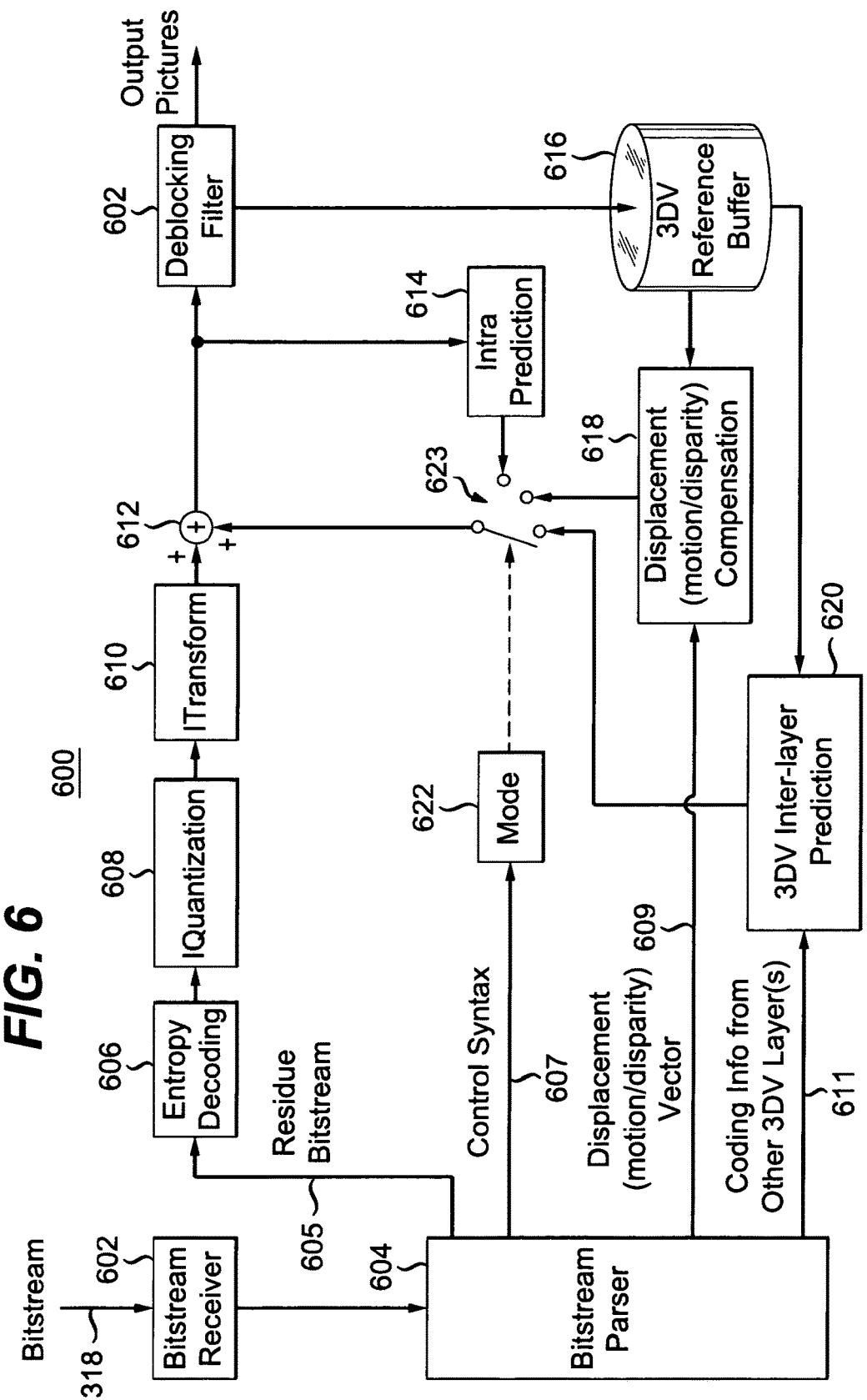
FIG. 6 is a block/flow diagram of an implementation of a 3DV layer decoder.

FIGS. 5 and 6 respectively depict high level block/flow diagrams of a general 3DV layer encoder 500 and decoder 600, respectively, that can be used to implement any one or more of layer encoders 304-314 and any one or more of layer decoders 402-412, respectfully. It is noted that each of the layer encoders 304-314 can be designed in the same general manner with respect to their corresponding layers, as, for example, depicted in FIG. 5, to favor particular purposes. Conversely, the layer encoders may be configured differently to better utilize their unique characteristics, as understood in view of the teachings provided herein. Similarly, decoders 402-412 can be designed in the same general manner with respect to their corresponding layers, as, for example, depicted in FIG. 6. Conversely, the layer decoders may be configured differently to better utilize their unique characteristics.

It should be noted that with regard to an MVC encoder, the input is composed of multiple views. Each view is a traditional 2D video. Thus, compared to an AVC encoder, the typical MVC encoder includes additional blocks such as a disparity estimation block, a disparity compensation block, and an inter-view reference buffer. Analogously, FIGS. 5 and 6 include blocks for 3DV references and inter-layer prediction. With a 3DV encoder, the input is composed of multiple 3D views. As stated above, each 3D view can comprise several layers. Accordingly, the encoding method for each layer can be designed differently to utilize their unique features. Consequently, a 3DV encoder can be divided into layer encoders, as shown in FIG. 3. However, the layer encoders may also be closely coupled. The techniques used in the layer encoders may be tailored as desired for a given system. Since each layer appears as a video signal, the layers can have a similar structure at a high level as shown in FIG. 5. It should be noted the layer encoders can be differently designed at lower, more specific levels. Of course, one embodiment may also use a single encoder configured to encode all layers.

With regard to the high level diagram illustrated in FIG. 5, 3DV layer encoder 500 may include a layer partitioner 504 configured to receive and partition 3DV view layers from each other for a 3DV view i within input signal 502. The partitioner 504 is in signal communication with an adder or combiner 506, with a displacement (motion/disparity) compensation module 508, and with a displacement (motion/disparity) estimation module 510, each of which receives a set of partitioned layers from partitioner 504. Another input to the adder 506 is one of a variety of possible reference picture information received through switch 512.

For example, if a mode decision module 536 in signal communication with the switch 512 determines that the encoding mode should be intra-prediction with reference to the same block or slice currently being encoded, then the adder receives its input from intra-prediction module 530. Alternatively, if the mode decision module 536 determines that the encoding mode should be displacement compensation and estimation with reference to a block or slice, of the same frame or 3DV view or 3DV layer currently being processed or of another previously processed frame or 3DV view or 3DV layer, that is different from the block or slice currently being encoded, then the adder receives its input from displacement compensation module 508, as shown in FIG. 5. Further, if the mode decision module 536 determines that the encoding mode should be 3DV inter-layer prediction with reference to a 3DV layer, of the same frame or 3DV view currently being processed or another previously processed frame or 3DV view, that is different from the layer currently being processed, then the adder receives its input from the 3DV inter-layer prediction module 534, which is in signal communication with 3DV Reference Buffer 532.

The adder 506 provides a signal including 3DV layer(s) and prediction, compensation, and/or estimation information to the transform module 514, which is configured to transform its input signal and provide the transformed signal to quantization module 516. The quantization module 516 is configured to perform quantization on its received signal and output the quantized information to an entropy encoder 518. The entropy encoder 518 is configured to perform entropy encoding on its input signal to generate bitstream 520. The inverse quantization module 522 is configured to receive the quantized signal from quantization module 516 and perform inverse quantization on the quantized signal. In turn, the inverse transform module 524 is configured to receive the inverse quantized signal from module 522 and perform an inverse transform on its received signal. Modules 522 and 524 recreate or reconstruct the signal output from adder 506.

The adder or combiner 526 adds (combines) signals received from the inverse transform module 524 and the switch 512 and outputs the resulting signals to intra prediction module 530 and deblocking filter 528. Further, the intra prediction module 530 performs intra-prediction, as discussed above, using its received signals. Similarly, the deblocking filter 528 filters the signals received from adder 526 and provides filtered signals to 3DV reference buffer 532.

The 3DV reference buffer 532, in turn, parses its received signal. The 3DV reference buffer 532 aids in inter-layer and displacement compensation/estimation encoding, as discussed above, by elements 534, 508, and 510. The 3DV reference buffer 532 provides, for example, all or part of various 3DV layers.

With reference again to FIG. 6, the 3DV layer decoder 600 can be configured to receive bitstream 318 using bitstream receiver 602, which in turn is in signal communication with bitstream parser 604 and provides the bitstream to parser 604. The bit stream parser 604 can be configured to transmit a residue bitstream 605 to entropy decoder 606, transmit control syntax elements 607 to mode selection module 622, transmit displacement (motion/disparity) vector information 609 to displacement compensation (motion/disparity) module 618 and transmit coding information 611 from 3DV layers other than the 3DV layer currently decoded to 3DV inter-layer prediction module 620. The inverse quantization module 608 can be configured to perform inverse quantization on an entropy decoded signal received from the entropy decoder 606. In addition, the inverse transform module 610 can be configured to perform an inverse transform on an inverse quantized signal received from inverse quantization module 608 and to output the inverse transformed signal to adder or combiner 612.

Adder 612 can receive one of a variety of other signals depending on the decoding mode employed. For example, the mode decision module 622 can determine whether 3DV inter-layer prediction, displacement compensation or intra prediction encoding was performed on the currently processed block by the encoder 500 by parsing and analyzing the control syntax elements 607. Depending on the determined mode, model selection control module 622 can access and control switch 623, based on the control syntax elements 607, so that the adder 612 can receive signals from the 3DV inter-layer prediction module 620, the displacement compensation module 618 or the intra prediction module 614.

Here, the intra prediction module 614 can be configured to, for example, perform intra prediction to decode a block or slice using references to the same block or slice currently being decoded. In turn, the displacement compensation module 618 can be configured to, for example, perform displacement compensation to decode a block or a slice using references to a block or slice, of the same frame or 3DV view or 3DV layer currently being processed or of another previously processed frame or 3DV View or 3DV layer, that is different from the block or slice currently being decoded. Further, the 3DV inter-layer prediction module 620 can be configured to, for example, perform 3DV inter-layer prediction to decode a block or slice using references to a 3DV layer, of the same frame or 3DV view currently processed or of another previously processed frame or 3DV view, that is different from the layer currently being processed.

After receiving prediction or compensation information signals, the adder 612 can add the prediction or compensation information signals with the inverse transformed signal for transmission to a deblocking filer 602. The deblocking filter 602 can be configured to filter its input signal and output decoded pictures. The adder 612 can also output the added signal to the intra prediction module 614 for use in intra prediction. Further, the deblocking filter 602 can transmit the filtered signal to the 3DV reference buffer 616. The 3DV reference buffer 316 can be configured to parse its received signal to permit and aid in inter-layer and displacement compensation decoding, as discussed above, by elements 618 and 620, to each of which the 3DV reference buffer 616 provides parsed signals. Such parsed signals may be, for example, all or part of various 3DV layers.

It should be understood that systems/apparatuses 300, 400, 500, and 600 can be configured differently and can include different elements as understood by those of ordinary skill in the art in view of the teachings disclosed herein.

Figure 7:
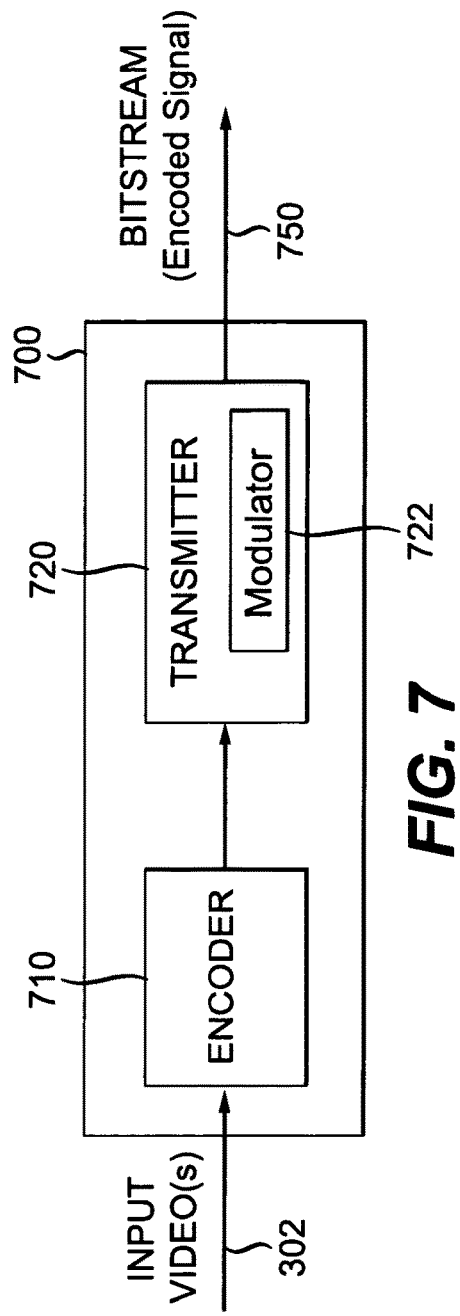
FIG. 7 is a block/flow diagram of an implementation of a video transmission system.

With reference now to FIG. 7, FIG. 7 illustrates a video transmission system/apparatus 700, to which aspects described herein may be applied, in accordance with an implementation. The video transmission system 700 may be, for example, a head-end or transmission system for transmitting a signal using any of a variety of media, such as, for example, satellite, cable, telephone-line, or terrestrial broadcast. The transmission may be provided over the Internet or some other network.

The video transmission system 700 is capable of generating and delivering, for example, video content and depth, along with other 3DV supplemental layers. This is achieved by generating an encoded signal(s) including 3DV supplemental layer information or information capable of being used to synthesize the 3DV supplemental layer information at a receiver end that may, for example, have a decoder.

The video transmission system 700 includes an encoder 710 and a transmitter 720 capable of transmitting the encoded signal. The encoder 710 receives video information and generates an encoded signal(s) based on the video information and/or 3DV layer information. The encoder 710 may be, for example, the encoder 300 described in detail above. The encoder 710 may include sub-modules, including for example an assembly unit for receiving and assembling various pieces of information into a structured format for storage or transmission. The various pieces of information may include, for example, coded or uncoded video, coded or uncoded depth information, and coded or uncoded elements such as, for example, motion vectors, coding mode indicators, and syntax elements.

The transmitter 720 may be, for example, adapted to transmit a program signal 750 having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using modulator 722. The transmitter 720 may include, or interface with, an antenna (not shown). Further, implementations of the transmitter 720 may include, or be limited to, a modulator.

Figure 8:
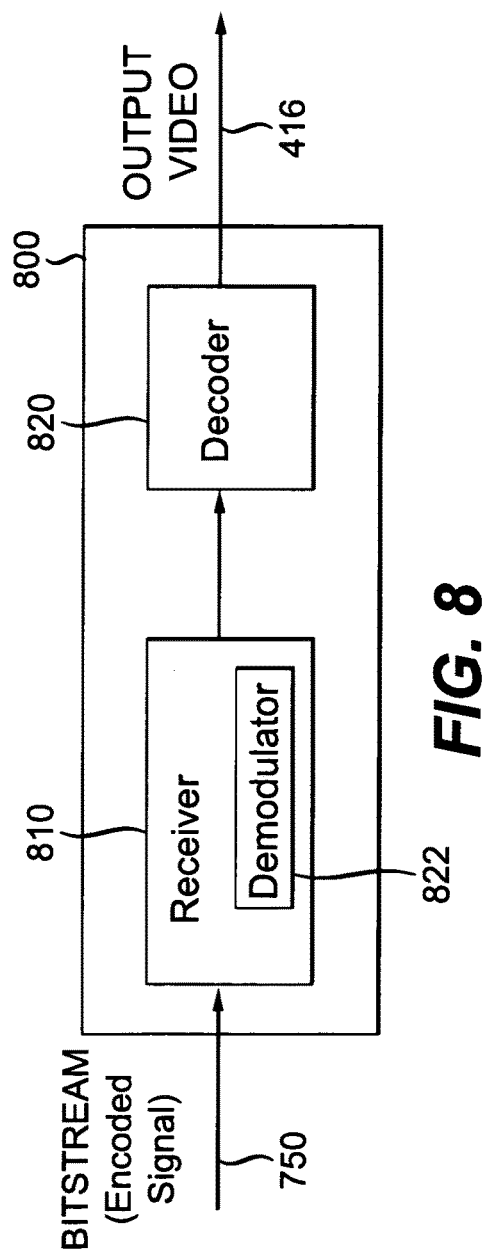
FIG. 8 is a block/flow diagram of an implementation of a video receiving system.

Referring to FIG. 8, FIG. 8 shows a video receiving system/apparatus 800 to which the aspects described herein may be applied, in accordance with an implementation. The video receiving system 800 may be configured to receive signals over a variety of media, such as, for example, satellite, cable, telephone-line, or terrestrial broadcast. The signals may be received over the Internet or some other network.

The video receiving system 800 may be, for example, a cell-phone, a computer, a set-top box, a television, or other device that receives encoded video and provides, for example, decoded video for display to a user or for storage. Thus, the video receiving system 800 may provide its output to, for example, a screen of a television, a computer monitor, a computer (for storage, processing, or display), or some other storage, processing, or display device.

The video receiving system 800 is capable of receiving and processing video content including video information. The video receiving system 800 includes a receiver 810 capable of receiving an encoded signal, such as for example the signals described in the implementations of this application, and a decoder 820 capable of decoding the received signal.

The receiver 810 may be, for example, adapted to receive a program signal having a plurality of bitstreams representing encoded pictures. Typical receivers perform functions such as, for example, one or more of receiving a modulated and encoded data signal, demodulating the data signal from one or more carriers using a demodulator 822, de-randomizing the energy in the signal, de-interleaving the data in the signal, and error-correction decoding the signal. The receiver 810 may include, or interface with, an antenna (not shown). Implementations of the receiver 810 may include, or be limited to, a demodulator.

The decoder 820 outputs video signals including video information and depth information. The decoder 820 may be, for example, the decoder 400 described in detail above.

The input to the system 700 is listed, in FIG. 7, as "input video(s)", and the output from the system 800 is listed, in FIG. 8, as "output video". It should be clear that, at least in these implementations, these refer to 3D videos that include multiple layers.

Figure 9:
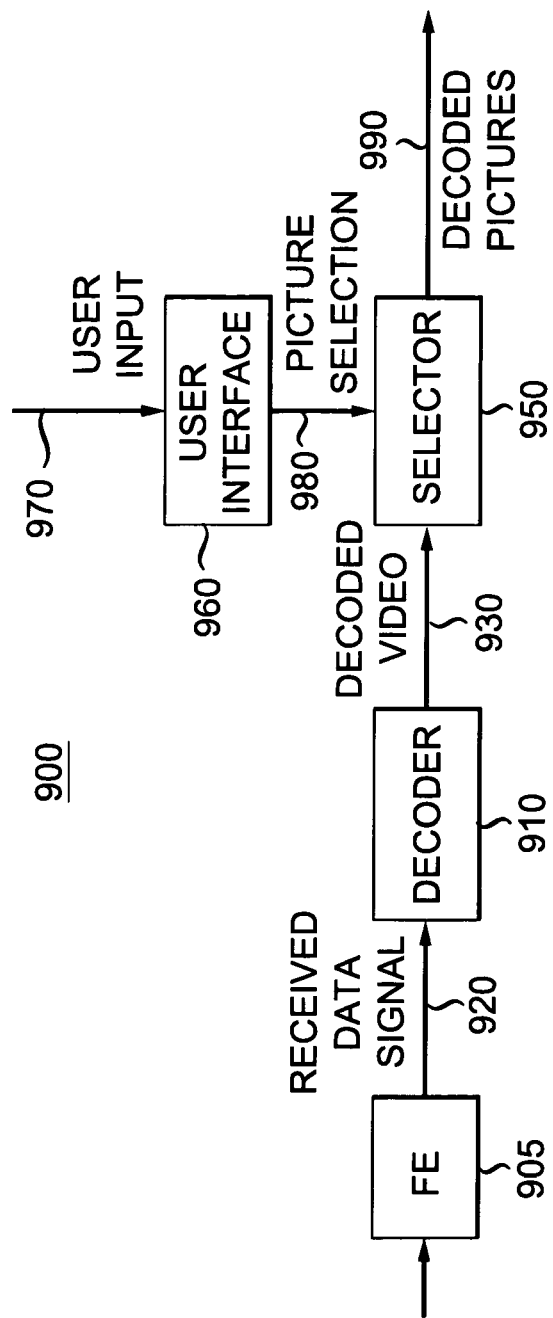
FIG. 9 is a block/flow diagram of an implementation of a video processing device.

With reference to FIG. 9, FIG. 9 illustrates a video processing device 900 to which aspects described herein may be applied, in accordance with an implementation. The video processing device 900 may be, for example, a set top box or other device that receives encoded video and provides, for example, decoded video for display to a user or for storage. Thus, the video processing device 900 may provide its output to a television, computer monitor, or a computer or other processing device.

The video processing device 900 includes a front-end (FE) device 905 and a decoder 910. The front-end device 905 may be, for example, a receiver adapted to receive a program signal having a plurality of bitstreams representing encoded pictures, and to select one or more bitstreams for decoding from the plurality of bitstreams. Typical receivers perform functions such as, for example, one or more of receiving a modulated and encoded data signal, demodulating the data signal, decoding one or more encodings (for example, channel coding and/or source coding) of the data signal, and/or error-correcting the data signal. The front-end device 905 may receive the program signal from, for example, an antenna (not shown). The front-end device 905 provides a received data signal to the decoder 910.

The decoder 910 receives a data signal 920. The data signal 920 may include, for example, one or more Advanced Video Coding (AVC), Scalable Video Coding (SVC), or Multi-view Video Coding (MVC) compatible streams.

AVC refers more specifically to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "H.264/MPEG-4 AVC Standard" or variations thereof, such as the "AVC standard" or simply "AVC").

MVC refers more specifically to a multi-view video coding ("MVC") extension (Annex H) of the AVC standard, referred to as H.264/MPEG-4 AVC, MVC extension (the "MVC extension" or simply "MVC").

SVC refers more specifically to a scalable video coding ("SVC") extension (Annex G) of the AVC standard, referred to as H.264/MPEG-4 AVC, SVC extension (the "SVC extension" or simply "SVC").

The decoder 910 decodes all or part of the received signal 920 and provides as output a decoded video signal 930. The decoded video 930 is provided to a selector 950. The device 900 also includes a user interface 960 that receives a user input 970. The user interface 960 provides a picture selection signal 980, based on the user input 970, to the selector 950. The picture selection signal 980 and the user input 970 indicate which of multiple pictures, sequences, scalable versions, views, or other selections of the available decoded data a user desires to have displayed. The selector 950 provides the selected picture(s) as an output 990. The selector 950 uses the picture selection information 980 to select which of the pictures in the decoded video 930 to provide as the output 990.

In various implementations, the selector 950 includes the user interface 960, and in other implementations no user interface 960 is needed because the selector 950 receives the user input 970 directly without a separate interface function being performed. The selector 950 may be implemented in software or as an integrated circuit, for example. In one implementation, the selector 950 is incorporated with the decoder 910, and in another implementation, the decoder 910, the selector 950, and the user interface 960 are all integrated.

In one application, front-end 905 receives a broadcast of various television shows and selects one for processing. The selection of one show is based on user input of a desired channel to watch. Although the user input to front-end device 905 is not shown in FIG. 9, front-end device 905 receives the user input 970. The front-end 905 receives the broadcast and processes the desired show by demodulating the relevant part of the broadcast spectrum, and decoding any outer encoding of the demodulated show. The front-end 905 provides the decoded show to the decoder 910. The decoder 910 is an integrated unit that includes devices 960 and 950. The decoder 910 thus receives the user input, which is a user-supplied indication of a desired view to watch in the show. The decoder 910 decodes the selected view, as well as any required reference pictures from other views, and provides the decoded view 990 for display on a television (not shown).

Continuing the above application, the user may desire to switch the view that is displayed and may then provide a new input to the decoder 910. After receiving a "view change" from the user, the decoder 910 decodes both the old view and the new view, as well as any views that are in between the old view and the new view. That is, the decoder 910 decodes any views that are taken from cameras that are physically located in between the camera taking the old view and the camera taking the new view. The front-end device 905 also receives the information identifying the old view, the new view, and the views in between. Such information may be provided, for example, by a controller (not shown in FIG. 9) having information about the locations of the views, or the decoder 910. Other implementations may use a front-end device that has a controller integrated with the front-end device.

The decoder 910 provides all of these decoded views as output 990. A post-processor (not shown in FIG. 9) interpolates between the views to provide a smooth transition from the old view to the new view, and displays this transition to the user. After transitioning to the new view, the post-processor informs (through one or more communication links not shown) the decoder 910 and the front-end device 905 that only the new view is needed. Thereafter, the decoder 910 only provides as output 990 the new view.

The system/apparatus 900 may be used to receive multiple views of a sequence of images, and to present a single view for display, and to switch between the various views in a smooth manner. The smooth manner may involve interpolating between views to move to another view. Additionally, the system 900 may allow a user to rotate an object or scene, or otherwise to see a three-dimensional representation of an object or a scene. The rotation of the object, for example, may correspond to moving from view to view, and interpolating between the views to obtain a smooth transition between the views or simply to obtain a three-dimensional representation. That is, the user may "select" an interpolated view as the "view" that is to be displayed.

It should be clear that the video transmission system 700, the video receiving system 800, and the video processing device 900, may all be adapted for use with the various implementations described in this application. For example, systems 700, 800, and 900, may be adapted to operate with data in one of the 3DV formats discussed, as well as with the associated signaling information.

Embodiment 1: 3DV Prefix NAL Unit

In this embodiment, a new NAL unit type is introduced and referred to as a "3DV prefix NAL unit," denoted as "16," which can precede Video Coding Layer (VCL) NAL units or MVC prefix NAL units (with nal_unit_type denoted as 14) for a particular 3DV view or 3DV layer. The VCL NAL units and MVC prefix units are described in detail in Gary Sullivan, et. al., "Editors' draft revision to ITU-T Rec. H.264|ISO/IEC 14496-10 Advanced Video Coding", JVT-AD007, January-February 2009, Geneva C H (hereinafter 'AVC Draft'), incorporated herein by reference, which relates to proposed AVC standards. The meaning of many terms and abbreviations that are used but not explicitly defined herein can be found in the AVC draft and are understandable by those of ordinary skill in the relevant technical field. The use of "16" to denote the 3DV prefix NAL unit is arbitrary and can be chosen to be any reserved NAL unit type in the AVC draft.

Table 2 provided below is a modified version of Table 7-1 in the AVC draft for nal_unit_type codes and defines the 3DV prefix NAL unit 16. Table 7-1 in the AVC draft is reproduced below as Table 3. It should be noted that Table 2 also includes modifications for Embodiment 3, discussed in more detail below. The 3DV prefix NAL unit 16 permits MVC compatible decoders to decode all transmitted 3DV layers, including the 3DV supplemental layers, and also permits synchronization of 3DV views and layers at a coding level. Rows 2-5 (NAL unit types 16-23) of Table 2 reflect syntax changes to Table 3.

TABLE 2

NAL unit type codes, syntax element categories, and NAL unit type classes

| nal_unit_type | Content of NAL unit and RBSP syntax structure | C | Annex A NAL unit type class | Annex G and Annex H NAL unit type class |
|---|---|---|---|---|
| 0 ... 15 | As defined in Table 7-1 in AVC draft | | | |
| 16 | 3DV prefix NAL unit | | non-VCL | non-VCL |
| 17 ... 20 | Reserved | | | |
| 21 | Coded 3DV slice extension 3dv_slice_layer_extension_rbsp( ) | 2, 3, 4 | non-VCL | VCL |
| 22 ... 23 | Reserved | | non-VCL | non-VCL |
| 24 ... 31 | As defined in Table 7-1 in AVC draft | | non-VCL | non-VCL |

TABLE 3

NAL unit type codes, syntax element categories, and NAL unit type classes

| nal_unit_type | Content of NAL unit and RBSP syntax structure | C | Annex A NAL unit type class | Annex G and Annex H NAL unit type class |
|---|---|---|---|---|
| 0 | Unspecified | | non-VCL | non-VCL |
| 1 | Coded slice of a non-IDR picture slice_layer_without_partitioning_rbsp( ) | 2, 3, 4 | VCL | VCL |
| 2 | Coded slice data partition A slice_data_partition_a_layer_rbsp( ) | 2 | VCL | not applicable |
| 3 | Coded slice data partition B slice_data_partition_b_layer_rbsp( ) | 3 | VCL | not applicable |
| 4 | Coded slice data partition C slice_data_partition_c_layer_rbsp( ) | 4 | VCL | not applicable |
| 5 | Coded slice of an IDR picture slice_layer_without_partitioning_rbsp( ) | 2, 3 | VCL | VCL |
| 6 | Supplemental enhancement information (SEI) sei_rbsp( ) | 5 | non-VCL | non-VCL |
| 7 | Sequence parameter set seq_parameter_set_rbsp( ) | 0 | non-VCL | non-VCL |
| 8 | Picture parameter set pic_parameter_set_rbsp( ) | 1 | non-VCL | non-VCL |
| 9 | Access unit delimiter access_unit_delimiter_rbsp( ) | 6 | non-VCL | non-VCL |
| 10 | End of sequence end_of_seq_rbsp( ) | 7 | non-VCL | non-VCL |
| 11 | End of stream end_of_stream_rbsp( ) | 8 | non-VCL | non-VCL |
| 12 | Filler data filler_data_rbsp( ) | 9 | non-VCL | non-VCL |
| 13 | Sequence parameter set extension seq_parameter_set_extension_rbsp( ) | 10 | non-VCL | non-VCL |
| 14 | Prefix NAL unit prefix_nal_unit_rbsp( ) | 2 | non-VCL | suffix dependent |
| 15 | Subset sequence parameter set subset_seq_parameter_set_rbsp( ) | 0 | non-VCL | non-VCL |
| 16 ... 18 | Reserved | | non-VCL | non-VCL |
| 19 | Coded slice of an auxiliary coded picture without partitioning slice_layer_without_partitioning_rbsp( ) | 2, 3, 4 | non-VCL | non-VCL |
| 20 | Coded slice extension slice_layer_extension_rbsp( ) | 2, 3, 4 | non-VCL | VCL |
| 21 ... 23 | Reserved | | non-VCL | non-VCL |
| 24 ... 31 | Unspecified | | non-VCL | non-VCL |

A more detailed description of the proposed 3DV prefix NAL unit is shown in Table 4 below.

TABLE 4

3DV prefix NAL unit

| 3dv_prefix_nal_unit( ) { | C | Descriptor |
|---|---|---|
| 3dv_view_id | All | u(7) |
| 3dv_layer_id | All | u(3) |
| reserved_bits | All | u(6) |
| } | | |

As illustrated in Table 4, the 3DV prefix NAL unit may include a 3dv_view_id and a 3dv_layer_id. The 3dv_view_id specifies a 3DV view ID number of the frame associated with a 3DV view. In addition, the 3dv_layer_id specifies the 3DV layer ID number of the associated frame. The reserved_bits permits the NAL unit to be byte aligned. It should be understood that the numbers of bits used for each syntax element and their coding method are provided only as an example. It should also be noted that the header of NAL unit 16 can include a standard first byte, as in the first three elements of Table 9 below. In this embodiment, the NAL unit 16 can include a header and an extended header and need not include a payload. A NAL unit 16 can be transmitted, for example, prior to every 3DV layer frame or prior to every slice of a 3DV layer frame.

Figure 10:
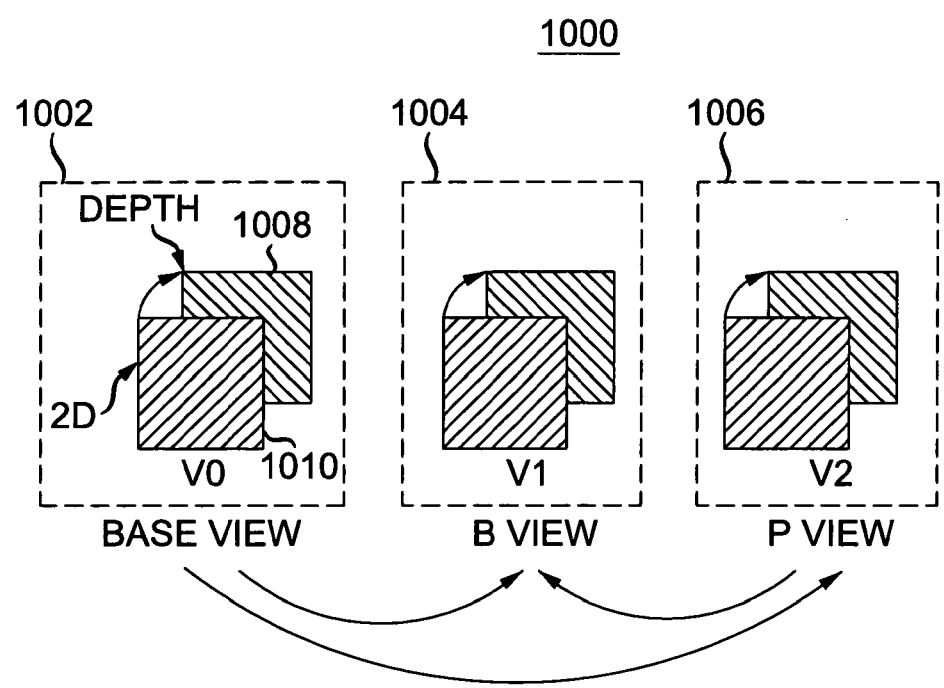
FIG. 10 is a diagram of an example of a 3DV coding structure.

To better illustrate how the 3DV prefix NAL unit may be employed, reference is made to FIG. 10, which shows an example of 3DV content comprising a structure 1000 of 3DV views 1002, 1004, and 1006. Here views 1002, 1004, and 1006 provide different perspectives of the same scene or object. In this example, each 3DV view is further composed of two layers: 2D view 1010 plus its depth 1008. The arrows in FIG. 10 show the coding dependency between the different views and layers. For example, the B view 1004, a bi-directionally predicted view, for coding purposes, depends on and references the Base view 1002 and the P view 1006, a predictive view. Similarly, the P view 1006 depends on and references the base view 1002. Here, the depth layer 1008 of each 3DV view references the 2D view layer 1010 of the corresponding 3DV view. It should be noted that the 3DV views and dependencies could be extended to 3DV content having additional 3DV supplemental layers, such as those in accordance with MVD, LDV, DES formats, by persons of ordinary skill in the art in view of the teachings provided herein. It should also be noted that the dependencies provided in FIG. 10 are only examples and that the use of 3DV prefix NAL unit permits a variety of other dependencies.

Figure 11:
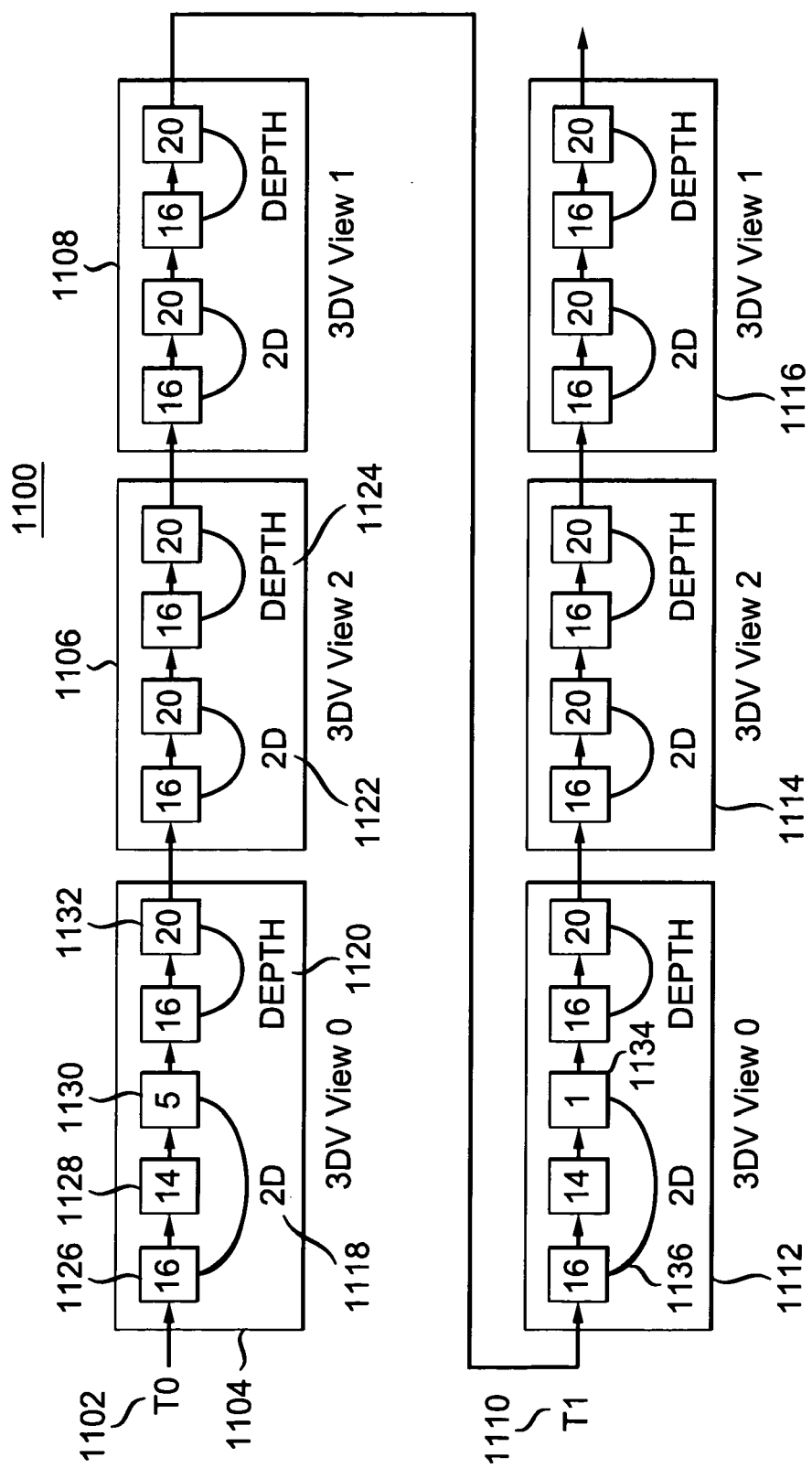
FIG. 11 is a block/flow diagram of a first example of a Network Abstraction Layer (NAL) unit stream.

A NAL unit stream for the 3DV content in FIG. 10 in accordance with this embodiment is illustrated in FIG. 11. In particular, FIG. 11 provides a stream of NAL units 1100 for different times, T0 1102 and T1 1110, for a video presentation. Here, view 1104 and view 1112 (3DV View 0) correspond to base view 1002 at times T0 and T1, respectively, in that they are associated with the same perspective or viewpoint as base view 1002. Similarly, view 1106 and view 1114 (3DV view 2) correspond to P view 1006 at times T0 and T1, respectively, while view 1108 and view 1116 (3DV view 1) correspond to B view 1004 at times T0 and T1, respectively.

As shown in FIG. 11, each 3DV view is composed of a 2D view layer and a depth layer. However, it should be understood that additional supplemental layers can be employed in other embodiments. Here, view 1104 is composed of a 2D view layer 1118 and a depth layer 1120. The 2D view layer 1118 is itself composed of NAL units 16 (1126), 14 (1128), and 5 (1130), while the depth layer 1120 is composed of a NAL unit 16 and NAL unit 20 (1132). In turn, 2D view layer 1122 and depth layer 1124 of view 1106 are themselves composed of a NAL unit 16 and a NAL unit 20, as shown in FIG. 11. View 1112 is composed of both a depth layer, including NAL units 16 and 20, and a 2D view layer 1136, including NAL units 16, 14 and 1 (1134).

The arrows of FIG. 11 indicate the transmission order of NAL units. For example, NAL unit 16 (1126) is transmitted before NAL unit 14 (1128), which is itself transmitted before NAL unit 5 (1130), etc. NAL unit 16 is defined in Tables 2 and 4 while the other NAL units illustrated in FIG. 11 are defined in Table 3. For example, NAL unit 5 includes video data of a coded slice of an instantaneous decoding refresh (IDR) picture that is composed of only intra slices or SI slices, as defined in the AVC draft. Generally, the IDR picture is coded using intra prediction only or using intra prediction only and quantization of prediction samples. Further, NAL unit 1 includes video data of a coded slice of a non-IDR picture, such as a bi-directionally (B) coded picture or a predictively (P) coded picture, which in turn can reference other pictures, 3DV layers or 3DV views. In turn, NAL unit 20 is a coded slice extension that can reference another layer, as indicated, for example, in FIG. 10, or another 3DV view. It should also be noted that NAL units 1, 5 and 20 shown in FIG. 11 are representative of many such units and have been truncated for ease of presentation. For example, after prefix units 16 and 14 have been transmitted for 2D view 1118, several NAL units 5 (1130) can be transmitted until all slices of the corresponding frame have been sent. Similarly, after a prefix NAL unit 16 has been transmitted for a depth view, a plurality of NAL units 20 composing the depth layer frame can be transmitted. NAL unit 1 in FIG. 11 is similarly a truncated representation of the slices corresponding to the frame of the 2D view layer 1136.

Each NAL unit 14 is a prefix NAL unit, as described above, indicating an MVC view ID for its corresponding layer. For example, NAL unit 14 includes an MVC view ID for its corresponding 2D view layer 1118. Similarly, NAL unit 20 also includes an MVC view ID for its corresponding 3DV layer. In this embodiment, every 3DV layer is coded as a separate MVC view and thus is allocated a unique MVC view_id during its coding. The encoder, such as encoder 300 discussed above, can use the MVC view_id to indicate the dependency between layers and/or frames in a sequence parameter set (SPS), as discussed further herein below with respect to embodiments 5-7, and can specify the corresponding 3dv_view_id and 3dv_layer_id in the prefix NAL unit 16 such that the decoder, such as decoder 400, can interpret and decode a frame in the correct manner using the 3DV prefix NAL unit.

As an example, the MVC view_id of each 3DV layer can be set as in Table 5. Thus, in the architecture of embodiment 1, any NAL unit with MVC view_id equal to 4 shall be preceded by a prefix NAL unit 16 with 3dv_view_id set as 2 and 3dv_layer_id set as 0. The actual values allocated here are arbitrary and can be varied as long as the different 3DV views, each corresponding to a different perspective or view point, are uniquely identified and their corresponding 3DV layers are adequately identified and conveyed. It should also be noted that the values in Table 5 are consistent across different times. For example, views 1104 and 1112 share the same MVC view, 3DV view and 3DV layer IDs.

TABLE 5

Example of MVC view_id in Embodiment 1

| MVC view_id | 3dv_view_id | 3dv_layer_id | Description |
|---|---|---|---|
| 0 | 0 | 0 | 2D video |
| 1 | 0 | 1 | Depth |
| 2 | 1 | 0 | 2D video |
| 3 | 1 | 1 | Depth |
| 4 | 2 | 0 | 2D video |
| 5 | 2 | 1 | Depth |

It should be understood that the bitstream defined in embodiment 1 is MVC compatible and every 3DV view and all of its layers can be decoded by a conventional MVC decoder. Thus, the 3DV prefix NAL unit 16 permits MVC compatible decoders to decode all transmitted 3DV layers, including the 3DV supplemental layers. However, although conventional MVC decoder would not be aware of how to organize the decoded data into a 3DV format, use of the NAL unit 16 permits synchronization of 3DV views and layers at a coding level by embodiments. For example, 3DV reference buffer 316 of encoder 300 illustrated in FIG. 3 can include appropriate 3DV prefix units, in accordance with the above-disclosed teaching, in bitstream 318, while 3DV reference buffer 414 of decoder 400 of FIG. 4 can interpret the NAL units in bitstream 318 and construct and format 3DV content using the NAL units accordingly, so that they conform to the structures discussed with respect to FIGS. 10 and 11 above.

It should be noted that the MVC backward compatibility is achieved in that every 2D view layer of a 3DV view can be decoded and formatted by a conventional MVC decoder in accordance with MVC. However, because the depth layers and other 3DV supplemental layers would include their own unique MVC view ID, the 3DV supplemental layers would be interpreted by an MVC decoder as a separate MVC view. Thus, if 3DV supplemental layers were formatted and displayed in accordance with MVC, the displayed image would ordinarily not have a three-dimensional effect. As such, a user can search through and attempt to display MVC views until a viewable 3D image is presented. Here, a viewable 3D view would be presented whenever two 2D view layers are selected/displayed and presented to each eye of a user.

Additionally, a user may also be able to view 3D images if the user's display is configured to accept the 3DV supplemental layers as transmitted using, for example, Embodiment 1, and produce 3D images. For example, a user's display may accept LDV formatted input and produce 3D images from that input. In such a case, a user may, for example, select a mode on the user's display to indicate that the input is in LDV format.

Embodiment 2: Reusing MVC view_id under 3DV

In accordance with an embodiment 2, as an alternative implementation of embodiment 1, novel encoding and decoding processes on the NAL unit header are proposed. Here, the details provided above with regard to embodiment 1 apply to embodiment 2, except that a specific numbering method involving the MVC view_id is employed so that use of the 3DV prefix NAL unit 16 is avoided. For example, as the MVC view_id is defined to have 10 bits, the 3 least significant bits of the MVC view_id can indicate the 3dv_layer_id and the 7 most significant bits of the MVC view_id can indicate the 3dv view_id. Consequently, the MVC view_id in Table 5 can be set as in Table 6 below. Thus, the 3DV content provided in FIG. 11 would be the same for embodiment 2 except that the NAL unit 16 would not be present in embodiment 2 and the decoder can store and use Table 6 to determine 3DV view IDs and 3DV layer IDs from extracted MVC view IDs in the bitstreams by cross-referencing the extracted MVC view IDs to 3DV view IDs and 3DV layer IDs. Accordingly, the NAL prefix unit 14 and/or the NAL unit 20 can be configured in accordance with a numbering method involving the MVC view ID. Here, as discussed above, the MVC view ID can be employed to convey the 3DV view ID and the 3DV layer ID to permit synchronization and formatting of 3DV content at the coding level.

TABLE 6

Example of MVC view_id in Embodiment 2

| MVC view_id | 3dv_view_id | 3dv_layer_id | Description |
|---|---|---|---|
| 0 | 0 | 0 | 2D video |
| 1 | 0 | 1 | Depth |
| 8 | 1 | 0 | 2D video |
| 9 | 1 | 1 | Depth |
| 16 | 2 | 0 | 2D video |
| 17 | 2 | 1 | Depth |

Embodiment 3: 3DV NAL Unit Extension

In embodiments 1 and 2, certain MVC coding techniques were used to code all the 3DV layers and, as such, all the 3DV layers were decodable by a conventional MVC decoder. However, a conventional MVC decoder implementing the current MVC standard does not compose each of the various 3DV layers into a 3DV format, as discussed above. In Embodiment 3, a coding framework is proposed that permits the introduction of additional coding techniques, that are not part of the current MVC standard, and that are applicable to certain 3DV views and/or certain 3DV layers.

To achieve this goal, a novel new NAL unit type, referred to herein as "21," as shown in Table 2 above, can be employed. Similar to NAL unit 16, the reference number chosen for the novel NAL unit of embodiment 3 can be any number reserved by the AVC draft in Table 3. Here, any 3DV view and/or 3DV layer that need not be decoded by an MVC decoder can use NAL unit 21 to decode 3DV content. Further, all the 2D view layers that can be decoded and properly interpreted by an MVC decoder can be coded in conventional NAL unit types, such as 1, 5, and 20, as discussed above, and they are referred as MVC compatible 2D views. MVC compatible 2D views can be preceded by a 3DV prefix NAL unit, such as NAL unit 16, as described with respect to Embodiment 1; or an MVC view_id numbering method can be specified so as to avoid the 3DV prefix NAL unit, as described with respect to Embodiment 2.

Similar to the AVC draft MVC NAL unit header extension, provided below in Table 7, a novel 3DV NAL unit header extension is proposed and provided in Table 8 below.

TABLE 7

NAL unit header MVC extension

| nal_unit_header_mvc_extension( ) { | C | Descriptor |
|---|---|---|
| non_idr_flag | All | u(1) |
| priority_id | All | u(6) |
| view_id | All | u(10) |
| temporal_id | All | u(3) |
| anchor_pic_flag | All | u(1) |
| inter_view_flag | All | u(1) |
| reserved_one_bit | All | u(1) |
| } | | |

TABLE 8

NAL unit header 3DV extension

| nal_unit_header_3dv_extension( ) { | C | Descriptor |
|---|---|---|
| non_idr_flag | All | u(1) |
| priority_id | All | u(6) |
| 3dv_view_id | All | u(7) |
| 3dv_layer_id | All | u(3) |
| temporal_id | All | u(3) |
| anchor_pic_flag | All | u(1) |
| inter_view_flag | All | u(1) |
| reserved_one_bit | All | u(1) |
| } | | |

As shown in Tables 7 and 8, the 3DV NAL unit header extension can include the same syntax elements as the MVC NAL unit header extension, except that the syntax element of view_id MVC NAL unit header extension is replaced by two syntax elements, 3dv_view_id and 3dv_layer_id, in the 3DV NAL unit header extension. Here, in embodiment 3, 3dv_view_id specifies a 3DV view ID number of the associated frame. The same 3dv_view_id is shared among 3DV view layers from the same view position. In turn, 3dv_layer_id specifies the 3DV layer ID number of the associated frame. The call for nal_unit_header_3dv_extension( ) is shown in Table 9 below.

TABLE 9

NAL unit syntax

| nal_unit( NumBytesInNALunit ) { | C | Descriptor |
|---|---|---|
| forbidden_zero_bit | All | f(1) |
| nal_ref_idc | All | u(2) |
| nal_unit_type | All | u(5) |
| NumBytesInRBSP = 0 | | |
| nalUnitHeaderBytes = 1 | | |
| If( nal_unit_type == 14 \|\| nal_unit_type == 20 ) { | | |
|   svc_extension_flag | All | u(1) |
|   if( svc_extension_flag ) | | |
|     nal_unit_header_svc_extension( ) | All | |
|   Else | | |
|     nal_unit_header_mvc_extension( ) | All | |
|   nalUnitHeaderBytes += 3 | | |
| } | | |
| If( nal_unit_type == 21 ) { | | |
|   nal_unit_header_3dv_extension( ) | | |
|   nalUnitHeaderBytes += 3 | | |
| } | | |

TABLE 9-continued

NAL unit syntax

| nal_unit( NumBytesInNALunit ) { | C | Descriptor |
|---|---|---|
|   for( l = nalUnitHeaderBytes; i <  NumBytesInNALunit; i++ ) { | | |
|     if( i + 2 < NumBytesInNALunit && next_bits( 24 ) = = 0x000003 ) { | | |
|       rbsp_byte[ NumBytesInRBSP++ ] | All | b(8) |
|       rbsp_byte[ NumBytesInRBSP++ ] | All | b(8) |
|       i += 2 | | |
|       emulation_prevention_three_byte /* equal to 0x03 */ | All | f(8) |
|     } else | | |
|       rbsp_byte[ NumBytesInRBSP++ ] | All | b(8) |
|   } | | |
| } | | |

Here, the If( nal_unit_type = = 21 ) {. . .} statement has been added to the NAL unit syntax described in the AVC draft.

Figure 12:
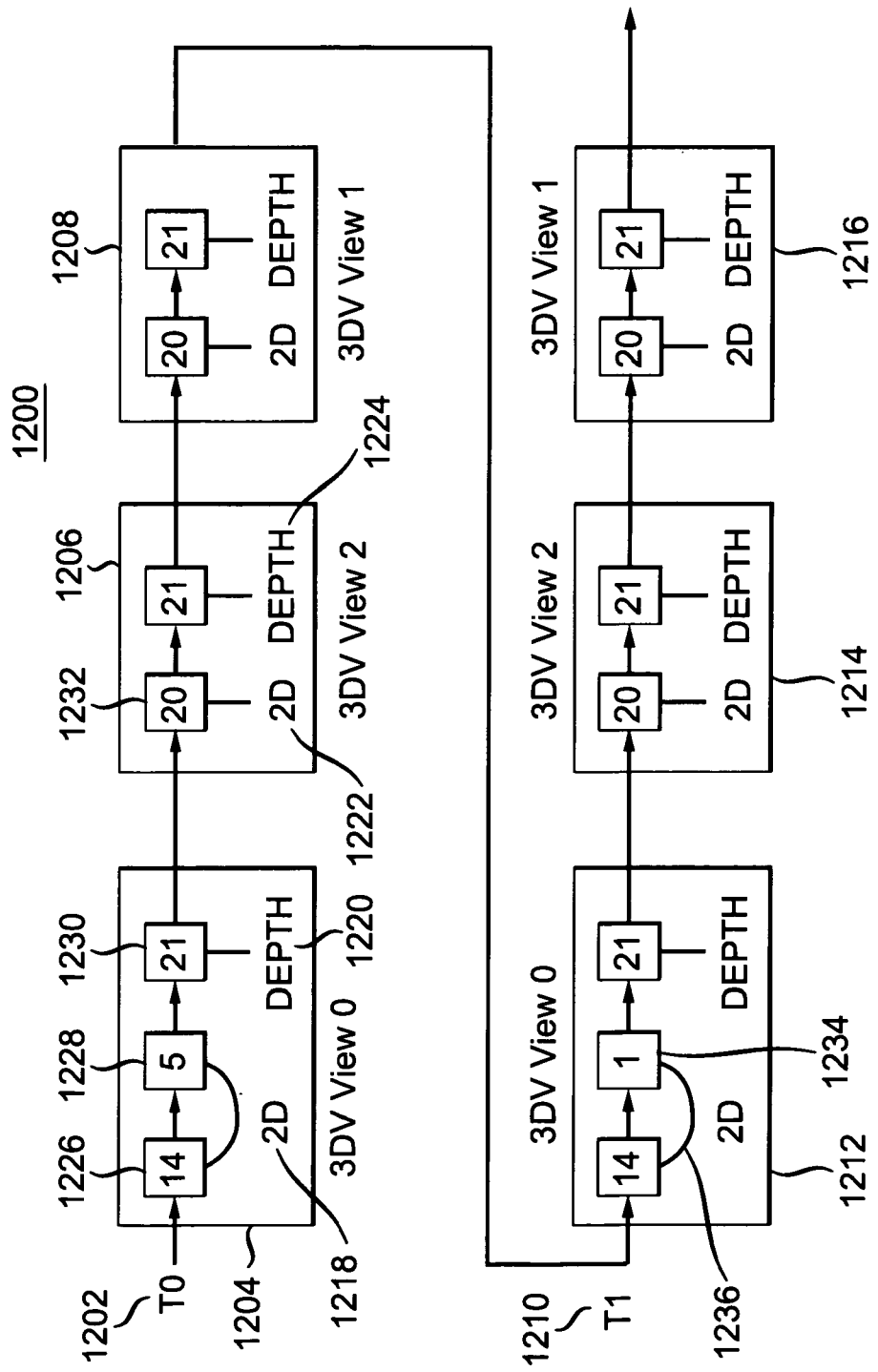
FIG. 12 is a block/flow diagram of a second example of a NAL unit stream.

An example of a NAL unit stream 1200 in accordance with embodiment 3 is provided in FIG. 12, where the new NAL unit 21 is employed. Here, use of a 3DV prefix NAL unit type is avoided, as the view_id numbering is specified in the NAL unit header parsing process. NAL unit stream 1200 is an illustration of the application of embodiment 3 to the 3DV content example provided in FIG. 10. As discussed above, different variations of dependencies between 3DV views and 3DV layers and of the 3DV layers used can be different in accordance with various implementations.

Similar to stream 1100, stream 1200 can include different sets of views for different times, with views 1204, 1206 and 1208 corresponding to T0 (1202) and views 1212, 1214 and 1216 corresponding to time T1 (1210). View 1204 and view 1212 (3DV View 0) correspond to base view 1002 at times T0 and T1, respectively, in that they are associated with the same perspective or viewpoint as base view 1002. Similarly, view 1206 and view 1214 (3DV view 2) correspond to P view 1006 at times T0 and T1, respectively, while view 1208 and view 1216 (3DV view 1) correspond to B view 1004 at times T0 and T1, respectively. Each 3DV view is composed of a 2D view layer and a depth layer. As for stream 1100, it should be understood that additional supplemental layers can be employed in other embodiments. View 1204 is composed of a 2D view layer 1218 and a depth layer 1220. In turn, the 2D view layer 1218 is composed of NAL units 14 (1226) and 5 (1230), while the depth layer 1220 is composed of NAL units 21 (1230). Further, view 1206 is composed of 2D view 1222, which includes NAL units 20, and a depth view 1224 composed of NAL units 21. In addition, 2D view 1236 of view 1212 is composed of NAL units 14 and 1.

NAL units 1, 5, 14 and 20 have been described above with respect to FIG. 11. NAL unit 21 employs a 3DV NAL unit header extension of Table 8 as opposed to an MVC NAL unit header extension of Table 7 used by NAL units 14 and 20. Use of the novel 3DV NAL unit header extension enables synchronization of 3DV layers into a 3DV content format at the coding level while permitting the application of new coding methods. Different from NAL unit 16, the NAL unit 21 can include a payload of corresponding video data. More generally, the payload can include picture data, which generally refers to data for a corresponding encoded picture. The picture data may be from any layer, such as, for example, 2D video, depth, occlusion video, occlusion depth, or transparency.

It should also be noted that similar to FIG. 11, the arrows of FIG. 12 indicate the transmission order of NAL units.

Moreover, NAL units 1, 5, 20, and 21 in FIG. 12 are truncated in the same way in which NAL units 1, 5 and 20 of FIG. 11 are truncated. Further, embodiment 3 is MVC compatible in that 2D view layers can be decoded by a conventional decoder and combined in accordance with MVC to permit the generation and display of 3D content.

Figure 13:
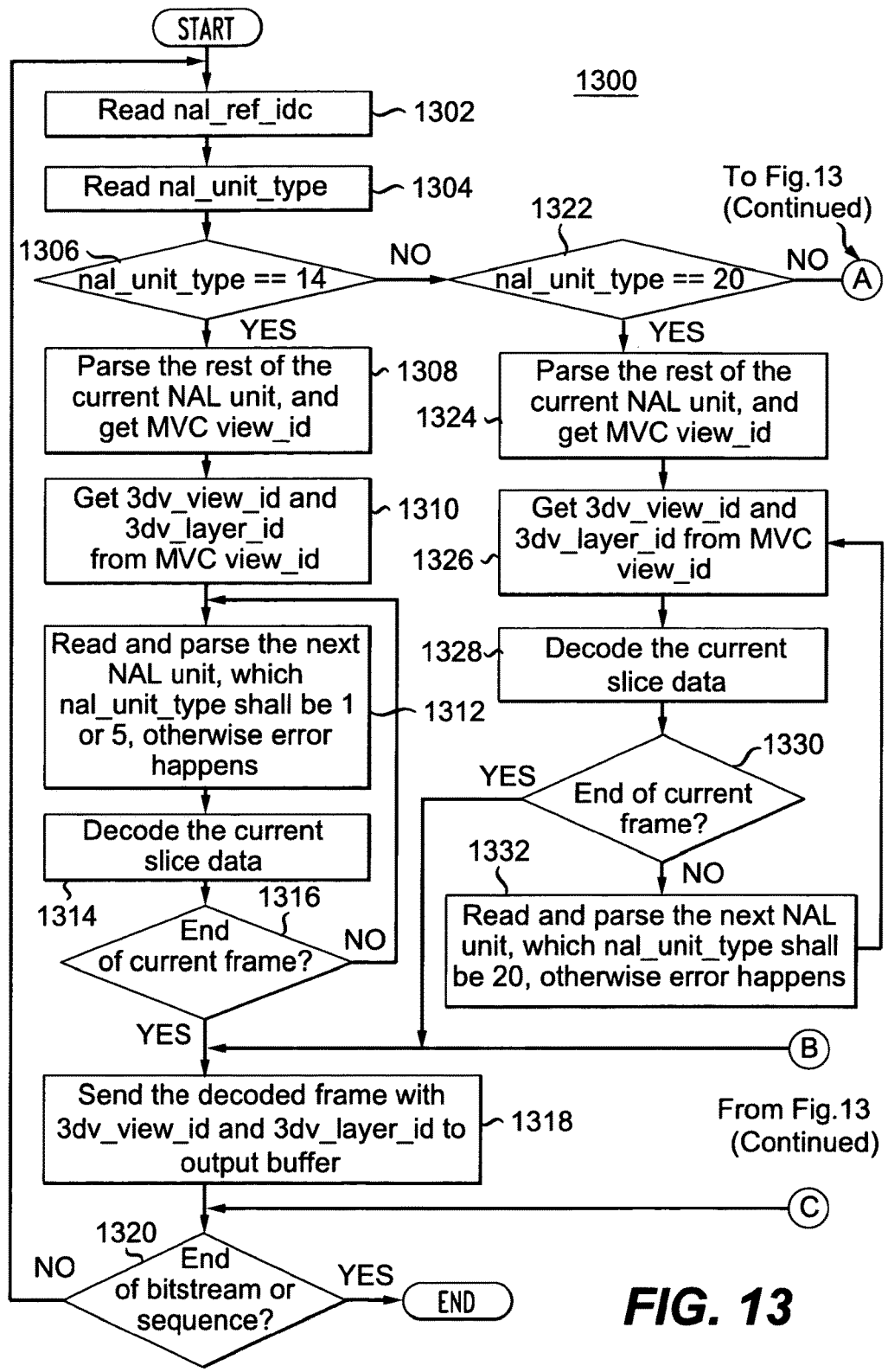
FIG. 13 is flow diagram of an example of a method for decoding 3DV content.
Figure 13:
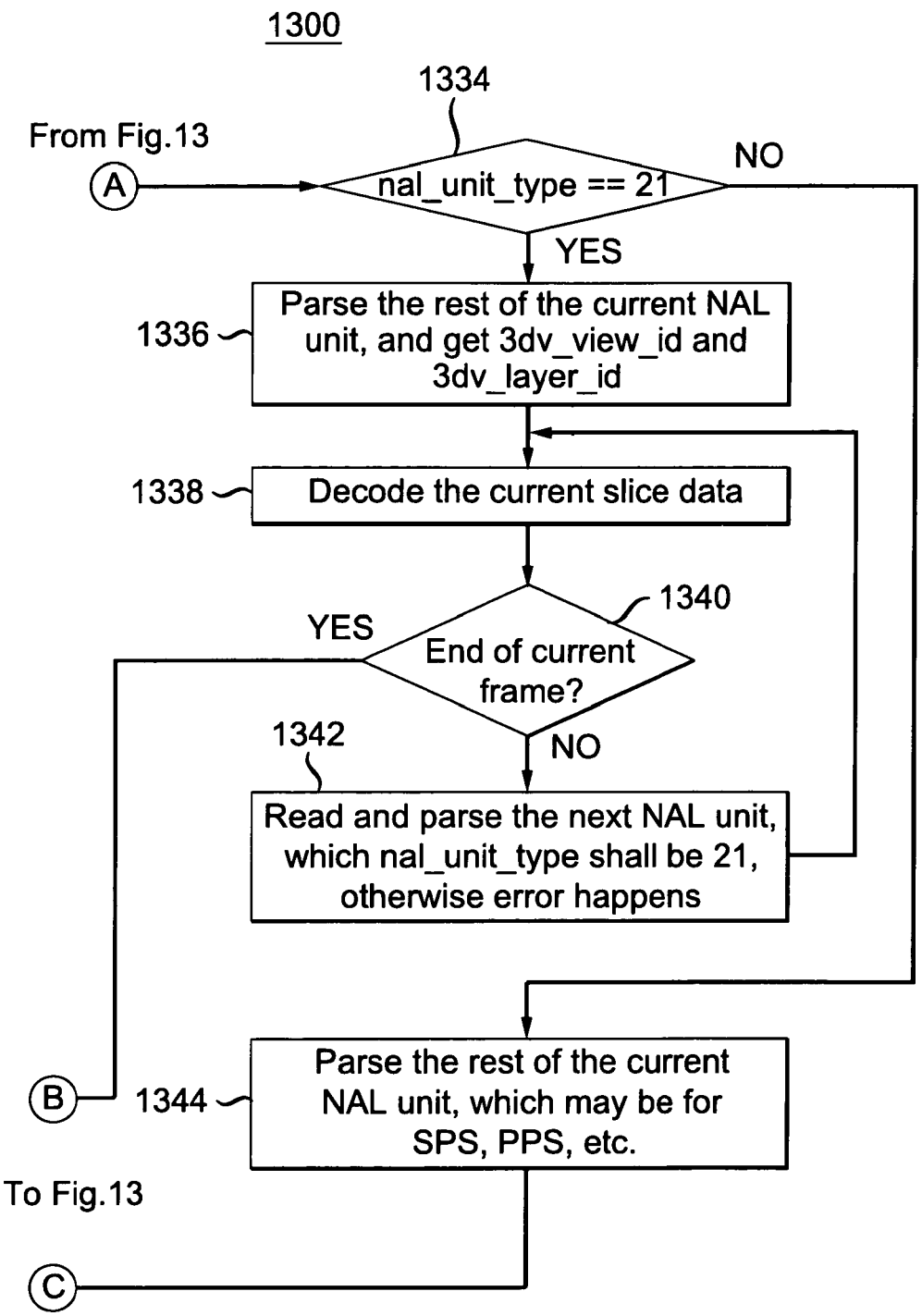
Figure 14:
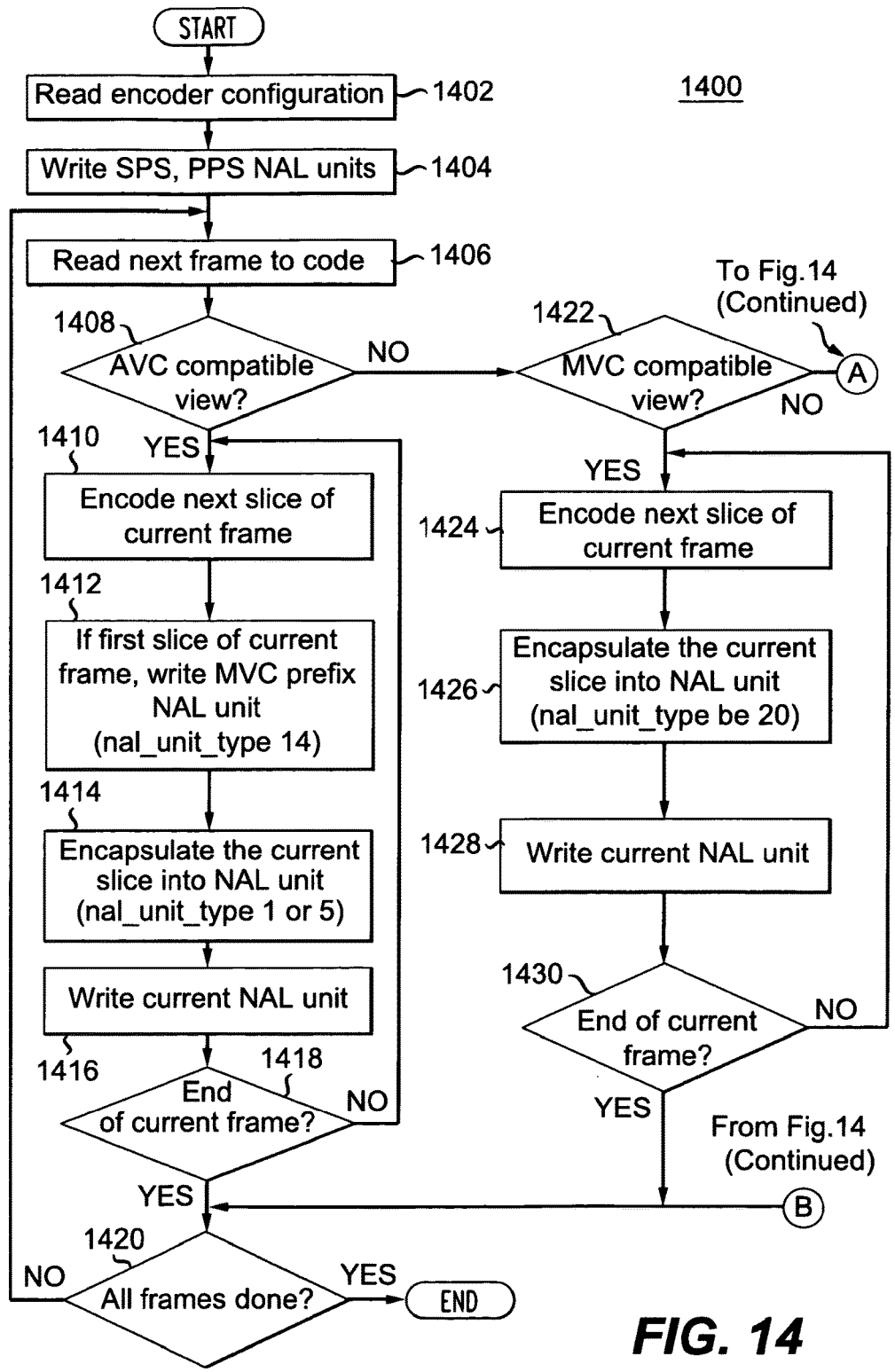
FIG. 14 is a flow diagram of an example of a method for encoding 3DV content.
Figure 14:
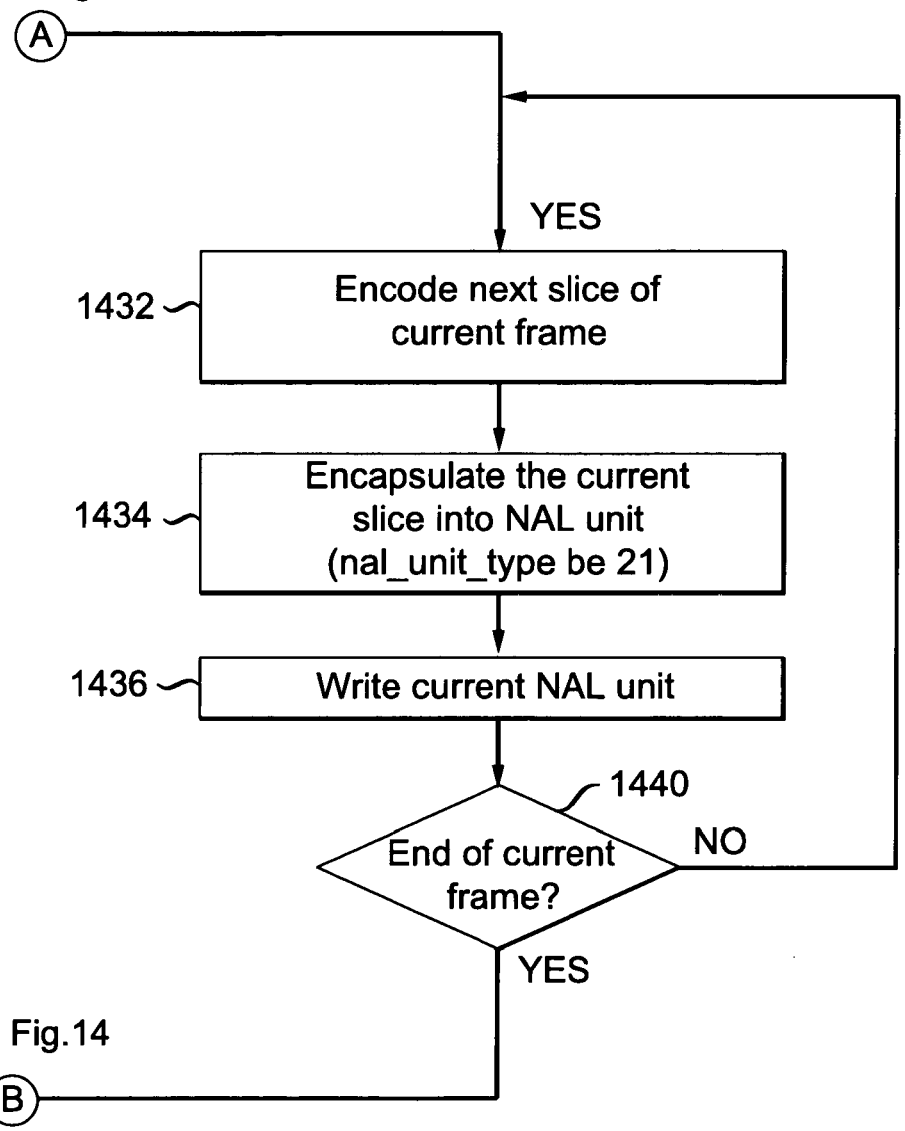

Turning now to FIGS. 13 and 14, methods 1300 and 1400 for decoding and encoding, respectively, a 3DV content stream in accordance with embodiment 3 are illustrated. It should be understood that method 1300 can be performed by and implemented in decoder 400 of FIG. 4, while method 1400 can be performed by and implemented in encoder 300 of FIG. 3. Both methods 1300 and 1400 employ the syntax provided above in Table 9.

Method 1300 can begin at step 1302 in which the decoder 400 can read the nal_ref_idc, described above in Table 9 and also in the AVC draft, of a received NAL unit.

At step 1304, the decoder 400 can read the NAL unit type.

At step 1306, the decoder 400 can determine whether the NAL unit type is 14. If the NAL unit type is 14, then the decoder 400 can proceed to step 1308 and parse the remaining portion of the currently processed NAL unit to obtain the MVC view ID. In this particular implementation of embodiment 3, the 3DV view ID and the 3DV layer ID is indicated by the MVC view ID, for example, as described above with respect to Embodiment 2.

Thus, at step 1310, the decoder 400 can obtain the 3DV view ID and the 3DV layer ID from the MVC view ID, as discussed above, for example, with respect to embodiment 2.

At step 1312, the decoder 400 can read and parse the next NAL unit received. The next NAL unit should be either of type 1 or of type 15. Thus, if the decoder determines that the next NAL unit is not of type 1 or of type 15, then an error has occurred.

At step 1314, the decoder 400 can decode the current slice data of the currently processed NAL unit.

At step 1316, the decoder 400 can determine whether the processed NAL unit corresponds to the end of the current frame. If the processed NAL unit does not correspond to the end of the current frame, then steps 1312-1316 may be repeated by the decoder 400.

After the end of the current frame is reached, then the method may proceed to step 1318, in which the decoder 400 may send the decoded frame with its 3DV view ID and its 3DV layer ID to its output buffer, such as, for example, 3DV Reference/Output Buffer 414, which in turn, may configure the frame in a 3DV format for display, as discussed above.

At step 1320, the decoder 400 may determine whether the end of the bitstream or sequence has been reached. If the end of the bitstream or sequence has not been reached, then the method may proceed to step 1302 and the decoder 400 may repeat method 1300. If the end of the bitstream or sequence is reached, then method 1300 may end.

Returning to step 1306, if decoder 400 determines that the NAL unit type of the currently processed NAL unit is not of type 14, then the method may proceed to step 1322, in which the decoder 400 may determine whether the NAL unit type of the currently process NAL unit is 20. If the currently processed NAL unit is of type 20, then the method may proceed to step 1324, in which decoder 400 can parse the remaining portion of the currently processed NAL unit to obtain the MVC view ID. In this particular implementation of embodiment 3, the 3DV view ID and the 3DV layer ID is indicated by the MVC view ID, for example, as described above with respect to embodiment 2.

Accordingly, at step 1326, the decoder 400 can obtain the 3DV view ID and the 3DV layer ID from the MVC view ID, as discussed above, for example, with respect to embodiment 2.

At step 1328, the decoder 400 can decode the current slice data of the currently processed NAL unit.

At step 1330, the decoder 400 can determine whether the processed NAL unit corresponds to the end of the current frame. If the processed NAL unit does not correspond to the end of the current frame, then the method may proceed to step 1332, in which the decoder 400 can read and parse the next NAL unit received. The next NAL unit should be of type 20. Thus, if the decoder determines that the next NAL unit is not of type 20, then an error has occurred. Thereafter, steps 1326-1330 may be repeated by the decoder 400.

If, at step 1330, the decoder 400 determines that the end of the current frame is reached, then the method may proceed to step 1318, in which the decoder 400 may send the decoded frame with its 3DV view ID and its 3DV layer ID to its output buffer, as discussed above. Thereafter, the method may proceed to step 1320 and may be repeated or terminated, as discussed above.

Returning to step 1322, if the decoder 400 determines that the currently processed NAL unit is not of type 20, then the method may proceed to step 1334, in which the decoder determines whether the NAL unit currently processed is of type 21. If the NAL unit currently processed is of type 21, then the method may proceed to step 1336 in which the decoder 400 may parse the remaining portion of the currently processed NAL unit and obtain the 3DV view ID and the 3DV layer ID provided by the 3DV NAL unit header extension.

At step 1338, the decoder 400 can decode the current slice data of the currently processed NAL unit.

At step 1340, the decoder 400 can determine whether the processed NAL unit corresponds to the end of the current frame. If the processed NAL unit does not correspond to the end of the current frame, then the method may proceed to step 1342, in which the decoder 400 can read and parse the next NAL unit received. The next NAL unit should be of type 21. Thus, if the decoder determines that the next NAL unit is not of type 21, then an error has occurred. Thereafter, steps 1338-1340 may be repeated by the decoder 400.

If, at step 1340, the decoder 400 determines that the end of the current frame is reached, then the method may proceed to step 1318, in which the decoder 400 may send the decoded frame with its 3DV view ID and its 3DV layer ID to its output buffer, as discussed above. Thereafter, the method may proceed to step 1320 and may be repeated or terminated, as discussed above.

Returning to step 1334, if the decoder 400, at step 1334, determines that the currently processed NAL unit is not of type 21, then the method may proceed to step 1344 in which the remaining portion of the currently processed NAL unit is parsed, which may be intended for the sequence parameter set (SPS), the picture parameter set (PPS) or for other purposes. Thereafter, the method may proceed to step 1320 and may be repeated or terminated, as discussed above.

Referring again to FIG. 14, method 1400 for encoding a 3DV content stream in accordance with embodiment 3 may begin at step 1402, in which the encoder 300 may read its configuration profile.

At step 1404, the encoder 300 may write SPS and/or PPS NAL units.

At step 1406, the encoder 300 may read the next frame to encode.

At step 1408, the encoder 300 may determine whether the currently processed frame is to be an AVC compatible view. If the currently processed frame is to be an AVC compatible view, then the method may proceed to step 1410, in which the encoder 300 can encode the next slice of the current frame.

At step 1412, if the currently processed slice of the current frame is the first slice of the current frame, as determined by encoder 300, then the encoder 300 may write an MVC prefix NAL unit with a NAL unit type of, for example, 14.

At step 1414, the encoder 300 can encapsulate the current slice into a NAL unit, such as for example, a NAL unit of type 1 or 5.

At step 1416, the encoder 300 can write the NAL unit in which the current slice is encapsulated at step 1414.

At step 1418, the encoder 300 can determine whether it has reached the end of the current frame. If the encoder has not reached the end of the current frame, then the method may proceed to step 1410 and the encoder 300 may repeat steps 1410-1418. If the encoder has reached the end of the current frame, then the method may proceed to step 1420, in which the encoder 300 can determine whether all the frames have been processed for a sequence or bitstream. If all of the frames have been processed, then the method may end. Otherwise, the method may proceed to step 1406 and the encoder may repeat steps 1406 and 1408.

Returning to step 1408, introduced above, if the encoder 300 determines that the currently processed frame need not be an AVC compatible view, then the method may proceed to step 1422 in which the encoder 300 may determine whether the currently processed frame is to be an MVC compatible view. If the currently processed frame is to be an MVC compatible view, then the method may proceed to step 1424 in which the encoder 300 may encode the next slice of the currently processed frame.

At step 1426, the encoder may encapsulate the current slice into a NAL unit with a NAL unit type of, for example, 20.

At step 1428, the encoder 300 can write the NAL unit in which the current slice is encapsulated at step 1426.

At step 1430, the encoder 300 can determine whether it has reached the end of the current frame. If the encoder has not reached the end of the current frame, then the method may proceed to step 1424 and the encoder 300 may repeat steps 1424-1430. If the encoder has reached the end of the current frame, then the method may proceed to step 1420, in which the encoder 300 can determine whether all the frames have been processed for a sequence or bitstream. If all of the frames have been processed, then the method may end. Otherwise, the method may proceed to step 1406 and the encoder may repeat steps 1406 and 1408.

Returning to step 1422, if the encoder 300 determines that the currently processed frame need not be an MVC compatible view, then the method may proceed to step 1432, in which encoder 300 may encode the next slice of the current frame.

At step 1434, the encoder may encapsulate the current slice into a NAL unit with a NAL unit type of, for example, 21.

At step 1436, the encoder 300 can write the NAL unit in which the current slice is encapsulated at step 1434.

At step 1440, the encoder 300 can determine whether it has reached the end of the current frame. If the encoder has not reached the end of the current frame, then the method may proceed to step 1432 and the encoder 300 may repeat steps 1432-1440. If the encoder has reached the end of the current frame, then the method may proceed to step 1420, in which the encoder 300 can determine whether all the frames have been processed for a sequence or bitstream. If all of the frames have been processed, then the method may end. Otherwise, the method may proceed to step 1406 and the encoder may repeat steps 1406 and 1408.

It should be understood that the encoding steps 1410, 1424 and 1432 and decoding steps 1314, 1328 and 1338 can be performed in accordance with a variety of different coding methods and standards that permit conformance with the structures and features of embodiments discussed above with respect to, for example, FIGS. 10 and 12.

Moreover, with the introduction of new NAL unit type 21 for 3DV layers, special coding techniques can be defined for different 3DV layers which utilize their different characteristics. For example, the decoding of a 2D view may depend on the decoding of its depth map when the depth map is used to find a prediction block in a reference picture. Further, other such dependencies can be employed, as discussed above.

It should also be noted that with the novel NAL unit type 21, a 3DV view/layer can be coded with 3dv_slice_layer_extension_rbsp( ) as in Table 10, where 3dv_slice_header( ) and 3dv_slice_data( ) may include a modified slice_header( ) and slice_data( ).

TABLE 10

3DV slice layer

| 3dv_slice_layer_extension_rbsp( ) { | C | Descriptor |
|---|---|---|
| 3dv_slice_header( ) | 2 | |
| 3dv_slice_data( ) | 2\|3\|4 | |
| rbsp_slice_trailing_bits( ) | 2 | |
| } | | |

It should also be understood that, although embodiments 1-3 have been described separately, one or more of the embodiments can be combined in a variety of ways, as understood by those of ordinary skill in the relevant technical art in view of the teachings provided herein. For example, different slices of the same frame can be encoded in different ways. For example, certain slices of a frame can be encoded in an MVC compatible way according to embodiments 1 and/or 2, while other slices can be encoded using a non-MVC encoding mode in accordance with embodiment 3. In addition, MVC according to embodiments 1 and/or 2 can be employed for encoding certain layers of a 3DV view, such as, for example, a 2D view, while non-MVC modes according to embodiment 3 may be applied to encode other layers of the 3DV view, such as, for example, an occlusion view. Here, NAL units 16 with NAL units 1 and/or 5 may be applied to some layers of one or more 3DV views while NAL units 21 may be applied to other layers of one or more 3DV views.

Embodiment 4: Reference Picture List Construction

As indicated above, embodiments may be directed to a reference picture list construction process. In the embodiment discussed herein below, each picture has its own reference picture list. However, other implementations may provide reference picture lists that are specific to (and used for) multiple pictures. For example, a reference picture list may be allocated to an entire sequence of pictures in time, or an entire set of pictures across multiple views at a given point in time, or a subset of a picture. For example, a subset of a picture may be composed of a slice or a single macroblock or a sub-macroblock. The inputs of this reference picture list construction process are the inter_view_flag from the NAL unit header and view dependency information decoded from the sequence parameter set. It should be understood that both encoder 300 of FIG. 3 and decoder 400 of FIG. 4 can be configured to construct the reference picture list to encode and decode a bitstream, respectively, by employing the teachings described herein below.

In a first phase in the process, the temporal reference pictures and inter-view reference pictures may be inserted into an initial reference picture list, RefPicListX (with X being 0 or 1), as may be done, for example, in AVC or MVC systems. The RefPicListX as defined in the AVC draft can serve as an example initial reference picture list. For example, Ref PicList0, with X being 0, can be used for the encoding or decoding of any type of predictively coded picture, while Ref PicList1, with X being 1, can be used for the encoding of decoding of bi-directionally coded pictures or B pictures. Thus, a B picture may have two reference picture lists, Ref PicList0 and RefPicList1, while other types of predictively coded pictures may have only one reference picture list, RefPicList0. Further, it should be noted that, here, a temporal reference corresponds to a reference to a picture that differs in time with the corresponding picture to which the reference list is allocated. For example, with reference to FIG. 11, a temporal reference may correspond to a reference to view 1104 for the encoding/decoding of view 1112. In turn, an inter-view reference may correspond to a reference to view 1104 for the encoding/decoding of view 1106. By inserting the temporal and inter-view reference pictures in a reference picture list, existing temporal and inter-view prediction techniques (for example, from AVC and/or MVC) are supported. As is known, AVC systems would include temporal reference pictures in the reference picture list, and MVC systems would further include inter-view reference pictures in the reference picture list.

A second phase in the process may comprise adding inter-layer reference pictures, which may be defined for each layer independently. One inter-layer prediction structure 1500 for embodiment 4 is provided in FIG. 15. The arrows in structure 1500 indicate the prediction direction. For example, the 2D video (view) layer 1502 (arrow from) of a particular view is used as reference for encoding the depth layer 1504 (arrow to) of the view. Accordingly, the inter-layer prediction structure may be used to determine which picture(s) may be used as a reference and, therefore, which picture(s) should be included in a reference picture list. In the structure 1500, the 2D video layer is also used as a reference for both the occlusion video layer 1506 and for the transparency layer 1510. In addition, the depth layer 1504 is used as a reference for the occlusion depth layer 1508.

Figure 15:
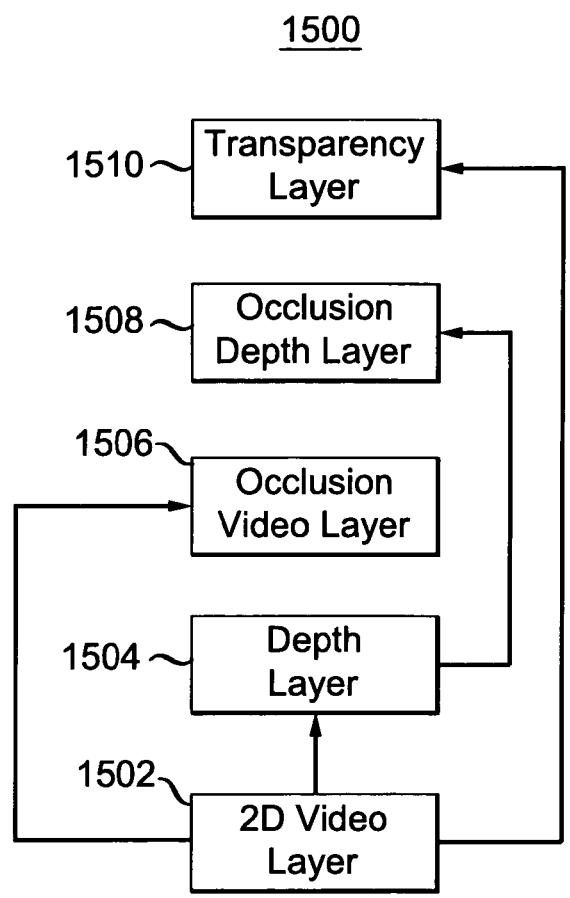
FIG. 15 is a block diagram illustrating an example of an inter-layer dependency structure.

As depicted in FIG. 15, for the inter-layer prediction structure 1500, each 3DV layer has at most one inter-layer reference. To encode a given layer, a layer with similar characteristics is used as reference. For example, with reference again to FIG. 2, the occlusion video layer 206 includes the background of the 2D video layer 202 while the occlusion depth layer 208 includes the background of the depth layer 204. Thus, to better exploit redundancy across layers, implementations may use the 2D video layer of a view as a reference for an occlusion layer of the view and may use a depth layer of the view as a reference for an occlusion depth layer of the view. Other implementations may permit multiple inter-layer references for a given 3DV layer.

For the 2D video layer picture, nothing need be done in the second phase, as inter-layer references need not be used in implementations for the 2D video layer picture. Other embodiments may indeed provide for inter-layer references for the 2D video layer. For example, the occlusion layer of a given view may be used as a reference for the 2D video layer of the reference. An advantage of avoiding the use of inter-layer references for the 2D view layers is that all the 2D view layers may be decoded by a conventional MVC decoder. It should be noted that in other implementations, a warped picture such as, for example, a synthesized virtual reference picture, can be appended to the reference list. With regard to the warped picture reference position in the reference list, the warped picture reference can be inserted at the beginning of the initial reference list with high synthesis quality or at the end of the reference list with moderate synthesis quality. Use of the warped picture in this way can improve coding efficiency.

Returning to FIG. 15, for the depth layer picture 1504, the 2D video layer picture 1502 (shown as the reference for the depth layer in FIG. 15) may be appended to the end of RefPicListX in the second phase. In various implementations, the 2D video picture reference is appended at the end of the reference list, rather than at the beginning of the reference list, because it is expected to have the least redundancy (compared to any of the first phase's temporal and inter-view references) and is expected to be the least likely to be used as a reference. Thus, here, the inter-layer reference is provided after any temporal and inter-view references in the reference picture list.

For the occlusion video layer picture 1506, the 2D video layer picture 1502 can be appended to the beginning of RefPicListX in the second phase. The 2D video picture can be appended at the beginning (prepended), before any temporal and inter-view references in the reference picture list, rather than at the end or in the middle, because the 2D video picture is expected to have the most redundancy of the available reference pictures and to be the most likely to be used as a reference.

For the occlusion depth layer picture 1508, the depth picture 1504 can be appended to the beginning of RefPicListX in the second phase, before any temporal and inter-view references in the reference picture list, due to a high level of redundancy expected (compared to any of the first phase's temporal and inter-view references) between the occlusion depth layer and the depth layer.

For the transparency layer picture 1510, the 2D video layer picture 1502 can be appended to the end of RefPicListX, after any temporal and inter-view references in the reference picture list, in the second phase due to a low level of redundancy (compared to any of the first phase's temporal and inter-view references) expected between the transparency layer and the 2D video layer.

More generally, inter-layer references for a picture can be inserted into the reference picture list for that picture at a position determined by how frequently that reference is used. For implementations in which a priority is assigned to each reference, the priority may be assigned based on how frequently that reference is used. As an example, one implementation encodes a picture by macroblocks, and each macroblock may or may not use a given reference from the reference picture list. For each macroblock of this implementation, a rate-distortion optimization is performed among various coding options, including different coding modes and different references. Thus, a given inter-layer reference might only be used in coding a subset of the macroblocks of the picture. The priority assigned to the given inter-layer reference may be determined based upon how many macroblocks use the inter-layer reference, as compared to how many macroblocks use the other references available in the reference picture list.

Figure 16:
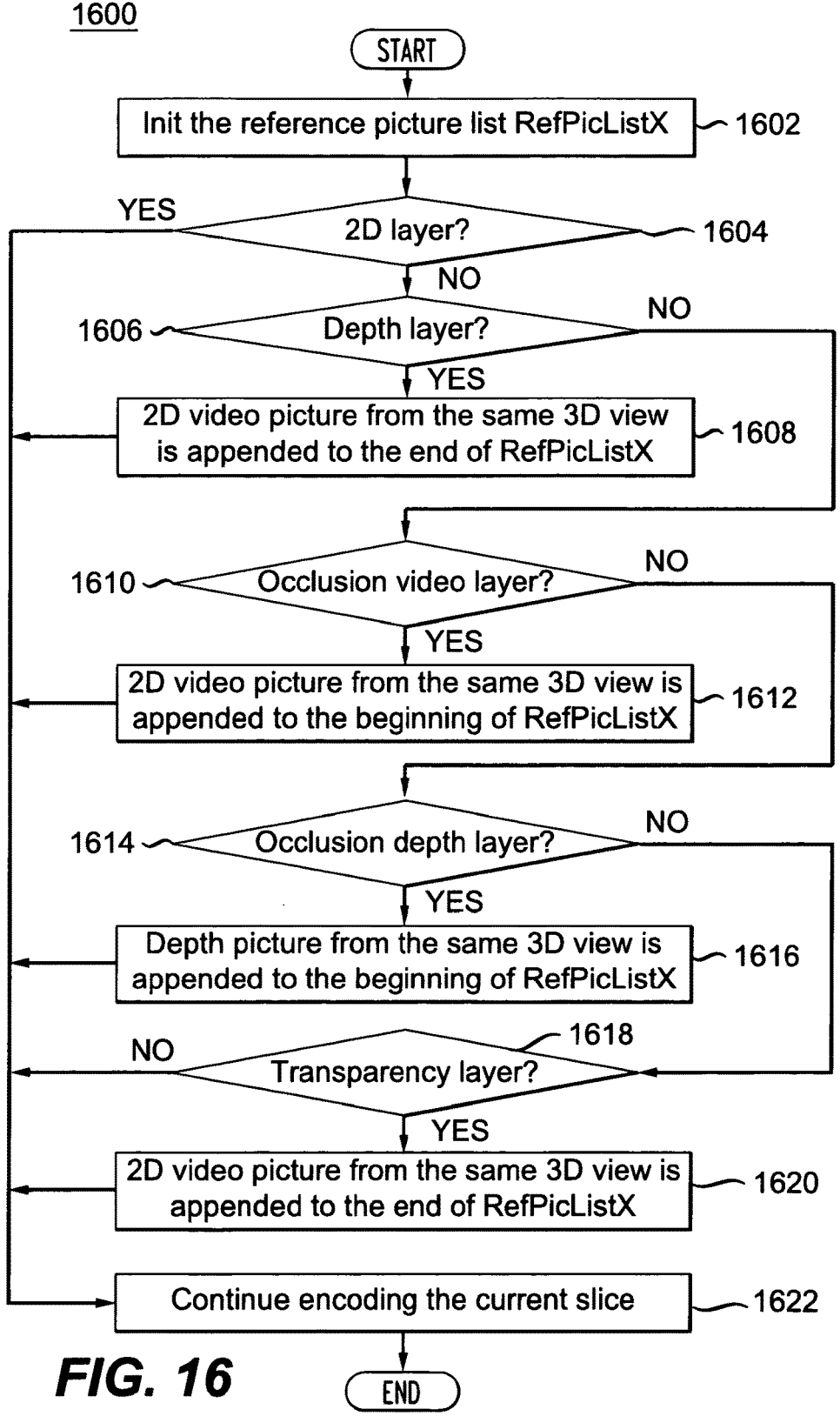
FIG. 16 is a flow diagram of an example of a method for constructing a reference picture list for an encoding process.
Figure 17:
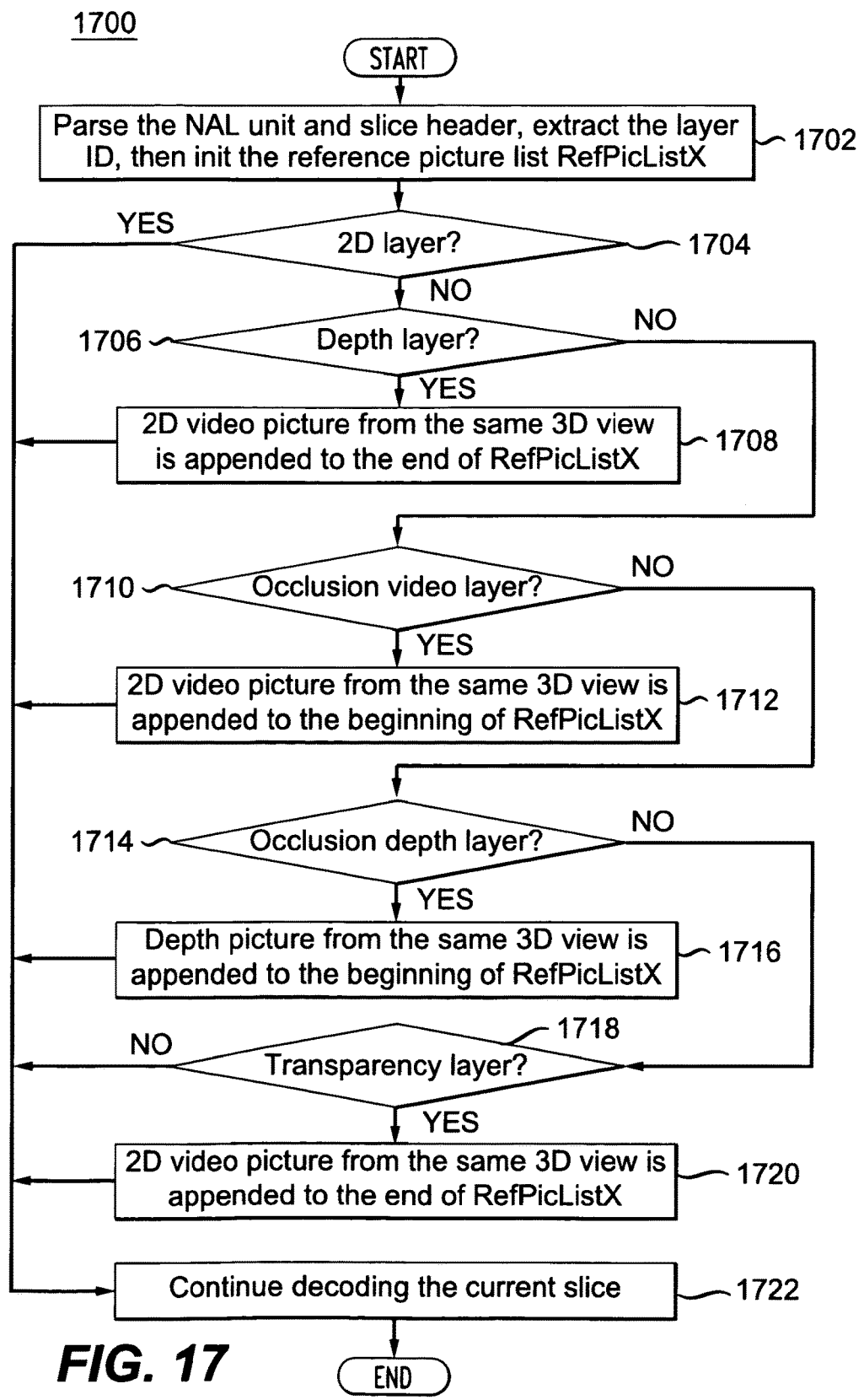
FIG. 17 is a flow diagram of an example of a method for constructing a reference picture list for a decoding process.

With reference now to FIGS. 16 and 17, methods 1600 and 1700 for constructing a reference picture list for an encoding and decoding process, respectively, are illustrated. The method 1600 for constructing a reference picture list for an encoding process in accordance with one implementation of embodiment 4 may be performed by encoder 300 of FIG. 3. For example, the 3DV Reference Buffer 316 may be configured to implement method 1600.

Method 1600 may begin at step 1602, in which the encoder 300 may initialize the reference picture list, RefPicListX. As noted above, the RefPicListX may be initialized in accordance with the AVC draft, with X being 0 or 1. For example, as indicated above, temporal and/or inter-view reference pictures may be inserted into the initial reference picture list.

At step 1604, the encoder 300 can determine whether the reference picture list is for a 2D video layer picture. If the reference picture list is for a 2D video layer picture, then the method may proceed to step 1622, at which the encoder 300 may continue encoding the slice currently being processed. Thereafter, the method may end or the method may repeat to construct a reference picture list for another 3DV layer picture. Alternatively, if the 3DV layer picture is a B picture, the method may repeat for the same 3DV layer picture to construct Ref PicList1.

If, at step 1604, the encoder 300 determines that the reference picture list is not for a 2D video layer picture, the method may proceed to step 1606, in which the encoder 300 may determine whether the reference picture list is for a depth layer picture. If the reference picture list is for a depth layer picture, then the method may proceed to step 1608, in which the 2D video layer picture from the same 3D view as the depth layer picture is appended to the end of the reference picture list. Thereafter, the method may proceed to step 1622, at which the encoder 300 may continue encoding the slice currently being processed. The method may then end or may repeat to construct a reference picture list for another 3DV layer picture. Alternatively, if the 3DV layer picture is a B picture, the method may repeat for the same 3DV layer picture to construct Ref PicList1.

If, at step 1606, the encoder 300 determines that the reference picture list is not for a depth layer picture, the method may proceed to step 1610, in which the encoder 300 may determine whether the reference picture list is for an occlusion video layer picture. If the reference picture list is for an occlusion video layer picture, then the method may proceed to step 1612, in which the 2D video layer picture from the same 3D view as the occlusion video layer picture is appended to the beginning of the reference picture list. Thereafter, the method may proceed to step 1622, at which the encoder 300 may continue encoding the slice currently being processed. The method may then end or may repeat to construct a reference picture list for another 3DV layer picture. Alternatively, if the 3DV layer picture is a B picture, the method may repeat for the same 3DV layer picture to construct Ref PicList1.

If, at step 1610, the encoder 300 determines that the reference picture list is not for an occlusion video layer picture, the method may proceed to step 1614, in which the encoder 300 may determine whether the reference picture list is for an occlusion depth layer picture. If the reference picture list is for an occlusion depth layer picture, then the method may proceed to step 1616, in which the depth layer picture from the same 3D view as the occlusion depth layer picture is appended to the beginning of the reference picture list. Thereafter, the method may proceed to step 1622, at which the encoder 300 may continue encoding the slice currently being processed. The method may then end or may repeat to construct a reference picture list for another 3DV layer picture. Alternatively, if the 3DV layer picture is a B picture, the method may repeat for the same 3DV layer picture to construct Ref PicList1.

If, at step 1614, the encoder 300 determines that the reference picture list is not for an occlusion depth layer picture, the method may proceed to step 1618, in which the encoder 300 may determine whether the reference picture list is for a transparency layer picture. If the reference picture list is for a transparency layer picture, then the method may proceed to step 1620, in which the 2D video layer picture from the same 3D view as the transparency layer picture is appended to the end of the reference picture list. Thereafter, the method may proceed to step 1622, at which the encoder 300 may continue encoding the slice currently being processed. The method may then end or may repeat to construct a reference picture list for another 3DV layer picture. Alternatively, if the 3DV layer picture is a B picture, the method may repeat for the same 3DV layer picture to construct RefPicList1. Similarly, if at step 1618, the encoder 300 determines that the layer is not a transparency layer picture, then the method may proceed to step 1622, at which the encoder 300 may continue encoding the slice currently being processed. The method may then end or may repeat to construct a reference picture list for another 3DV layer picture. Alternatively, if the 3DV layer picture is a B picture, the method may repeat for the same 3DV layer picture to construct RefPicList1.

Turning now to method 1700 of FIG. 17, the method 1700 for constructing a reference picture list for a decoding process in accordance with one implementation of embodiment 4 may be performed by decoder 400 of FIG. 4. For example, the 3DV reference/output buffer 414 may be configured to perform method 1700.

Method 1700 may begin at step 1702, in which the decoder 400 may parse a received NAL unit and slice header to extract the 3DV layer identifier. For example, the NAL unit may be the 3DV prefix unit 16 discussed above with regard to embodiment 1, the NAL prefix unit 14 and/or the NAL unit 20 of embodiment 2, and/or the NAL unit 21 of embodiment 3. Further, as indicated above, other information that may be extracted by decoder 400 from a bitstream including 3DV content received by the decoder 400 may include an inter_view_flag from a NAL unit header and view dependency information decoded from the sequence parameter set. Thereafter, the reference picture list, RefPicListX, can be initialized. As noted above, the Ref PicListX may be initialized in accordance with the AVC draft, with X being 0 or 1. For example, as indicated above, the inter_view_flag from NAL unit header and view dependency information decoded from the sequence parameter set may be employed to initialize the RefPicListX. In turn, temporal and/or inter-view reference pictures may be inserted into the initial reference picture list.

The remaining steps of method 1700 may be performed by the decoder 400 in the same manner discussed above with respect to method 1600, except that step 1622 is replaced with step 1722. For example, steps 1704-1720 may be performed by the decoder 400 in the same manner as steps 1604-1620 are performed by the encoder 300. However, at step 1722, the decoder continues to decode the currently processed slice as opposed to encoding the currently processed slice.

It should be understood that that inter-layer prediction structures with inter-layer dependencies other than that described above with respect to FIG. 15 can be easily conceived by one of ordinary skill in the art using the teachings provided above with regard to embodiment 4.

Accordingly, embodiment 4 can support different types of inter-layer prediction. Further, embodiment 4 adapts a reference picture list to an inter-layer prediction structure such as, for example, the structure described above with respect to FIG. 15. Consequently, embodiment 4 provides a reference picture list that is based on an inter-layer prediction structure of a system, while at the same time permits a conventional MVC decoder to extract 3DV content and format the content for display.

It should be noted that reference pictures can be organized so that they are compatible with an AVC system. For example, inter-layer and inter-view reference pictures can be multiplexed as temporally distinct pictures.

Embodiment 5: Novel NAL Unit Type for Subset SPS 3DV

As indicated above, in at least one embodiment, the SPS can be extended such that new sequence parameters for a 3DV format can be signaled. The extended SPS for 3DV is referred herein below as the "subset SPS 3DV". In embodiment 5, a novel NAL unit type for the subset SPS 3DV can be employed. In embodiments 6 and 7, discussed below, how the subset SPS 3DV may be composed is described. It should be understood that the proposed parameters are not limited to be within SPS, but also can appear in a NAL unit header, a picture parameter set (PPS), supplemental enhancement information (SEI), a slice header, and any other high level syntax element. Embodiments may also use low-level syntax and out-of-band information.

Here, in embodiment 5, a novel NAL unit type can be used to indicate the subset SPS 3DV. The NAL unit type number in this embodiment may be any one of the values not allocated in Table 3 above, which, as stated above, has been transcribed from the AVC draft. Moreover, the novel NAL unit type number allocated for the VCL NAL units for 3DV layers should also be selected in a manner different from the novel NAL unit types described above with regard to embodiments 1 and 3. As a result, 17 is selected as the NAL unit type number for subset SPS 3DV, which is represented as subset_seq_parameter_set_3dv_rbsp( ) in Table 11, below. Of course, other NAL unit type numbers may be selected. If embodiments are not to be combined, then NAL unit types 16 or 21 could also be used instead of 17. The rows for nal_unit_type 17 and nal_unit_type 18 . . . 20 are newly added with respect to Table 2 above.

TABLE 11

NAL unit type codes, syntax element categories, and NAL unit type classes

| nal_unit_type | Content of NAL unit and RBSP syntax structure | C | Annex A NAL unit type class | Annex G and Annex H NAL unit type class |
|---|---|---|---|---|
| 0 ... 16 | As defined in Table 2 | | | |
| 17 | subset_seq_parameter_set_3dv_rbsp( ) | | non-VCL | non-VCL |
| 18 ... 20 | Reserved | | | |
| 21 | Coded 3DV slice extension 3dv_slice_layer_extension_rbsp( ) | 2, 3, 4 | non-VCL | VCL |
| 22 ... 23 | Reserved | | non-VCL | non-VCL |
| 24 ... 31 | As defined in Table 2 | | non-VCL | non-VCL |

The novel NAL unit type can permit an MVC decoder or a 3DV decoder to determine whether to discard or to parse the content within the subset SPS 3DV. Because the type 17 is reserved under MVC, an MVC decoder can choose to ignore or discard the data in this NAL unit. A 3DV decoder, however, can parse the data in the unit, which permits the 3DV decoder to decode the 3DV supplemental layers.

For a smart network device, for example, a router, which can recognize the novel NAL unit type, the network device may select to discard the subset SPS 3DV should the network provider determine that the 3DV supplemental layers should not be transmitted under particular circumstances. Alternatively or additionally, the content in the subset SPS 3DV can be parsed and utilized to adapt the streaming to the network bandwidth available. For example, with the knowledge of the 3DV layer prediction structure, the 3DV layers which are not used as references may be discarded by the network device (for example, either a streaming server or a router) when the network suffers from bursty traffic.

A bitstream extractor, also referred to as a stream server, may also be used to extract various portions of a 3DV stream. The above router parsed a bitstream and made decisions about whether or not to forward (transmit) various 3DV layers. A bitstream extractor may also parse the bitstream, and make forwarding decisions based on priority, but may also tailor the extracted bitstream (also called a sub-bitstream) to a downstream device. For example, the bitstream extractor may extract only 2D video and depth layers, because the downstream receiver does not use occlusion or transparency layers. Further yet, the bitstream extractor may extract only the layers corresponding to the first two views that are in the bitstream, because the downstream receiver does not use more than two views. Additionally, however, the bitstream extractor may be capable of analyzing the 3DV SPS, as well as any MVC SPS, or other dependency information, to determine if the 2D video or depth layers use any of the occlusion or transparency layers as inter-layer references, and to determine if the first two views use any of the other views as inter-view references. If other layers or views are needed for proper decoding of the desired 3DV layers, which are the 2D video and depth layers for the first two views, then the bitstream extractor will also extract those layers and/or views.

Note that priority information for a 3DV layer and 3DV view may be determined by a router, or bitstream extractor. However, such priority information may also be provided in the bitstream, for example, by being placed in the NAL unit header. Such priority information may include, for example, temporal level ID, priority ID, view ID, as well as a priority ID related to 3DV information.

Figure 18:
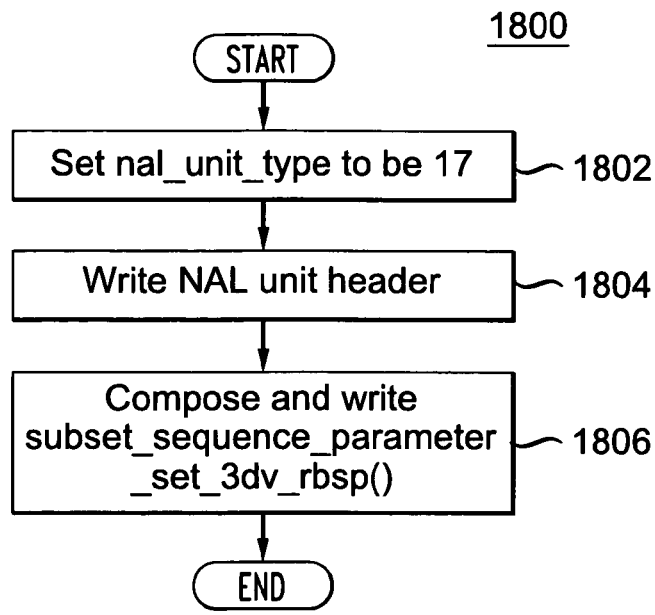
FIG. 18 is a flow diagram of an example of a method for encoding NAL units for an extended sequence parameter set for 3DV content.
Figure 19:
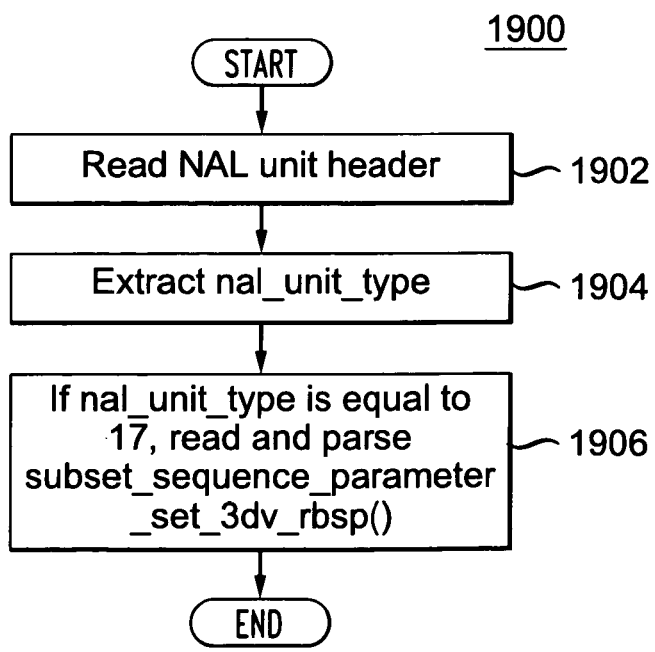
FIG. 19 is a flow diagram of an example of a method for decoding NAL units for an extended sequence parameter set for 3DV content.

With reference now to FIGS. 18 and 19, methods 1800 and 1900 for encoding and decoding, respectively, NAL units for subset SPS 3DV information in accordance with implementations of embodiment 5 are illustrated. Methods 1800 and 1900 can be performed, for example, by the 3DV reference buffer 316 of encoder 300 and by the 3DV reference buffer 414 of the decoder 400, respectively.

Method 1800 may begin, for example, at step 1802, in which the encoder 300 may set a NAL unit type for a NAL unit to be 17. At step 1804, the encoder 300 may write the NAL unit header. Thereafter, at step 1806, encoder 300 can compose and write the SPS. For example, the SPS may correspond to subset_sequence_parameter_set_3dv_rbsp( ) and may be composed and written as discussed below with respect to embodiments 6 and 7.

Method 1900 may begin, for example, at step 1902, in which the decoder 400 may receive a NAL unit and read the NAL unit header. The NAL unit may correspond to the NAL unit encoded in method 1800. At step 1904, the decoder 400 may extract the NAL unit type. If the NAL unit type is set to 17, then the encoder can read and parse the SPS. The SPS may, for example, correspond to subset_sequence_parameter_set_3dv_rbsp( ) and may be read and parsed as discussed below with respect to embodiments 6 and 7.

Embodiment 6: Extension of SPS to Signal Parameters for 3DV Applications

As discussed above with regard to embodiments 1-4, 3DV supplemental layers may be employed to support enhanced 3D rendering capability, and thus the 3DV layer identification number (3dv_layer_id) can be signaled in the SPS. Further, as discussed above, in order to remove inter-layer redundancy, inter-layer coding can be utilized and inter-layer pictures can be added into the reference picture list to facilitate inter-layer coding. Thus, to permit the decoder to determine how to decode pictures with inter-layer references, an encoder may specify the inter-layer prediction structure in the SPS. Such an inter-layer prediction structure may, for example, correspond to structure 1500 discussed above with regard to FIG. 15.

Prior to discussing SPS construction in detail, it should be noted that in accordance with various implementations, a novel profile may be employed for a bitstream that supports 3DV content. ITU-T, "Advanced Video Coding for Generic audiovisual Services—Recommendation ITU-T H.264", March 2009, hereinafter referred to as "updated AVC draft," provides a discussion of profiles and is incorporated herein by reference. In one or more implementations, the profile_idc can be set to 218. The updated AVC draft describes other existing profiles in AVC/MVC.

Table 12, provided below, details the process undergone for the function subset_sequence_parameter_set_3dv_rbsp( ) mentioned above with regard to embodiment 5. In particular, Table 12, at the statement else if(profile_idc==218){ . . . }, illustrates one high level implementation of subset SPS 3DV in accordance with embodiment 6. The detailed signaling can be implemented in the function of seq_parameter_set_3dv_extension( ) as shown, for example, in Table 13 below. Profile_idc of 218 represents a new profile for the MVC standard, and is a 3DV profile.

TABLE 12

| subset_seq_parameter_set_3dv_rbsp( ) | | |
|---|---|---|
| subset_seq_parameter_set_3dv_rbsp( ) { | C | Descriptor |
| seq_parameter_set_data( ) | 0 | |
| if( profile_idc = = 83 \|\| profile_idc = = 86 ) { | | |
| seq_parameter_set_svc_extension( ) /* specified in Annex G updated AVC draft */ | 0 | |
| svc_vui_parameters_present_flag | 0 | u(1) |
| if( svc_vui_parameters_present_flag = = 1 ) | | |
| svc_vui_parameters_extension( ) /* specified in Annex G of updated AVC draft */ | 0 | |
| } else if( profile_idc = = 118) { | | |
| bit_equal_to_one /* equal to 1 */ | 0 | f(1) |
| seq_parameter_set_mvc_extension( ) /* specified in Annex H of updated AVC draft */ | 0 | |
| mvc_vui_parameters_present_flag | 0 | u(1) |
| if( mvc_vui_parameters_present_flag = = 1 ) | | |
| mvc_vui_parameters_extension( ) /* specified in Annex H of updated AVC draft*/ | 0 | |
| } else if( profile_idc = = 218 ) { | | |
| bit_equal_to_one /* equal to 1 */ | 0 | f(1) |
| seq_parameter_set_3dv_extension( ) /* specified in Table 13 or 14 */ | 0 | |
| } | | |
| Additional_extension2_flag | 0 | u(1) |
| if( additional_extension2_flag = = 1 ) | | |
| while( more_rbsp_data( ) ) | | |
| additional_extension2_data_flag | 0 | u(1) |
| rbsp_trailing_bits( ) | 0 | |
| } | | |

Figure 20:
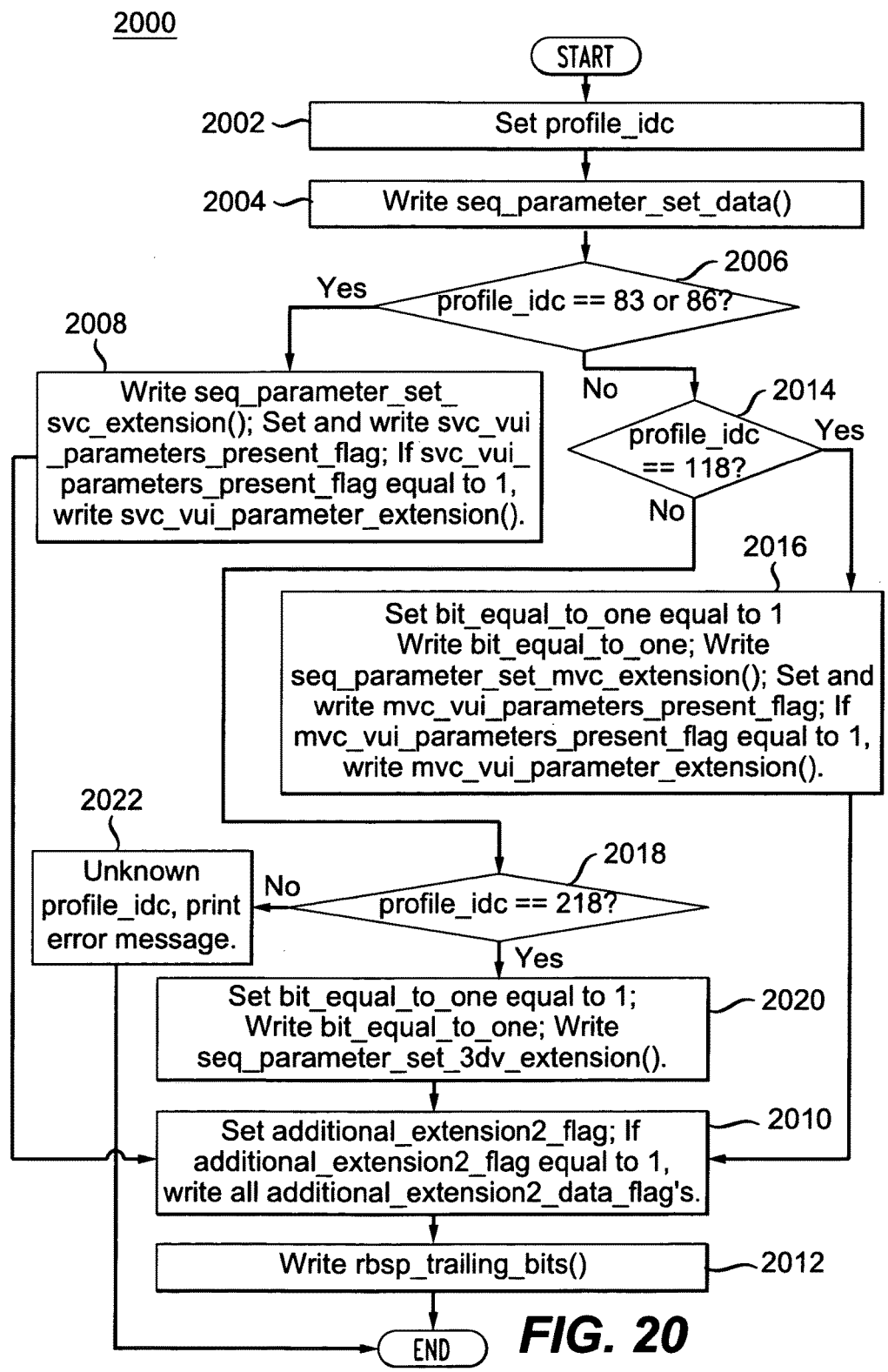
FIG. 20 is a flow diagram for an example of a method for encoding a sequence parameter set with extensions.
Figure 21:
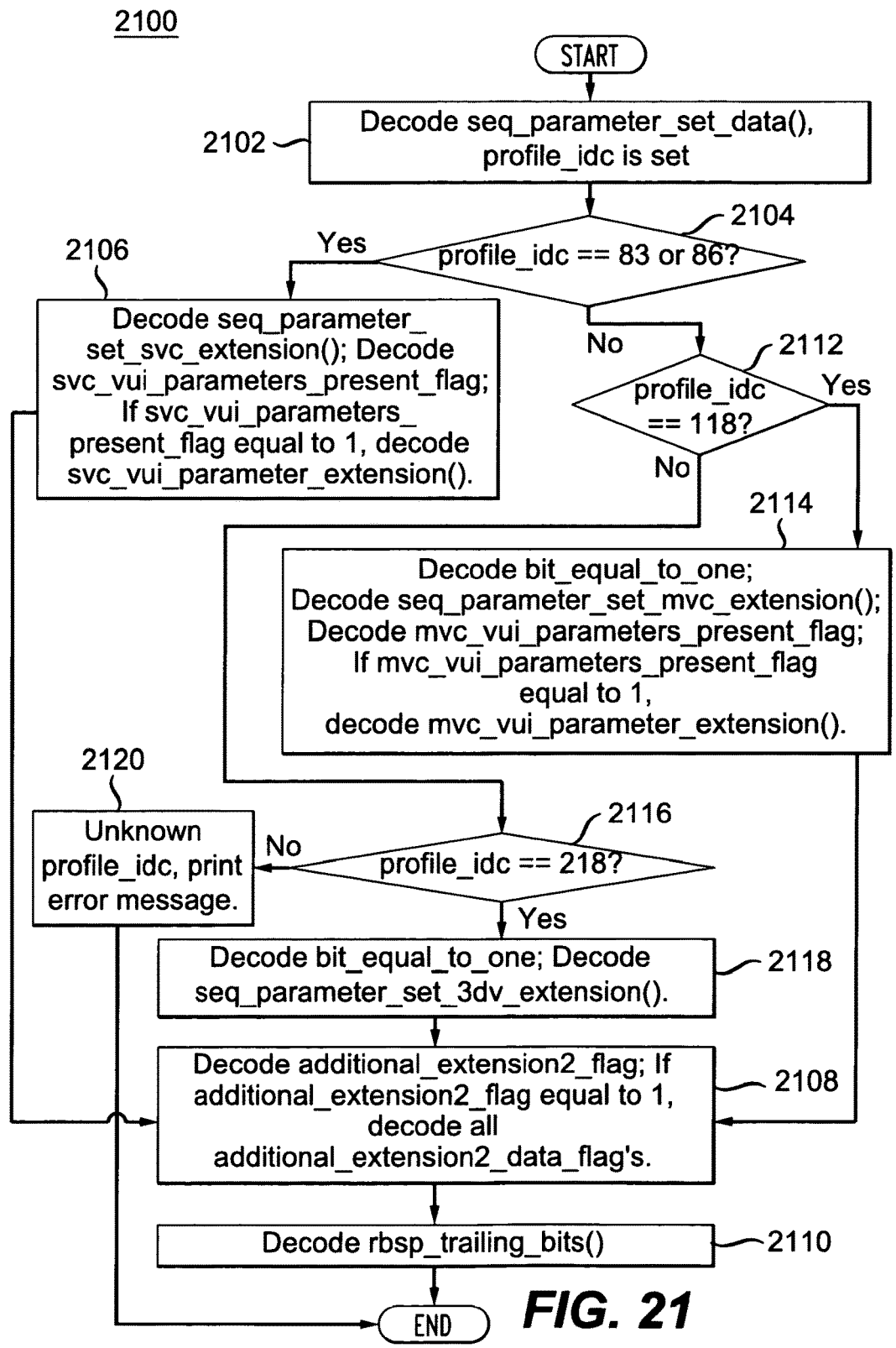
FIG. 21 is a flow diagram for an example of a method for decoding a sequence parameter set with extensions.

FIGS. 20 and 21 illustrate a high level flow diagram for methods for encoding 2000 and decoding 2100, respectively, an SPS in accordance with various implementations of embodiment 6. Methods 2000 and 2100 encode and decode, respectively, SPS in the form given by, for example, Table 12. Table 12 could be used for example, with NAL unit type 17. It should be noted that encoder 300 of FIG. 3 can be configured to perform method 2000 and decoder 400 of FIG. 4 can be configured to perform method 2100.

Method 2000 can begin at step 2002, in which the encoder 300 may set the profile_idc. As indicated above, the profile_idc may, for example, be set to 218 for subset SPS 3DV.

At step 2004, the encoder 300 may write sequence parameter set data. For example, such data may correspond to any SPS data described in the updated AVC draft with respect to the seq_parameter_set_data( ) syntax structure.

At step 2006, the encoder 300 may determine whether the profile_idc is set to 83 or 86. If the profile_idc is set to 83 or 86, then the method may proceed to step 2008, at which the encoder 300 may write the seq_parameter_set_svc_extension( ) set and write the svc_vui_parameters_present_flag, as discussed in the updated AVC draft. In addition, at step 2008, if the svc_vui_parameters_present_flag is set to 1, then the encoder 300 may write the svc_vui_parameter_extension( ) as discussed in the updated AVC draft. Thereafter, the method may proceed to step 2010, which is discussed in more detail below.

Returning to step 2006, if the profile_idc is not set to 83 or 86, then the method may proceed to step 2014, at which the encoder 300 may determine whether the profile_idc is set to 118. If the profile_idc is set to 118, then the method may proceed to step 2016, at which the encoder 300 may set bit_equal_to_one equal to 1, write bit_equal_to_one, write the seq_parameter_set_mvc_extension( ) and set an the mvc_vui_parameters_present_flag, as described in the updated AVC draft. If the mvc_vui_parameters_present_flag is equal to 1, then the encoder 300 may write the mvc_vui_parameters_extension( ) as described in the updated AVC draft. Thereafter, the method may proceed to step 2010, which is discussed in more detail below.

If, at step 2014, the encoder 300 determines that the profile_idc is not set to 118, then the method may proceed to step 2018, in which the encoder 300 may determine whether the profile_idc is set to 218. If the profile_idc is not set to 218, then the method may proceed to step 2022, in which the encoder 300 can determine that the profile_idc is unknown and may output an error message.

However, if the profile_idc is set to 218, then the encoder 300 may perform step 2020, in which the encoder 300 may set bit_equal_to_one equal to 1 and write bit_equal_to_one. As noted above, bit_equal_to_one is described in the updated AVC draft. At step 2020, the encoder 300 may further write the seq_parameter_set_3dv_extension( ) which is described in more detail below with respect to Tables 13 and 14 and FIGS. 22-25. As discussed herein below, the seq_parameter_set_3dv_extension( ) can indicate or convey inter-layer dependencies to a decoder to permit the decoder to determine appropriate predictive references for pictures during their decoding. Thereafter, the method may proceed to step 2010.

At step 2010, the encoder 300 may set the additional_extension2_flag and, if the additional_extension2_flag is set to 1, then the encoder 300 may write all additional_extension2_data_flags, as discussed in the updated AVC draft. At step 2012, the encoder 300 may write rbsp_trailing_bits( ) as described in the updated AVC draft and thereafter the method may end.

Turning now to FIG. 21, illustrating a method 2100 for decoding an SPS, that may, for example, have been generated in accordance with method 2000, the method 2100 may begin at step 2102 in which the decoder 400 may decode the sequence parameter set data, seq_parameter_set_data( ) from a received bitstream and may set the profile_idc, as discussed in the updated AVC draft.

At step 2104, the decoder 400 may determine whether the profile_idc is set to 83 or 86. If the profile_idc is set to 83 or 86, then the method may proceed to step 2106, at which the decoder 400 may decode the seq_parameter_set_svc_extension( ) and decode the svc_vui_parameters_present_flag, as discussed in the updated AVC draft. In addition, at step 2106, if the svc_vui_parameters_present_flag is set to 1, then the decoder 400 may decode svc_vui_parameter_extension( ) as discussed in the updated AVC draft. Thereafter, the method may proceed to step 2108, which is discussed in more detail below.

Returning to step 2104, if the profile_idc is not set to 83 or 86, then the method may proceed to step 2112, at which the decoder 400 may determine whether the profile_idc is set to 118. If the profile_idc is set to 118, then the method may proceed to step 2114, at which the decoder 400 may decode bit_equal_to_one, decode the seq_parameter_set_mvc_extension( ) and decode the mvc_vui_parameters_present_flag, as described in the updated AVC draft. Additionally, if the mvc_vui_parameters_present_flag is et to 1, then the decoder 400 may decode the mvc_vui_parameters_extension( ) as described in the updated AVC draft. Thereafter, the method may proceed to step 2108, which is discussed in more detail below.

If, at step 2112, the decoder 400 determines that the profile_idc is not set to 118, then the method may proceed to step 2116, in which the decoder 400 may determine whether the profile_idc is set to 218. If the profile_idc is not set to 218, then the method may proceed to step 2120, in which the decoder 400 can determine that an unknown profile_idc has been read and may output an error message.

However, if the profile_idc is set to 218, then the decoder 400 may perform step 2118, in which the decoder 400 may decode bit_equal_to_one and may further decode the seq_parameter_set_3dv_extension( ) which is described in more detail below with respect to Tables 13 and 14 and FIGS. 22-25. Thereafter, the method may proceed to step 2108.

At step 2108, the decoder 400 may decode the additional_extension2_flag and, if the additional_extension2_flag is set to 1, then the decoder 400 may decode all additional_extension2_data_flags, as discussed in the updated AVC draft. At step 2110, the decoder 400 may decode rbsp_trailing_bits( ) as described in the updated AVC draft, and thereafter the method may end.

As mentioned above, Table 13 shows one implementation of seq_parameter_set_3dv_extension( ) where the 3dv_layer_id and the inter-layer prediction structure are signaled explicitly. Such an implementation provides a great deal of flexibility because different ordering of the 3DV layers and different inter-layer prediction structures can be specified.

TABLE 13

One implementation of seq_parameter_set_3dv_extension( )

| seq_parameter_set_3dv_extension( ) { | C | Descriptor |
|---|---|---|
|   seq_parameter_set_mvc_extension( ) | | |
|   num_3dv_layer_minus1 | | ue(v) |
|   for( i = 0; i <= num_3dv_layer_minus1; i++ ) | | |
|     3dv_layer_id[ i ] | | ue(v) |
|   for( i = 1; i <= num_3dv_layer_minus1; i++ ) { | | |
|     num_3dv_layer_refs_l0[ i ] | | ue(v) |
|     for( j = 0; j < num_3dv_layer_refs_l0[ i ]; j++ ) | | |
|       3dv_layer_ref_l0[ i ][ j ] | | ue(v) |
|     num_3dv_layer_refs_l1[ i ] | | ue(v) |
|     for( j = 0; j < num_3dv_layer_refs_l1[ i ]; j++ ) | | |
|       3dv_layer_ref_l1[ i ][ j ] | | ue(v) |
|   } | | |
| } | | |

The semantics of Table 13 are given as follows:
num_3dv_layer_minus1 plus 1 indicates the number of 3DV layers.
3dv_layer_id[ i ] specifies the $i^{th}$ 3DV layer identification number.
num_3dv_layer_refs_l0[ i ] specifies the number of inter-layer references in reference picture list 0 for the 3DV layer with 3DV layer identfication number being 3dv_layer_id[ i ].
3dv_layer_ref_l0[ i ][ j ] specifies the 3DV layer identification number which is used as the $j^{th}$ inter-layer reference in the reference picture list 0 for the 3DV layer with the 3DV layer identfication number being 3dv_layer_id[ i ].
num_3dv_layer_refs_l1[ i ] specifies the number of inter-layer references in reference picture list 1 for the 3DV layer with the 3DV layer identfication number being 3dv_layer_id[ i ].
3dv_layer_ref_l1[ i ][ j ] specifies the 3DV layer identification number which is used as the $j^{th}$ inter-layer reference in reference picture list 1 for the 3DV layer with 3DV layer identfication number being 3dv_layer_id[ i ].

Figure 22:
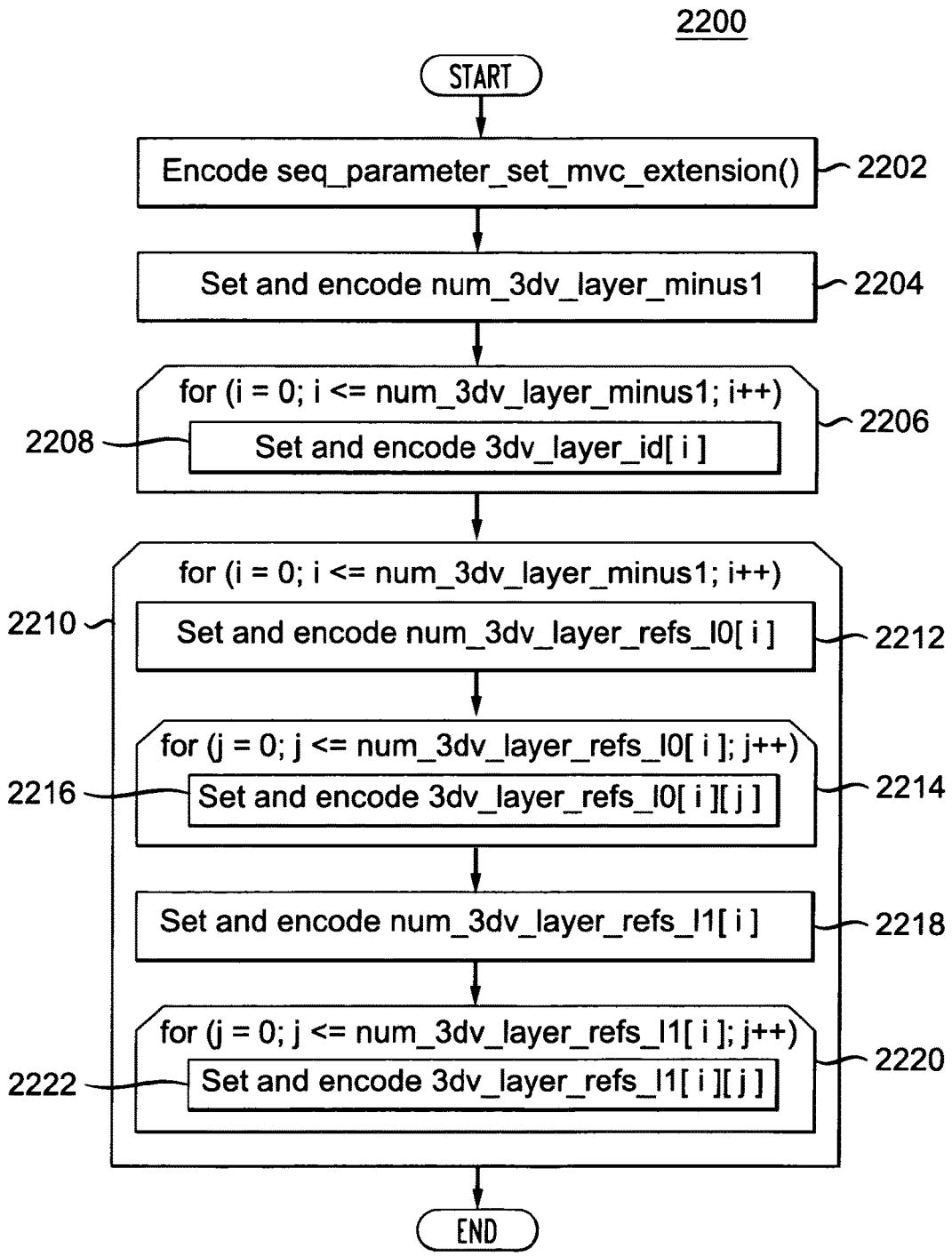
FIG. 22 is a block/flow diagram of an example of a first method for encoding a sequence parameter subset for an inter-layer dependency structure for 3DV content.
Figure 23:
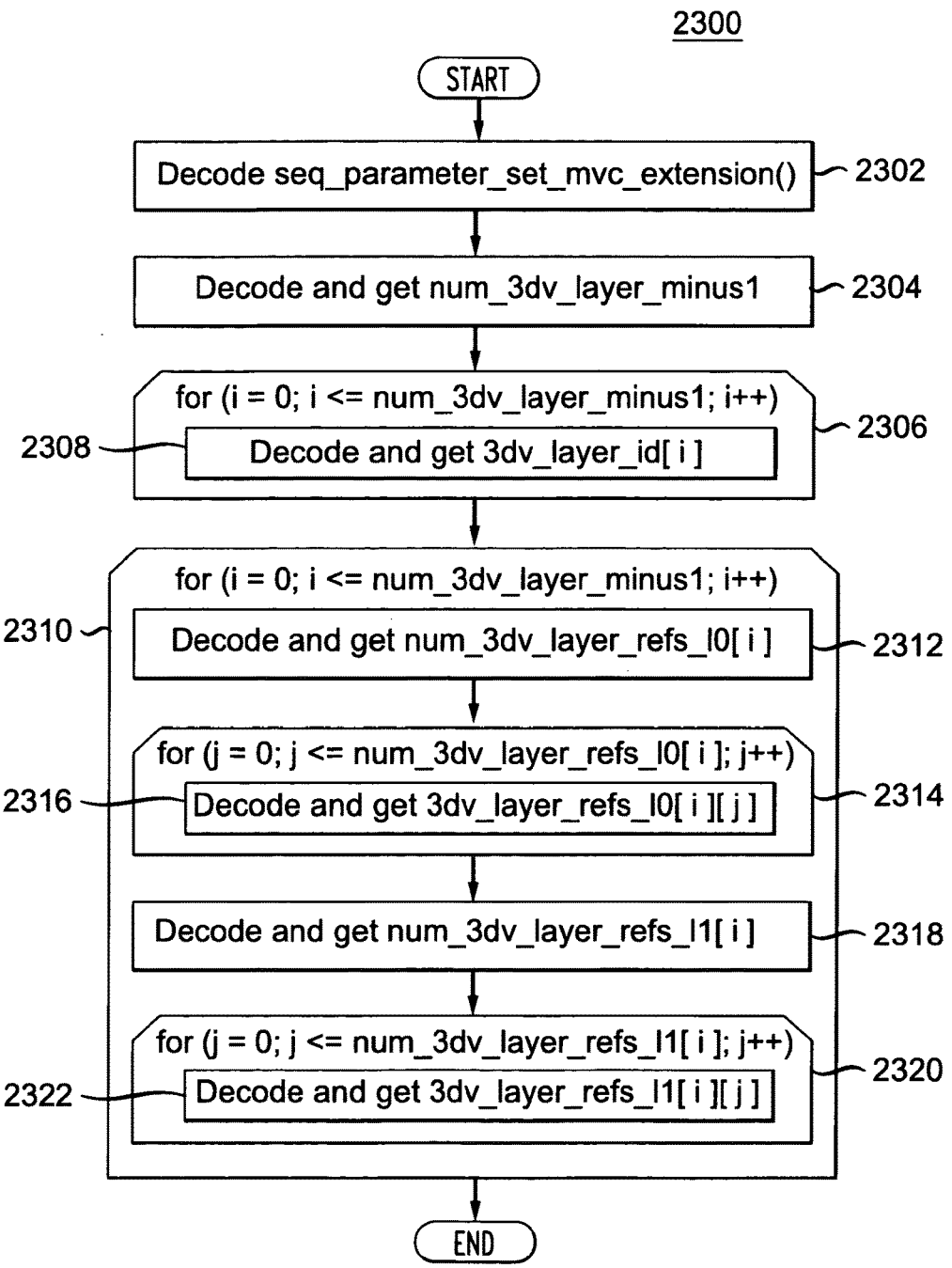
FIG. 23 is a block/flow diagram of an example of a first method for decoding a sequence parameter subset for an inter-layer dependency structure for 3DV content.

To better illustrate how the seq_parameter_set_3dv_extension( ) of Table 13 can be employed in embodiment 6, reference is made to FIGS. 22 and 23, illustrating methods for encoding 2200 and decoding 2300, respectively, subset SPS 3DV extension. It should be understood that method 2200 may be implemented by encoder 300 while method 2300 may be implemented by decoder 400.

Method 2200 may begin at step 2202, in which the encoder 300 may encode the seq_parameter_set_mvc_extension( ) which is described in the updated AVC draft.

At step 2204, the encoder 300 may set and encode num_3dv_layer_minus1. As provided above, num_3dv_layer_minus1 indicates the total number 3DV layers employed in a 3DV view of 3DV content to be encoded. For convenience in coding and decoding, the numeric value of num_3dv_layer_minus1 is one less than the actual number of 3DV layers.

As noted above, "i" denotes a 3DV layer id number. For example, the 3DV layer id may correspond to the 3DV layer ids defined in Table 1 above. Here, at step 2208, the encoder 300 may set and encode the 3DV layer IDs for each type of 3DV layer employed in the 3DV content to be encoded. Thus, the encoder 300 iteratively processes each 3DV layer id in loop 2206 until the total number 3DV layers employed in a 3DV view of 3DV content is reached.

At loop 2210, as noted in the first line of loop 2210, the encoder 300 successively processes each 3DV layer id in loop 2210 to set and encode 3DV inter-layer references for each 3DV layer for each reference picture list type, 0 and, potentially, 1. For example, at step 2212, the encoder 300 may set and encode the total number of inter-layer references (num_3dv_layer_refs_l0[i]) in reference picture list 0 for the 3DV layer (denoted by 'i') to which the reference picture list is allocated. It should be noted that the number of inter-layer references in any reference picture list is dependent on the inter-layer dependency structure employed. For example, in structure 1500 of FIG. 15, each 3DV layer has at most one inter-layer reference in a reference picture list allocated to the 3DV layer. However, other inter-layer dependency or prediction structures can be employed, such as the structure discussed herein below with respect to embodiment 7.

After the total number of inter-layer references for 3DV layer 'i' in reference picture list '0' is set, the encoder 300 may, at step 2216, set and encode the inter-layer references for reference picture list '0' of 3DV layer 'i.' In particular, the encoder 300 can specify the 3DV layer ids (3dv_layer_ref_l0[i][j]) of the inter-layer references in reference picture list '0' of 3DV layer 'i.' In FIG. 22, as well as Table 13, inter-layer references in reference picture list '0' of 3DV layer 'i' can be denoted by 'j,' such that step 2216 can be iterated in loop 2214 until the total number of inter-layer references for 3DV layer 'i' for reference picture list '0' has been reached.

The encoder 300 may further be configured to provide inter-layer references for any reference picture list '1' of 3DV layer 'i.' However, it should be understood that the following steps of method 2200 may be skipped should the particular 3DV layer 'i' not have a reference picture list '1.' If the 3DV layer 'i' has a reference picture list '1,' the method may proceed to step 2218, in which the encoder 300 may set and encode the total number of inter-layer references (num_3dv_layer_refs_l1[i]) in reference picture list 1 for the 3DV layer i to which the reference picture list '1' is allocated.

After the total number of inter-layer references for 3DV layer 'i' in reference picture list '1' is set, the encoder 300 may, at step 2222, set and encode the inter-layer references for reference picture list '1' of 3DV layer 'i.' In particular, the encoder 300 can specify the 3DV layer ids (3dv_layer_ref_l1[i][j]) of the inter-layer references in reference picture list '1' of 3DV layer 'i.' Similar to the discussion provided above with regard to reference picture list '0' for 3DV layer 'i,' inter-layer references in reference picture list '1' of 3DV layer 'i' can be denoted by 'j,' such that step 2222 can be iterated in loop 2220 until the total number of inter-layer references for 3DV layer 'i' for reference picture list '1' has been reached.

In addition, as indicated above, at loop 2210, steps 2212 and 2218 and loops 2214 and 2220 can be iterated for each layer of the 3DV layers employed in a 3DV view of 3DV content to be encoded until all such layers have been processed.

Turning now to FIG. 23, a method 2300 for decoding an SPS 3DV extension received in a bitstream using the seq_parameter_set_3dv_extension( ) is described. Method 2300 may begin at step 2302, in which the decoder 400 may decode the seq_parameter_set_mvc_extension( ) which is described in the updated AVC draft.

At step 2304, the decoder 400 may decode and obtain num_3dv_layer_minus1. As stated above, num_3dv_layer_minus1 indicates the total number 3DV layers employed in a 3DV view of 3DV content. As stated above, the numeric value of num_3dv_layer_minus1 is one less than the actual number of 3DV layers.

As noted above, "i" denotes a 3DV layer id number. For example, the 3DV layer id may correspond to the 3DV layer ids defined in Table 1 above. Here, at step 2308, the decoder 400 may decode and obtain the 3DV layer IDs for each type of 3DV layer employed in the 3DV content. Thus, the decoder 400 iteratively processes each 3DV layer id in loop 2306 until the total number 3DV layers employed in a 3DV view of 3DV content is reached and each 3DV layer id is obtained.

At loop 2310, as noted in the first line of loop 2310, the decoder 400 successively processes each 3DV layer id in loop 2310 to decode and obtain 3DV inter-layer references for each 3DV layer for each reference picture list type, 0 and, potentially, 1. For example, at step 2312, the decoder 400 may decode and obtain the total number of inter-layer references (num_3dv_layer_refs_I0[i]) in reference picture list 0 for the 3DV layer (denoted by 'i') to which the reference picture list is allocated. It should be noted that the number of inter-layer references in any reference picture list is dependent on the inter-layer dependency structure employed. For example, in structure 1500 of FIG. 15, each 3DV layer has at most one inter-layer reference in a reference picture list allocated to the 3DV layer. However, other inter-layer dependency or prediction structures can be employed, such as the structure discussed herein below with respect to embodiment 7.

After the total number of inter-layer references for 3DV layer 'i' in reference picture list '0' is obtained, the decoder 400 may, at step 2316, decode and obtain the inter-layer references for reference picture list '0' of 3DV layer 'i.' In particular, the decoder 400 can obtain the 3DV layer ids (3dv_layer_ref_I0[i][j]) of the inter-layer references in reference picture list '0' of 3DV layer 'i.' In FIG. 23, as well as Table 13, inter-layer references in reference picture list '0' of 3DV layer 'i' can be denoted by 'j,' such that step 2316 can be iterated in loop 2314 until the total number of inter-layer references for 3DV layer 'i' for reference picture list '0' has been reached.

The decoder 400 may further be configured to obtain inter-layer references for any reference picture list '1' of 3DV layer 'i.' However, it should be understood that the following steps of method 2300 may be skipped should the particular 3DV layer 'i' not have a reference picture list '1.' If the 3DV layer 'i' has a reference picture list '1,' the method may proceed to step 2318, in which the decoder 400 may decode and obtain the total number of inter-layer references (num_3dv_layer_refs_I1[i]) in reference picture list 1 for the 3DV layer to which the reference picture list '1' is allocated.

After the total number of inter-layer references for 3DV layer 'i' in reference picture list '1' is obtained, the decoder 400 may, at step 2322, decode and obtain the inter-layer references for reference picture list '1' of 3DV layer 'i.' In particular, the decoder 400 can specify the 3DV layer ids (3dv_layer_ref_I1[i][j]) of the inter-layer references in reference picture list '1' of 3DV layer 'i.' Similar to the discussion provided above with regard to reference picture list '0' for 3DV layer 'i,' inter-layer references in reference picture list '1' of 3DV layer 'i' can be denoted by 'j,' such that step 2322 can be iterated in loop 2320 until the total number of inter-layer references for 3DV layer 'i' for reference picture list '1' has been reached.

In addition, as indicated above, at loop 2310, steps 2312 and 2318 and loops 2314 and 2320 can be iterated for each layer of the 3DV layers employed in a 3DV view of 3DV content until all such layers have been processed. Thus, the decoder 400 may reconstruct the reference picture list(s) for each 3DV layer to thereby permit the decoder 400 to determine the inter-layer references for each 3DV layer picture received during decoding of the pictures.

It should be noted that when a network device parses the information on a 3DV layer and the prediction structure, it may allocate different priorities during transmission for the NAL units from different 3DV layers. Thus, when congestion occurs, some NAL units from "higher" 3DV supplemental layers (for example, higher 3D layer ids in Table 1) may be discarded to relieve the traffic.

Embodiment 7: Alternative Extension of SPS to Signal Parameters for 3DV Applications In certain implementations, because the potential numbers of 3DV layers used may be limited, and, in turn, because the content in the 3DV layers may have specific and consistent characteristics, the prediction structure used to encode and decode the 3DV may be preconfigured and known to both encoders and decoders. Thus, we need not signal and convey the specific prediction or inter-layer dependency structure in an explicit way, as for example, in Table 13 of embodiment 6. Rather, the inter-layer prediction structure may be known to both the encoder and decoder in embodiment 7, thereby simplifying the conveyance of the extended SPS for 3DV to the decoder. To provide a simple example, the following 3DV layers defined above are employed: 2D video layer, depth layer, occlusion video layer, occlusion depth layer, and transparency layer.

Below, an example of a predefined inter-layer prediction structure that can be employed in accordance with various implementations is provided. However, it should be understood that other predefined inter-layer prediction structures can be utilized in other implementations. In the structure, for a 2D video layer, no 3DV supplemental layers are used as inter-layer prediction references. For the depth layer, the 2D video layer is used as an inter-layer prediction reference. For the occlusion video layer, the 2D video layer and the depth layer are used as inter-layer references. For the occlusion depth layer, the 2D video layer and the depth layer are used as inter-layer references. For the transparency layer, the 2D video layer and the depth layer are used as inter-layer references.

Here in embodiment 7, because the inter-layer prediction structure can be pre-defined, the extended SPS for 3DV can simply convey whether a certain layer is present for each 3DV view as shown in Table 14. Accordingly, the seq_parameter_set_3dv_extension( ) can simply employ flags for each possible 3DV layer to indicate whether they are employed in each 3DV view in the 3DV content. Thus, the extended SPS for 3DV need not signal or convey the inter-layer prediction structure in any explicit way. In one implementation, the inter-layer prediction structure is constant and cannot be changed. In another implementation, the inter-layer prediction structure is set using Table 13, (for example, in an initial occurrence, or periodic occurrences, of Table 12), and otherwise Table 14 is used to communicate the extension information. It should be understood that Tables 12-14 may be retransmitted to the decoder as often as desired in accordance with design choice, and in one implementation are retransmitted only when there is a change to the information.

TABLE 14

A second implementation of seq_parameter_set_3dv_extension( )

| seq_parameter_set_3dv_extension( ) { | C | Descriptor |
|---|---|---|
| seq_parameter_set_mvc_extension( ) | | |
| for( i = 0; i <= num_views_minus1; i++) { | | |
| video_layer_flag[ i ] | | u(1) |
| depth_layer_flag[ i ] | | u(1) |
| occlusion_layer_video_flag[ i ] | | u(1) |
| occlusion_layer_depth_flag[ i ] | | u(1) |
| transparency_layer_flag[ i ] | | u(1) |
| } | | |
| } | | |

Figure 24:
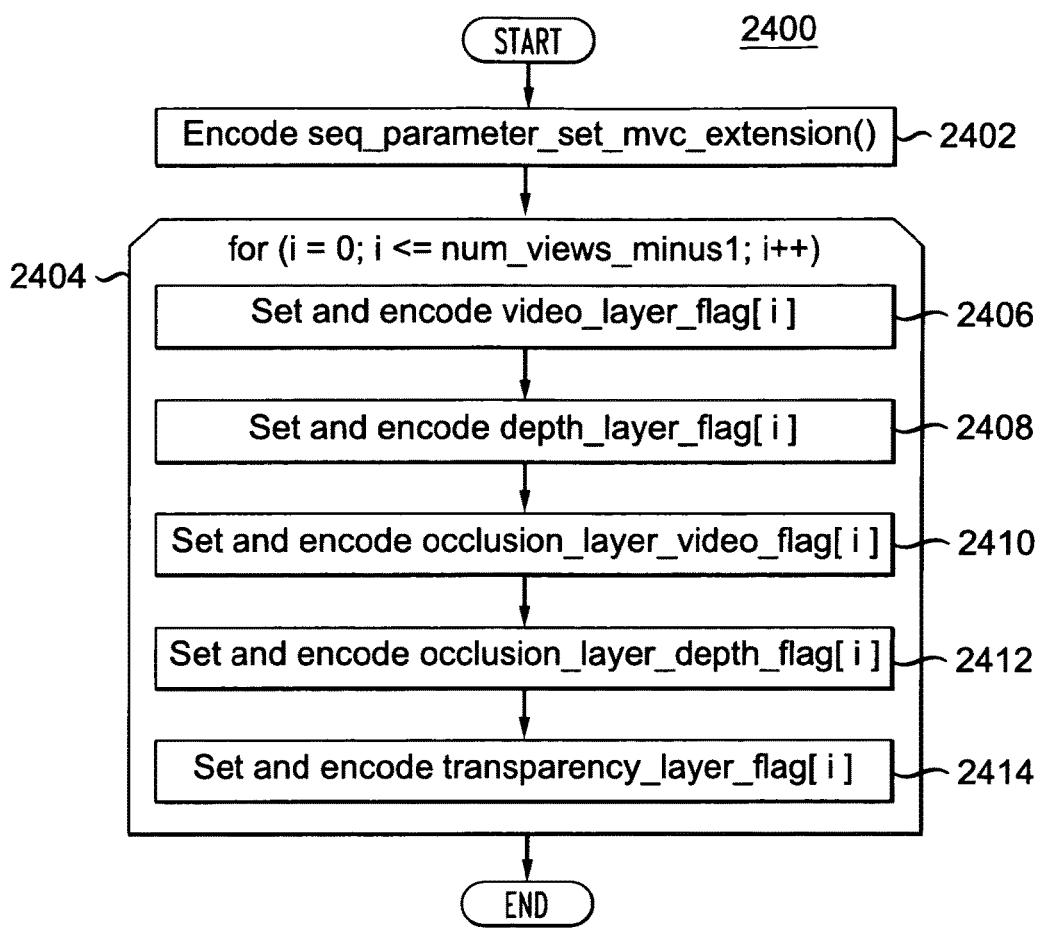
FIG. 24 is a block/flow diagram of an example of a second method for encoding a sequence parameter subset for an inter-layer dependency structure for 3DV content.
Figure 25:
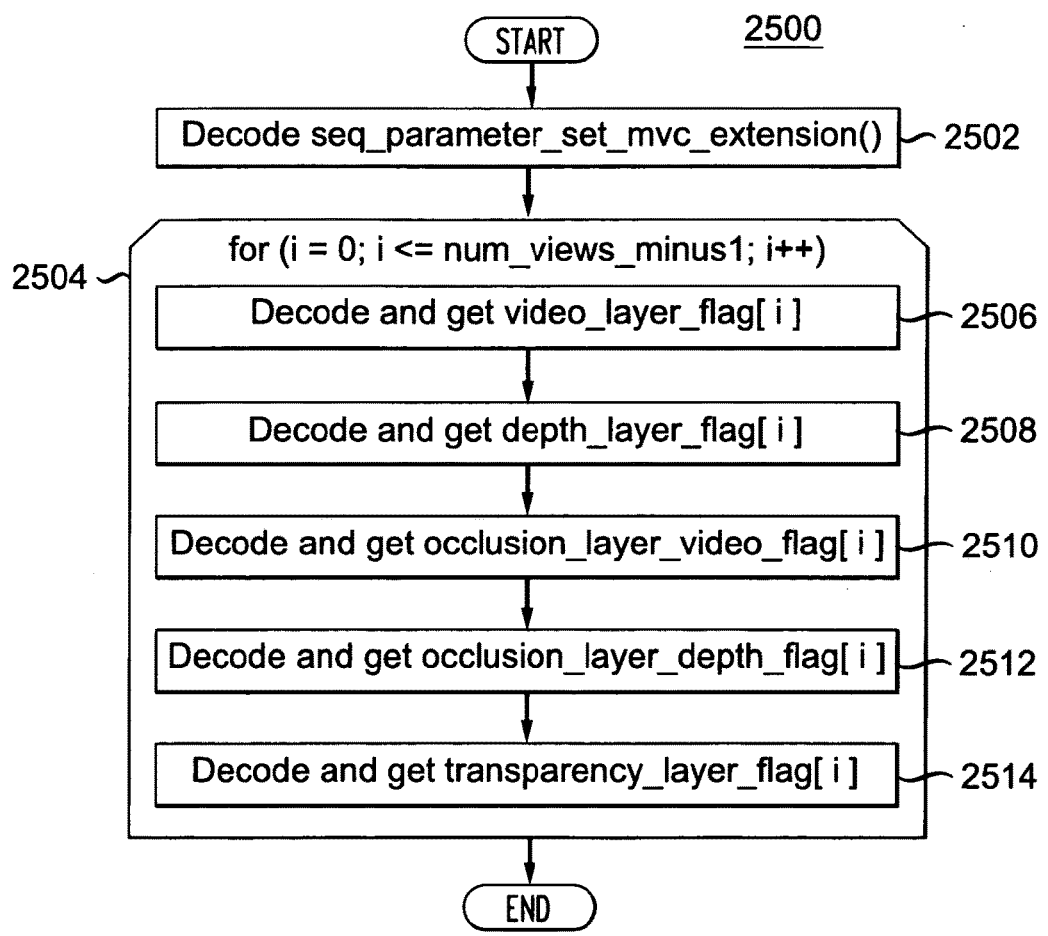
FIG. 25 is a block/flow diagram of an example of a second method for decoding a sequence parameter subset for an inter-layer dependency structure for 3DV content.

To better illustrate how the seq_parameter_set_3dv_extension( ) of Table 14 can be utilized in embodiment 7, reference is made to FIGS. 24 and 25, illustrating methods for encoding 2400 and decoding 2500, respectively, subset SPS 3DV. It should be understood that method 2400 may be implemented by encoder 300 while method 2500 may be implemented by decoder 400.

Method 2400 may begin at step 2402 in which the encoder 300 may encode the seq_parameter_set_mvc_extension( ) which is described in the updated AVC draft. The encoder 300 may then perform loop 2404, in which the encoder 300 may set the 3DV layer flags to indicate whether the respective 3DV layers are present for a particular 3DV view 'i.' For example, num_views_minus1 indicates the total number of 3DV views employed in the 3DV content. For example, in the examples provided in FIGS. 10-12, three 3DV views are employed (3DV view 0-3DV view 2). For convenience in coding and decoding, the numeric value of num_views_minus1 is one less than the actual number of 3DV views. The encoder 300 can iterate steps 2406-2414 for each 3DV view 'i' until the total number of 3DV views employed in the 3DV content is reached.

In particular, in loop 2404, the encoder 300 may set and encode the 2D video layer flag at step 2406 to indicate whether the 2D video layer is present in the 3DV view 'i,' may set and encode the (2D) depth layer flag at step 2408 to indicate whether the depth layer is present in the 3DV view 'i,' may set and encode the occlusion video layer flag at step 2410 to indicate whether the occlusion video layer is present in the 3DV view 'i,' may set and encode the occlusion depth layer flag at step 2412 to indicate whether the occlusion depth layer is present in the 3DV view 'i,' and may set and encode the transparency layer flag at step 2414 to indicate whether the transparency layer is present in the 3DV view 'i.'

Turning now to method 2500 for decoding subset SPS 3DV using Table 14, method 2500 may begin at step 2502 in which the decoder 400 may decode the seq_parameter_set_mvc_extension( ) which is described in the updated AVC draft. It should be noted that decoder 400 in method 2500 may receive a bitstream encoded by encoder 300 in accordance with method 2400. The decoder 400 may also perform loop 2504, in which the decoder 400 may decode the 3DV layer flags to determine whether the respective 3DV layers are present for a particular 3DV view 'i. ' For example, as discussed above with regard to method 2400, num_views_minus1 indicates the total number of 3DV views employed in received 3DV content. The decoder 400 can iterate steps 2506-2514 for each 3DV view 'i' until the total number of 3DV views employed in the 3DV content is reached.

In particular, in loop 2504, the decoder 400 may decode and obtain the 2D video layer flag at step 2506 to determine whether the 2D video layer is present in the 3DV view 'i,' may decode and obtain the (2D) depth layer flag at step 2508 to determine whether the depth layer is present in the 3DV view 'i,' may decode and obtain the occlusion video layer flag at step 2510 to determine whether the occlusion video layer is present in the 3DV view 'i,' may decode and obtain the occlusion depth layer flag at step 2512 to determine whether the occlusion depth layer is present in the 3DV view 'i,' and may decode and obtain the transparency layer flag at step 2514 to determine whether the transparency layer is present in the 3DV view 'i.'

As discussed above, the decoder 400 may reconstruct the reference picture list(s) for each 3DV layer in each 3DV view to thereby permit the decoder 400 to determine the inter-layer references for each 3DV layer picture received during decoding of the pictures.

Additional Embodiments

Figure 26:
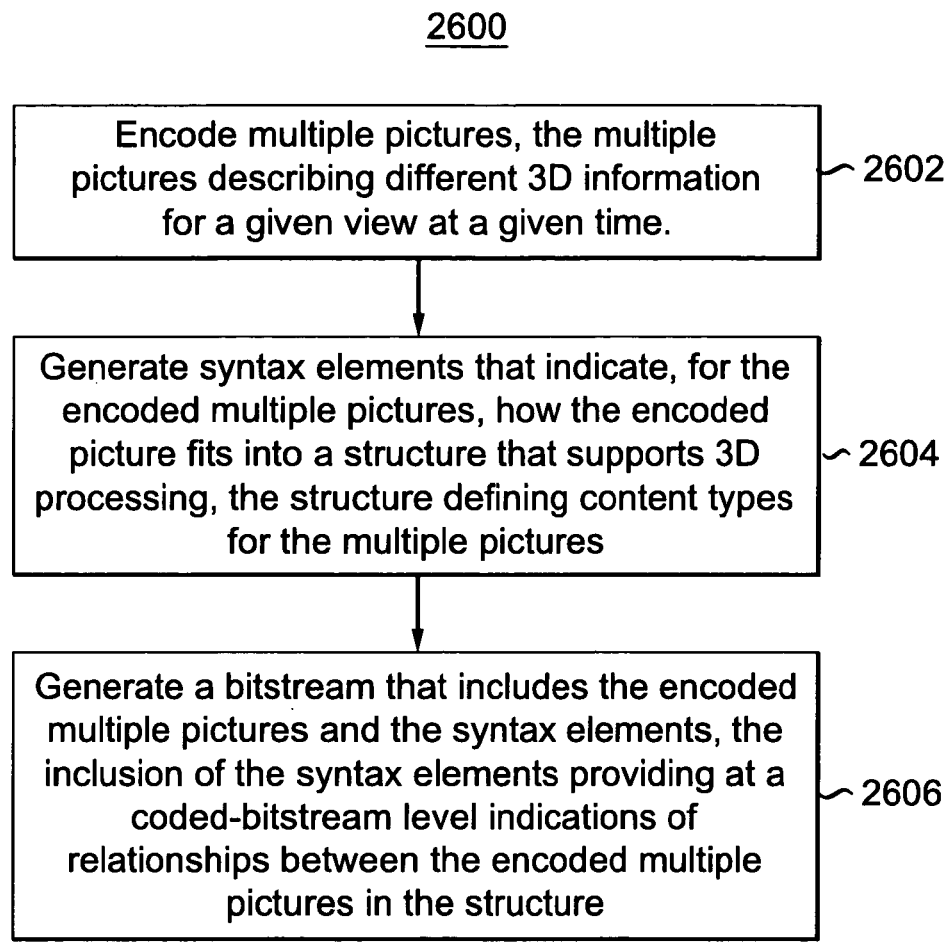
FIG. 26 is a flow diagram of an example of a method for encoding 3DV content.
Figure 27:
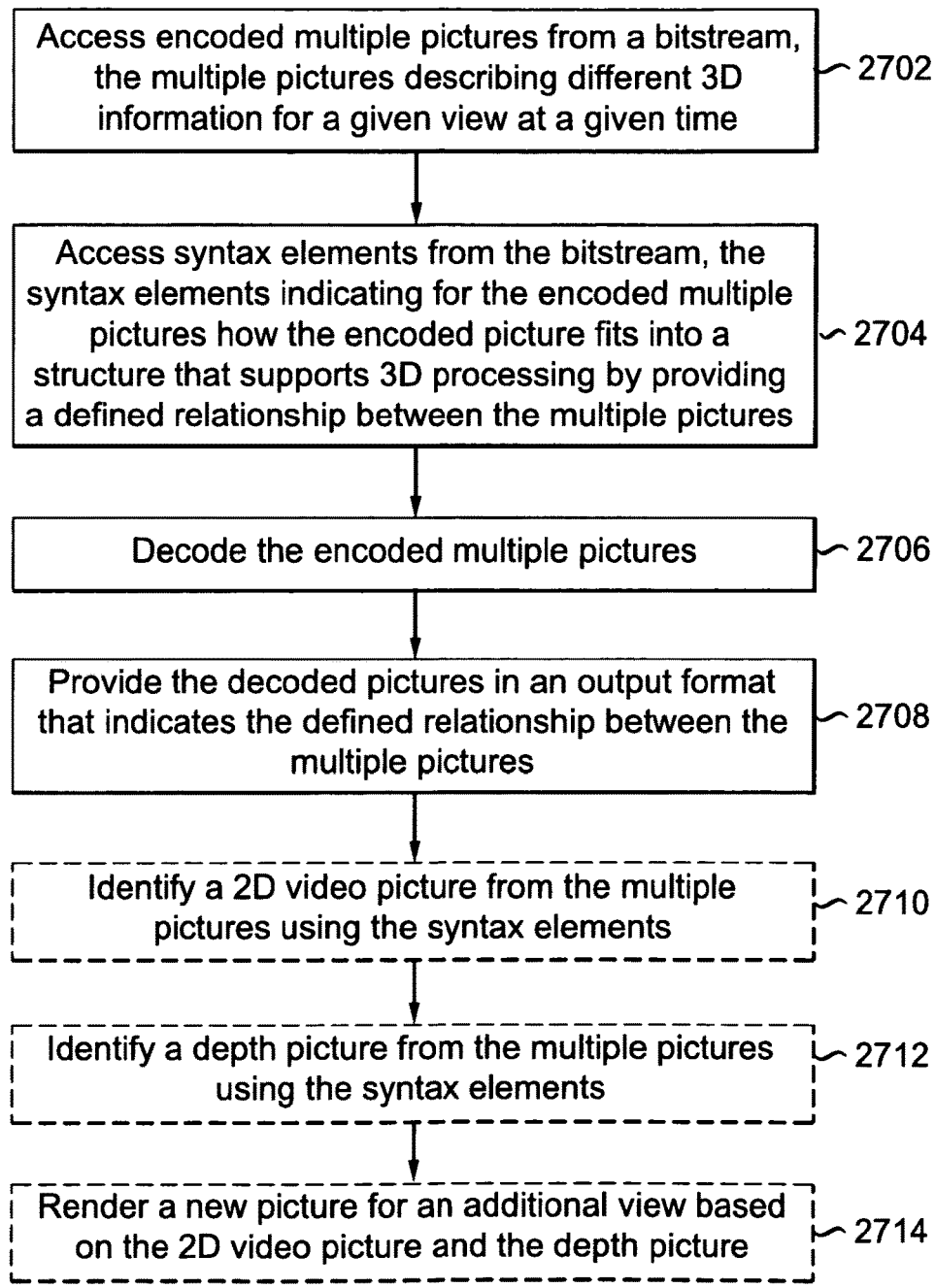
FIG. 27 is a flow diagram of an example of a method for decoding 3DV content.

With reference now to FIGS. 26 and 27, methods 2600 and 2700 for encoding and decoding 3DV content are illustrated. It should be understood that any one or more aspects discussed herein, and combinations thereof, with respect to embodiments can be implemented in or with methods 2600 and 2700. For example, as discussed further herein below, embodiments 1-3, taken singly or in any combination, can be implemented in and by methods 2600 and 2700. Furthermore, it should also be noted that encoder 300 of FIG. 3 and decoder 400 of FIG. 4 can be used to implement methods 2600 and 2700, respectfully.

Method 2600 can begin at step 2602, in which the encoder 300 can encode multiple pictures, where the multiple pictures describe different 3D information for a given view at a given time. For example, any one or more of the layer encoders discussed above with respect to encoder 300 can be used to implement the encoding of multiple pictures in accordance with any one or more of embodiments 1, 2, and/or 3. The multiple pictures may be, for example, a 2D video layer picture and a depth layer picture. The 3D information described by the 2D video layer picture may be, for example, the 2D video. Similarly, the 3D information described by the depth layer picture may be, for example, the depth information. The 2D video information and the depth information are both examples of 3D information for a given view at a given time.

For purposes of describing methods of additional embodiments, a "picture" can be equivalent to a "frame" discussed above with respect to various embodiments. Further, a picture can correspond to any one or more 3DV layers discussed above. For example, a 2D view 1010 and a depth view 1008 can each constitute a separate picture. Additionally, any 2D view layer 1118, 1122, 1136, 1218, 1222, 1236 and/or any depth layer 1120, 1124, 1220, 1224, discussed above with respect to FIGS. 11 and/or 12, can each constitute a separate picture. Moreover, other 3DV supplemental layers, as discussed above, not explicitly illustrated in FIGS. 11 and 12 may also each constitute a separate picture. Furthermore, any one or more of the 3DV views discussed above may constitute a given view at a given time, such as 3D views 0, 1 and 2 at times T0 and T1, discussed above with regard to FIGS. 11 and 12.

At step 2604, the encoder 300 can generate syntax elements that indicate, for the encoded multiple pictures, how the encoded picture fits into a structure that supports 3D processing, the structure defining content types for the multiple pictures. For example, the 3DV reference buffer 316 can generate syntax elements in accordance with any one or more of embodiments 1, 2 and/or 3. The syntax elements may, for example, be the 3DV prefix unit 16 discussed above with regard to embodiment 1, the NAL prefix unit 14 and/or the NAL unit 20 of embodiment 2, and/or the NAL unit 21 of embodiment 3. As discussed above, the novel NAL units according to embodiments 1, 2 and 3 can indicate, for encoded 3DV layers, how each layer fits into a structure, such as structure 1000 of FIG. 10, that supports 3D processing. Further, use of a novel NAL unit, such as NAL units 16 and 21, can indicate that a 3DV structure, such as that illustrated in FIG. 10, has been used in the bitstream. As noted above, the structure 1000 can define different content types, such as different types of 3DV layers. It should be understood that a structure can correspond to a set of 3DV views, as indicated in FIG. 10, and/or can correspond to a set of layers within a 3DV view. It should also be understood that encoder 300 can encode a picture using a different encoded picture as a reference, thereby providing inter-layer coding between pictures of different content types. For example, using FIG. 10 as an example, a depth view of view 1004 can be dependent from and reference a different layer, such as the 2D view of view 1004, thereby providing inter-layer coding. In addition, the coding structure of FIG. 10 can be configured such that a 2D view of view 1004 can be dependent from and reference a different layer, such as a depth layer, of view 1006. Other types of inter-layer coding are possible, as indicated above, and can be implemented by one of ordinary skill in the art in view of the teachings provided herein.

At step 2606, the encoder 300 can generate a bitstream that includes the encoded multiple pictures and the syntax elements, where the inclusion of the syntax elements provides, at a coded-bitstream level, indications of relationships between the encoded multiple pictures in the structure. For example, the 3DV Reference Buffer 316 may generate a bitstream 318, which may comprise any of the encoded bitstreams generated in accordance with embodiments 1, 2 and/or 3, as discussed above. Thus, the bitstream can include multiple encoded pictures, such as any one or more of the layer frames discussed above with regard to FIGS. 10-12, and can also include any one or more of 3DV prefix unit 16 of embodiment 1, the NAL prefix unit 14 and/or the NAL unit 20 of embodiment 2, and/or the NAL unit 21 of embodiment 3, which, as discussed above, can provide, at a coded-bitstream level, indications of relationships between the encoded multiple pictures in the structure. For example, the syntax elements may indicate the dependencies and relationships between pictures or layers in the structure of FIG. 10 or other structures that support 3DV content. For example, the syntax elements may provide an indication of how the pictures should be combined to generate 3DV content.

It should be understood that in accordance with various embodiments, the set of layer encoders 304-314 of encoder 300 can be configured to perform step 2602. Further, the 3DV reference buffer 316 and/or the layer encoders 304-314 can be configured to perform either one or more of steps 2604-2606. The encoder 300 may alternatively or additionally comprise a processor configured to perform at least method 2600. In addition, embodiments can include a video signal and/or a video signal structure that is formatted to include the multiple encoded pictures generated at step 2602, the syntax elements generated at step 2604, and/or any one or more elements included in the bitstream generated at 2606, including the bitstream itself. Moreover, embodiments may include a processor readable medium that has the video signal structure stored thereon. Additionally, as indicated above, a modulator 722 of FIG. 7 can be configured to modulate the video signal. Furthermore, embodiments may include a processor readable medium having stored thereon instructions for causing the processor to perform at least method 2600. Referring again to the method 2700 of FIG. 27 for decoding 3DV content, method 2700 may begin at step 2702, in which the decoder 400 may access encoded multiple pictures from a bitstream. The multiple pictures describe different 3D information for a given view at a given time. For example, the bitstream may correspond to the bitstream generated in accordance with method 2600. As discussed above with regard to method 2600, any 2D view layer and/or any depth layer discussed above with respect to FIGS. 11 and/or 12, can each constitute a separate picture. Moreover, other 3DV supplemental layers, as discussed above, not explicitly illustrated in FIGS. 11 and 12 may also each constitute a separate picture. Furthermore, any one or more of the 3DV views discussed above may constitute a given view at a given time, such as 3D views 0, 1 and 2 at times T0 and T1, discussed above with regard to FIGS. 11 and 12.

At step 2704, the decoder 400 can access syntax elements from the bitstream. The syntax elements indicate for the encoded multiple pictures how the encoded picture fits into a structure that supports 3D processing. The structure provides a defined relationship between the multiple pictures. For example, the 3DV reference buffer 414 can access syntax elements in accordance with any one or more of embodiments 1, 2 and/or 3. The syntax elements may, for example, be the 3DV prefix unit 16 discussed above with regard to embodiment 1, the NAL prefix unit 14 and/or the NAL unit 20 of embodiment 2, and/or the NAL unit 21 of embodiment 3. As discussed above, the novel NAL units according to embodiments 1, 2 and 3 can indicate, for encoded 3DV layers, how each layer fits into a structure, such as structure 1000 of FIG. 10, that supports 3D processing. Further, use of a novel NAL unit, such as NAL units 16 and 21, can indicate that a 3DV structure, such as that illustrated in FIG. 10, has been used in the bitstream. As noted above, the structure 1000 can define different content types, such as different types of 3DV layers. It should be understood that a structure can correspond to a set of 3DV views, as indicated in FIG. 10, and/or can correspond to a set of layers within a 3DV view. It should also be understood that decoder 400 can decode a picture using a different encoded picture as a reference, thereby permitting inter-layer decoding between pictures of different content types. For example, using FIG. 10 as an example, a depth view of view 1004 can be dependent from and reference a different layer, such as 2D view of view 1004, thereby permitting inter-layer decoding. In addition, the coding structure of FIG. 10 can be configured such that a 2D view of view 1004 can be dependent from and reference a different layer, such as a depth layer, of view 1006. Other types of inter-layer coding are possible, as indicated above, and can be implemented by one of ordinary skill in the art in view of the teachings provided herein. Moreover, as discussed above with respect to embodiments 1-3, any one or more of 3DV prefix unit 16 of embodiment 1, the NAL prefix unit 14 and/or the NAL unit 20 of embodiment 2, and/or the NAL unit 21 of embodiment 3 can provide a defined relationship between the pictures of the bit stream through the use of 3DV view IDs and 3DV layer IDs, as discussed above. For example, the decoder 400 can be preconfigured to combine pictures in accordance with a 3DV structure, such as structure 1000 of FIG. 10, and can use the 3DV view IDs and 3DV layer IDs to identify which received pictures correspond to the different layers in the pre-defined structure.

At step 2706, the decoder 400 can be configured to decode the encoded multiple pictures. For example, the decoder 400 can decode the received pictures using layer decoders 402-412, as discussed above, for example, with respect to FIGS. 4 and 6. For example, the decoder 400 can use the defined relationship indicated and provided by the syntax elements to render an additional picture that references one or more of a two-dimensional (2D) video layer picture, a depth layer picture, an occlusion layer picture, or a transparency picture. For example, as discussed above, a depth view of view 1004 of FIG. 10 can be dependent from and reference a different layer, such as 2D view of view 1004, thereby providing inter-layer coding. Thus, the decoder 400 can render an additional picture, such as a depth view of view 1004, from one or more of a variety of different layer pictures.

At step 2708, the decoder 400 may provide the decoded pictures in an output format that indicates the defined relationship between the multiple pictures. For example, the 3DV reference/output buffer 414 of decoder 400 can output 3DV content that is formatted in accordance with the 3DV structure. Thus, the output can indicate to a display device the relationships between multiple pictures in accordance with the structure to permit proper display of the 3DV content on a display device and enable a user to view the 3DV content. In particular, the output format may include syntax elements that specify how a decoded picture fits into a structure. Examples of such syntax elements may include any one or more of 3DV prefix unit 16 of embodiment 1, the NAL prefix unit 14 and/or the NAL unit 20 of embodiment 2, and/or the NAL unit 21 of embodiment 3.

Optional steps 2710-2714 may be performed at a decoder after performing step 2708. Implementations may perform one or more of steps 2710-2714 as part of step 2708 and/or as part of the decoding of step 2706. In various implementations, one or more of steps 2710-2714, particularly step 2714, may be performed at a display.

Optionally, at step 2710, the decoder 400 can identify a 2D video picture from the multiple pictures using the syntax elements. For example, the decoder 400 may identify a 2D video picture or layer by parsing any one or more of a 3DV prefix unit 16 of embodiment 1, the NAL prefix unit 14 and/or the NAL unit 20 of embodiment 2, and/or the NAL unit 21 of embodiment 3, implemented to encode 3DV layers. The decoder 400 may further determine which of the encoded pictures have a 2D view layer ID, which was denoted above as '0,' and determine the corresponding 3DV view using the 3DV view ID.

Optionally, at step 2712 the decoder 400 can identify a depth picture from the multiple pictures using the syntax elements. For example, the decoder 400 may identify a depth picture or layer by parsing any one or more of a 3DV prefix unit 16 of embodiment 1, the NAL prefix unit 14 and/or the NAL unit 20 of embodiment 2, and/or the NAL unit 21 of embodiment 3, implemented to encode 3DV layers. Moreover, the decoder 400 can determine which of the encoded pictures have a depth layer ID, which was denoted above as '1,' and determine the corresponding 3DV view using the 3DV view ID. It should be noted that other 3DV supplemental layers can be identified using syntax elements in accordance with various embodiments.

Optionally, at step 2714, the decoder 400 can render a new picture for an additional view based on the 2D video picture and the depth picture. For example, the identified pictures or views may correspond to 2D view 1010 and depth view 1008 of FIG. 10. In addition, 3DV views 1004 and 1006 can, for example, be rendered by using 2D view 1010 and depth view 1008 of 3DV base view 1002 as a reference in accordance with the description provided above with regard to FIG. 10. Similarly, the 2D video layer and depth layer of 3DV view 1006 can be used as a reference to render 3DV view 1004 in accordance with the description provided above with regard to FIG. 10.

It should be understood that in accordance with various embodiments, the set of layer decoders 402-412 of decoder 400 can be configured to perform steps 2702 and 2706. Further, the 3DV reference buffer 414 and/or the layer decoders 402-412 can be configured to perform either one or more of steps 2704 and 2708. The decoder 400 may alternatively or additionally comprise a processor configured to perform at least method 2700. Moreover, as indicated above, a demodulator 822 of FIG. 8 can be configured to demodulate a video signal including a bitstream from which multiple encoded pictures are accessed in step 2702. Furthermore, embodiments may include a processor readable medium having stored thereon instructions for causing the processor to perform at least method 2700.

Figure 28:
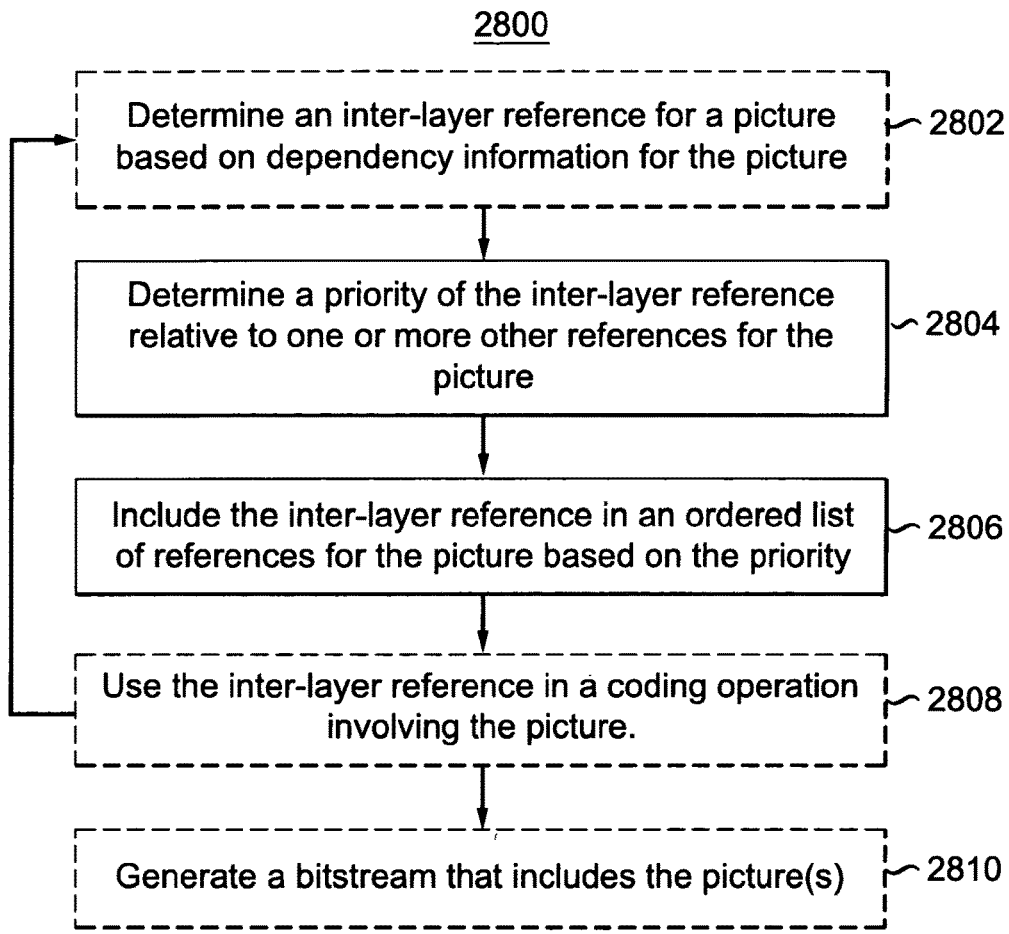
FIG. 28 is a flow diagram of an example of a method for constructing a reference picture list for a coding operation.

With reference now to FIG. 28, a method 2800 for constructing a reference picture list is illustrated. It should be understood that any one or more aspects discussed herein, and combinations thereof, with respect to embodiments can be implemented in or with methods 2800. For example, as discussed further herein below, embodiment 4 can be implemented in and by method 2800. In addition, any one or more of embodiments 1-3 and 5-7 can be combined with embodiment 4 and implemented in or with method 2800. Furthermore, it should also be noted that encoder 300 of FIG. 3 and/or decoder 400 of FIG. 4 can be used to implement method 2800. Moreover, although method 2800 describes constructing a reference picture list for a picture, such a reference list may be constructed for a sequence of pictures, for a set of pictures across multiple views or for a subset of a picture, as discussed above with regard to embodiment 4.

Method 2800 may begin at optional step 2802, in which the encoder 300 or the decoder 400 can determine an inter-layer reference for a picture based on dependency information for the picture. For example, the decoder 400 may extract and decode the dependency information from received syntax elements conveying a sequence parameter set (SPS), as discussed above. In turn, for encoder 300, the dependency information may be the same as the dependency information the encoder 300 included in the SPS, as discussed above, for example, with respect to embodiments 5-8. For example, the encoder 300 may obtain the dependency information from a configuration file that is stored on the encoder. It should be understood that the dependency information may include any one or more of temporal dependencies, inter-view dependencies and inter-layer dependencies indicating how different pictures and picture types are predictively encoded. Thus, based on the dependency information, the encoder 300 or decoder 400 can determine an inter-layer reference for the picture for which a reference picture list is being constructed. In addition, the inter-layer reference may conform to inter-layer references discussed above with regard to embodiment 4. For example, the inter-layer reference may correspond to any one or more of the structures discussed above with regard to FIG. 15.

At step 2804, the encoder 300 or decoder 400 may determine a priority of the inter-layer reference relative to one or more other references for the picture. For example, the encoder 300 or decoder 400 may be configured to apply a priority scheme to prioritize pictures in the reference picture list. For example, as discussed above with regard to embodiment 4, the pictures in the reference list may be ordered/prioritized in accordance with the degree of redundancy the picture for which the reference picture list is constructed has with the pictures listed in its reference picture list. For example, as discussed above with regard to a depth picture, the inter-layer reference is expected to have the least redundancy as compared to temporal and inter-view references in the reference list. Thus, the inter-layer reference has a lower priority than the temporal and inter-view references. It should be noted that any of the priorities provided above with regard to the different 3DV layer types in embodiment 4 can be applied here in step 2804. However, it should also be understood that different priorities may also be employed in accordance with various aspects described herein. For example, the priorities may vary in accordance with the actual redundancy between picture references and the picture associated with the reference picture list for the 3DV content. For example, redundancies can be determined based on measurements of the pictures or layers composing the 3DV content and the priority scheme can be tailored to reflect the measured redundancy levels such that reference pictures having a higher redundancy are given higher priority over reference pictures having a lower redundancy with the picture associated with the reference list. Furthermore, such priority schemes may, in other aspects or embodiments, be devised differently for each picture or reference picture list.

At step 2806, the encoder 300 or the decoder 400 may include the inter-layer reference in an ordered list of references for the picture based on the priority. For example, inter-layer reference pictures with a lower or lowest priority may be included after other reference pictures with a higher priority or at the end of the list. In turn, inter-layer reference pictures with a higher or highest priority are included before other reference pictures with a lower priority or at the beginning of the list. Such references may include a temporal and/or an inter-view reference, as discussed above. As indicated above, the inter-layer references may be included in the list of references in accordance with method 1600 for the encoder implementation or method 1700 for the decoder implementation. Further, the inter-layer reference may be included in the list of references in accordance with other priority schemes, as discussed above with respect to step 2804. It should be noted that the lists may be ordered and prioritized based on expected use so that smaller indices can be used for more common references and bits can be saved in transmission.

At optional step 2808, the encoder 300 or the decoder 400 may use the inter-layer reference in a coding operation involving the picture. For example, the encoder 300 may perform a predictive encoding operation to encode the picture for which the reference list was constructed using the inter-layer reference as a reference picture. In turn, the decoder 400 may perform a predictive decoding operation to decode the picture for which the reference list was constructed using the inter-layer reference as a reference picture. Thus, encoding or decoding of the picture may, at least in part, be based on the inter-layer reference.

Optionally, at step 2810, the encoder 300 or decoder 400 may generate a bitstream that includes the coded picture. For example, the encoder 300 may include the encoded picture in bitstream 318 in accordance with the discussion provided above with regard to FIGS. 3 and 5. In addition, the decoder 400 may include the decoded picture in bitstream 416 in accordance with the discussion provided above with regard to FIGS. 4 and 6.

Thereafter, the method may end or may repeat such that the encoder 300 or the decoder 400 may generate a reference picture list for another picture or may generate a second reference picture list for the same picture if the picture is a B picture.

One implementation performs only steps 2804 and 2806. An inter-layer reference may be provided, for example, and the implementation determines a priority of the inter-layer reference. The implementation then includes the inter-layer reference in an ordered list, based on the determined priority.

Figure 29:
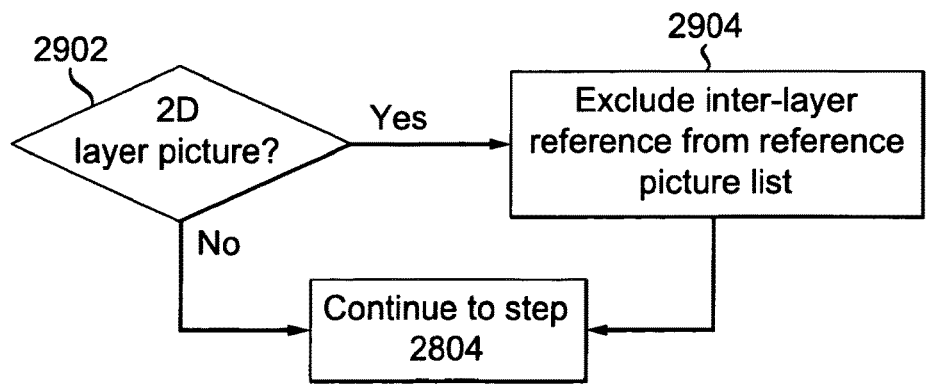
FIG. 29 is a flow diagram of an example of a method for processing 2D video layer pictures that may be implemented in the method of FIG. 28.

Returning to step 2802, optionally, step 2802 may include the performance of method 2900 provided in FIG. 29 for processing 2D video layer pictures. For example, method 2900 may begin at step 2902, in which the encoder 300 or decoder 400 may determine whether the picture for which the reference picture list is constructed is a 2D video layer picture. If the reference is not a 2D video layer picture, then the method may proceed to step 2804 of method 2800. Otherwise, the method may proceed to step 2904, in which the encoder 300 or decoder 400 may exclude any inter-layer reference from the reference picture list. For example, as discussed above with regard to embodiment 4, refraining from using inter-layer references for the 2D video layer may permit a conventional MVC to extract 3DV content and format the content for display. Thereafter, the method may proceed to step 2804 of method 2800.

Step 2904 may also be modified to exclude only depth layers from being used as references for 2D video layers. Such an implementation may, for example, rely on occlusion video layers as inter-layer reference for 2D video layers.

It should be understood that in accordance with various embodiments, a set of layer coders, such as layer decoders 402-412 of decoder 400 or layer encoders 304-314 of encoder 300, can be configured to perform steps 2808 and step 2810. Further, the 3DV reference buffer 414, the 3DV reference buffer 316, and/or the layer coders can be configured to perform either one or more of steps 2802-2806 and 2810. The encoder 300 or the decoder 400 may alternatively or additionally comprise a processor configured to perform at least method 2800. Moreover, embodiments may include a processor readable medium having stored thereon instructions for causing the processor to perform at least method 2800.

Figure 30:
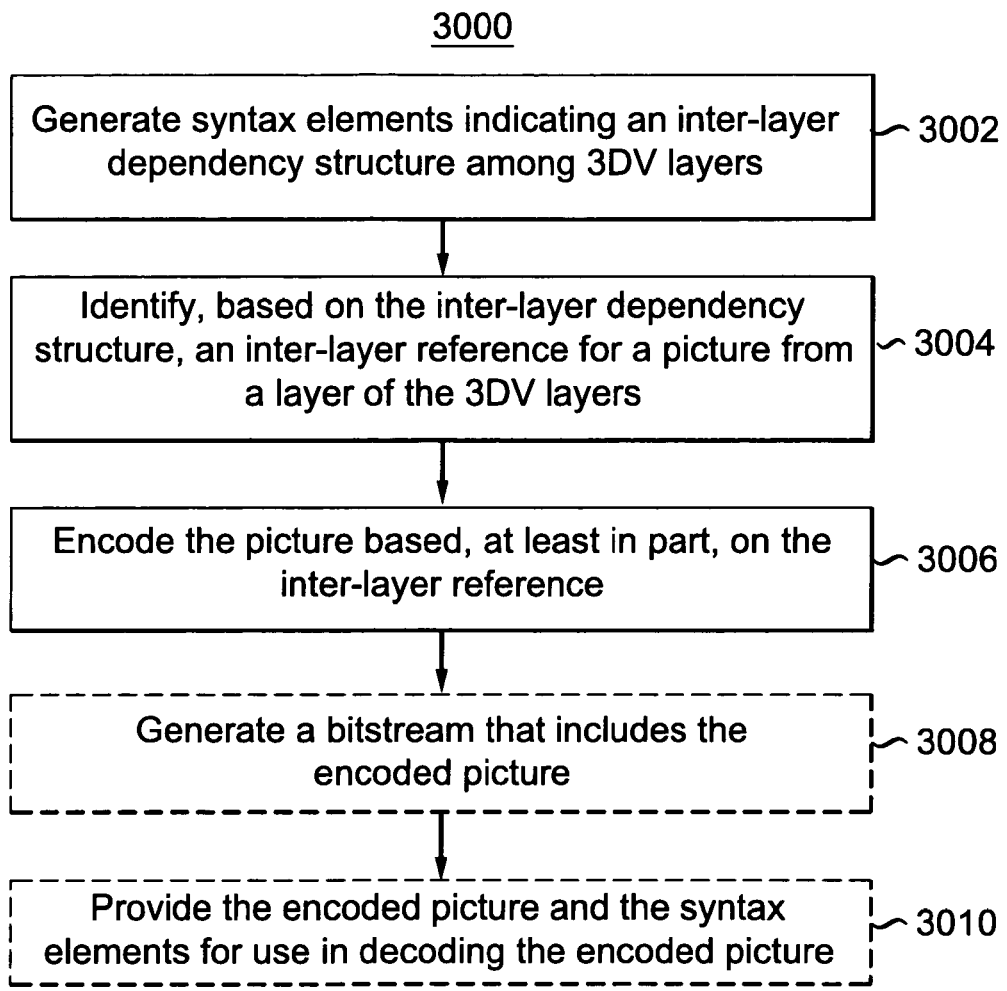
FIG. 30 is a flow diagram of an example of a method for encoding 3DV content and conveying inter-layer dependency structures.
Figure 31:
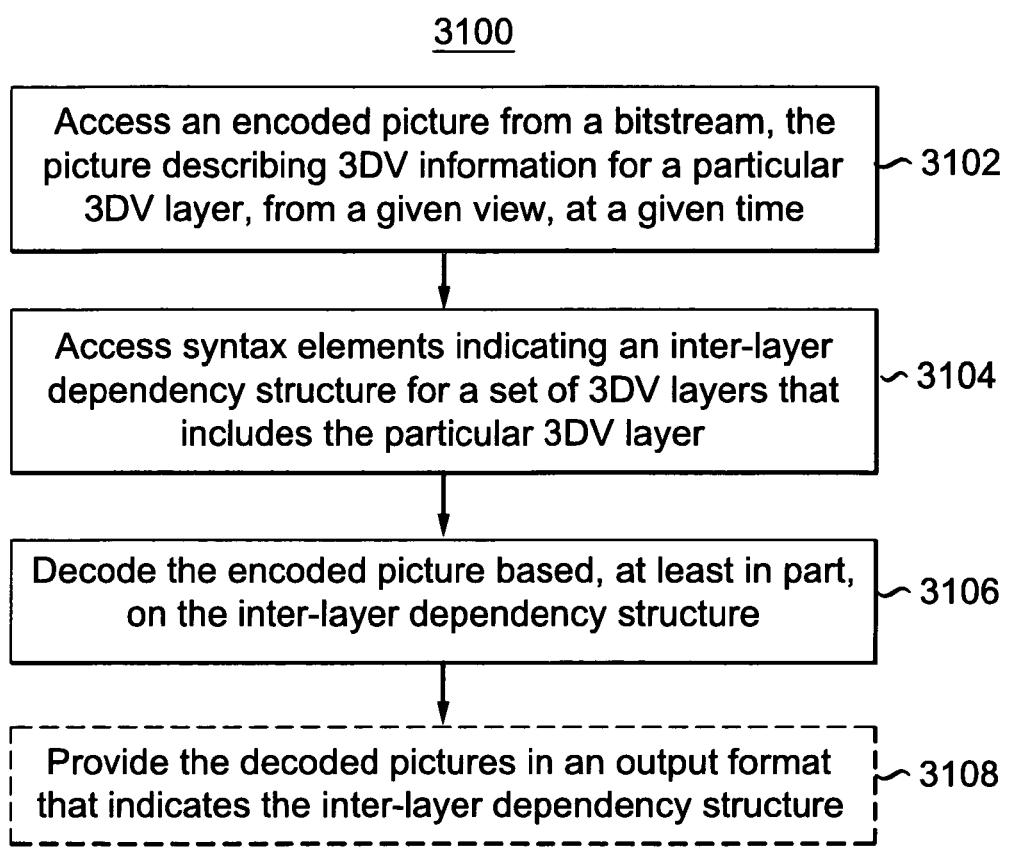
FIG. 31 is a flow diagram of an example of a method for decoding 3DV content and conveying inter-layer dependency structures.

With reference now to FIGS. 30 and 31, methods 3000 and 3100 for encoding and decoding 3DV content, such that 3DV inter-layer dependencies structures are conveyed, are illustrated. It should be understood that any one or more aspects discussed herein, and combinations thereof, with respect to various embodiments can be implemented in or with methods 3000 and 3100. For example, as discussed further herein below, embodiments 5-7 can be implemented in and by methods 2600 and 2700. Furthermore, it should also be noted that encoder 300 of FIG. 3 and decoder 400 of FIG. 4 can be used to implement methods 3000 and 3100, respectively.

Method 3000 can begin at step 3002 in which the encoder 300 may generate syntax elements indicating an inter-layer dependency structure among 3DV layers. For example, the syntax elements may be generated as discussed above with regard to any one or more of embodiments 5-7. For example, NAL units 17 may be employed as the syntax elements to convey an inter-dependency structure, as discussed above with regard to embodiment 5. Furthermore, the inter-dependency structure may be conveyed as discussed above with regard to embodiments 6 and 7 and with regard to Tables 13 and 14. For example, any one or more of methods 2000, 2200 and 2400 may be employed to convey the inter-dependency structure. For example, the syntax elements may explicitly convey the inter-layer dependency structure, as discussed above with regard to embodiment 6, or the syntax elements may indicate the inter-layer dependency structure by conveying whether particular 3DV layers are present for each 3DV view using 3DV layer ids, where the inter-layer dependency is pre-defined, as discussed above with regard to embodiment 7. In addition, the inter-layer dependency structure may correspond to one of many different inter-layer dependency structures. For example, the inter-layer dependency structure may correspond to that described above with regard to FIG. 15 as well as that discussed above with regard to embodiment 7. Moreover, as stated above, the inter-layer dependency structure may be provided in any one or more of the NAL unit header, SPS, PPS, SEI or a slice header. Further, the encoder 300 may generate syntax elements by constructing and employing reference picture lists, as discussed above, for example, with regard to embodiment 4.

At step 3004, the encoder 300 may identify, based on the inter-layer dependency structure, an inter-layer reference for a picture from a layer of the 3D layers. For example, if the inter-layer dependency structure corresponds to that described above with regard to FIG. 15, to encode a depth layer picture, the encoder 300 may employ a reference picture list, which may be constructed at step 3002, to determine that an inter-layer reference for the depth layer picture is a 2D video layer picture in the same view or 3DV view as the depth layer picture. As noted above, the inter-dependency structure can vary and can include many different types of layers, such as a 2D video layer, depth layer, occlusion video layer, occlusion depth layer and transparency layer, among others, with different inter-dependencies, including, for example, inter-layer dependencies between different 3DV views.

At step 3006, the encoder 300 can encode the picture based, at least in part, on the inter-layer reference. For example, the encoder 300 may encode the picture as discussed above with regard to FIGS. 3 and 5 using encoders 304-314. Here, again using structure 1500 and the depth layer as an example, the depth layer may be encoded based, at least in part, on the 2D video layer, as discussed above.

At optional step 3008, the encoder 300 can generate a bitstream that includes the encoded picture. For example, the encoded bitstream may be generated as discussed above with regard to FIGS. 3 and 5 and may correspond to, for example, bitstream 318.

At optional step 3010, the encoder 300 may provide the encoded picture and the syntax elements for use in decoding the encoded picture. For example, the syntax elements and the encoded picture may be transmitted via bitstream 318 to a decoder 400. Alternatively, the syntax elements may be transmitted in a bitstream that is separate from a bitstream used to transmit 3DV data content. Thus, bitstream 318 in FIG. 3 may represent two separate corresponding bitstreams. Alternatively, the different bit streams may be transmitted separately. For example, one bit stream may be transmitted to a decoder 400 via a cable network while the other bitstream may be transmitted to the decoder 400 wirelessly. In addition, the syntax elements may be used to decode the encoded picture as discussed herein below with respect to method 3100.

It should be understood that in accordance with various embodiments, the set of layer encoders 304-314 of encoder 300 can be configured to perform step 3006. Further, the 3DV reference buffer 316 and/or the layer encoders 304-314 can be configured to perform one or more of steps 3002, 3004, 3008 and 3010. The encoder 300 may alternatively or additionally comprise a processor configured to perform at least method 3000. In addition, embodiments can include a video signal and/or a video signal structure that is formatted to include the encoded picture, the syntax elements and/or the bitstream generated in accordance with method 3000. Moreover, embodiments may include a processor readable medium that has the video signal structure stored thereon. Additionally, as indicated above, a modulator 722 of FIG. 7 can be configured to modulate the video signal. Furthermore, embodiments may include a processor readable medium having stored thereon instructions for causing the processor to perform at least method 3000.

One implementation performs only steps 3002-3006. The implementation generates the syntax elements, identifying an inter-layer reference for a picture, and then encodes the picture based, at least in part, on the identified inter-layer reference. The implementation does not, in this case, need to generate a bitstream including the encoded picture, or to provide the encoded picture and syntax for use in decoding.

Referring again to the method 3100 of FIG. 31 for decoding 3DV content, method 3100 may begin at step 3102. Decoder 400 may access an encoded picture from a bitstream, where the picture describes 3DV information for a particular 3DV layer, from a given view, at a given time. For example, the encoded picture can correspond to any one or more 3DV layers discussed above. For example, a 2D view 1010 and a depth view 1008 can each constitute a separate picture. Additionally, any 2D view layer 1118, 1122, 1136, 1218, 1222, 1236 and/or any depth layer 1120, 1124, 1220, 1224, discussed above with respect to FIGS. 11 and/or 12, can each constitute a separate picture. Moreover, other 3DV supplemental layers, as discussed above, not explicitly illustrated in FIGS. 11 and 12 may also each constitute a separate picture. Furthermore, any one or more of the 3DV views discussed above may constitute a given view at a given time, such as 3D views 0, 1 and 2 at times T0 and p T1, discussed above with regard to FIGS. 11 and 12. Further, the encoded picture may be the encoded picture generated by method 3000.

At step 3104, the decoder 400 may access syntax elements indicating an inter-layer dependency structure for a set of 3DV layers that includes the particular 3DV layer. For example, NAL units 17 may be the syntax elements that indicate an inter-dependency structure, as discussed above with regard to embodiment 5. Furthermore, the inter-dependency structure may be indicated or conveyed as discussed above with regard to embodiments 6 and 7 and with regard to Tables 13 and 14. For example, any one or more of methods 2000, 2200 and 2400 may be employed to convey or indicate the inter-dependency structure.

For example, the syntax elements may explicitly convey the inter-layer dependency structure, as discussed above with regard to embodiment 6. Or the syntax elements may indicate the inter-layer dependency structure by conveying whether particular 3DV layers are present for each 3DV view using 3DV layer ids, where the inter-layer dependency is pre-defined, as discussed above with regard to embodiment 7. In addition, the inter-dependency structure may correspond to one of many different inter-dependency structures. For example, the inter-dependency structure may correspond to that described above with regard to FIG. 15 as well as that discussed above with regard to embodiment 7. Moreover, as stated above, the inter-dependency structure and the syntax elements may be obtained from any one or more of the NAL unit header, SPS, PPS, SEI or a slice header. Further, the decoder may access the syntax elements, for example, as discussed above with regard to any one or more of methods 2100, 2300 and 2500.

At step 3106, the decoder 400 may decode the encoded picture based, at least in part, on the inter-layer dependency structure. For example, the decoder 400 may decode the encoded picture as discussed above with regard to FIGS. 4 and 6. Further, the decoder 400 may construct and employ one or more reference picture lists using the syntax elements, as discussed above with, for example, regard to embodiment 4, to decode the encoded picture. Thus, the decoder 400 may determine the encoded picture's references for predictive coding purposes and may decode the picture based at least in part on its references.

At optional step 3108, the decoder 400 may provide the decoded pictures in an output format that indicates the inter-layer dependency structure. For example, the 3DV reference/output buffer 414 of decoder 400 can output 3DV content that is formatted in accordance with the inter-layer dependency structure. Thus, the output can indicate to a display device the relationships between multiple pictures in accordance with the structure to permit proper display of the 3DV content on a display device and enable a user to view the 3DV content. In particular, the output format may include syntax elements that specify how a decoded picture fits into the structure. Examples of such syntax elements may include NAL unit 17, as discussed above.

It should be understood that in accordance with various embodiments, the set of layer decoders 402-412 of decoder 400 can be configured to perform step 3106. Further, the 3DV reference buffer 414 and/or the layer decoders 402-412 can be configured to perform one or more of steps 3102, 3104 and 3108. The decoder 400 may alternatively or additionally comprise a processor configured to perform at least method 3100. Moreover, as indicated above, a demodulator 822 of FIG. 8 can be configured to demodulate a video signal including a bitstream from which multiple encoded pictures are accessed in step 3102. Furthermore, embodiments may include a processor readable medium having stored thereon instructions for causing the processor to perform at least method 3100.

It should be understood that the embodiments discussed above may be combined in a variety of ways by those of ordinary skill in the art in view of the teachings provided herein. For example, with reference now to FIG. 32, a NAL unit stream 3200 incorporating features from several embodiments discussed above is illustrated. Here, stream 3200 may include NAL unit 15 (3202) for a subset sequence parameter set for MVC, as provided above in Table 3 and defined in the AVC draft. In addition, stream 3200 may further include NAL unit 17 for the extended SPS for 3DV indicating at least one inter-layer dependency structure as discussed above with regard to embodiments 5-7. Here, for simplicity purposes, the inter-layer dependency structure shown in FIG. 10 is employed in stream 3200.

Figure 32:
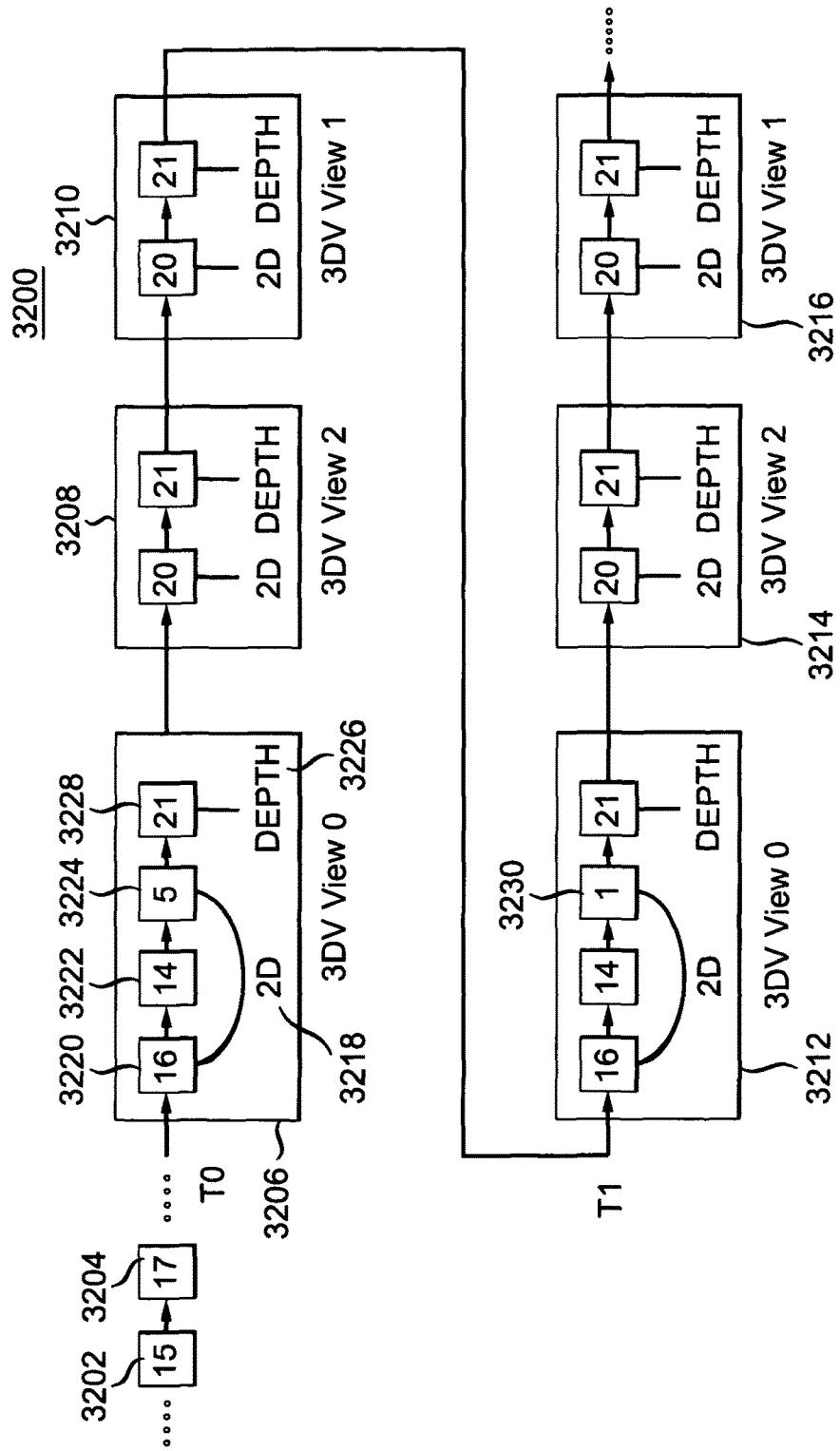
FIG. 32 is a block/flow diagram of an example of a NAL unit stream.

Similar to FIGS. 11 and 12, FIG. 32 provides sets of 3DV views corresponding to a time T0 and time T1, respectively. The truncation of FIGS. 11 and 12 discussed above is also applied to FIG. 32 and the arrows of FIG. 32 indicate the transmission order of NAL units, similar to the arrows of FIGS. 11 and 12. Of course, FIG. 32 is a small excerpt of the stream 3200. Stream 3200 would comprise many more NAL units for a multitude of different time instances in a practical application. In addition, the use of three 3DV views is an example and many more views may be employed and/or rendered at a decoder, as understood by those of ordinary skill in the art familiar with MVC. Furthermore, the use of two 3DV layers for each view is also an example and it should be understood that several additional 3DV layers may be employed, as discussed at length above.

In the excerpt of stream 3200, three 3DV views 3206, 3208, and 3210 correspond to time T0 while three 3DV views 3212, 3214, and 3216 correspond to time T1. Similar to FIGS. 11 and 12, 3DV view 0 (3206, 3212) can correspond to base view 1002 in FIG. 10, while 3DV view 2 (3208, 3214) and 3DV view 1 (3210, 3216) may correspond to P view 1006 and B view 1004 of FIG. 10, respectively. 3DV view 3206 may comprise NAL units 16 (3220), 14 (3222), and 5 (3224), composing a 2D video layer 3218. As discussed above, a NAL unit 5 includes video data of a coded slice of an instantaneous decoding refresh (IDR) picture and is composed of only intra slices or SI slices, as defined in the AVC draft. In addition, NAL unit 14 may include, as an MVC prefix a reference denoting the 2D video layer 3218 as a base layer for other views in accordance with MVC. In another implementation, in which a stereo profile is used, NAL units 14 and 17 may be omitted.

A NAL unit 16 may, for example, include a 3DV view ID and a 3DV layer ID as discussed above with regard to embodiment 1. Here, the 3DV view ID and a 3DV layer ID may, for example, be used by a decoder 400 to identify the 2D video layer 3218 as an inter-layer reference for depth layers, or for other 3DV layers. As shown in FIG. 32, 3DV view 3206 may further include a depth layer 3226 composed of NAL unit 21 (3228), described above with regard to embodiment 3. As discussed above with regard to embodiment 3, a NAL unit 21 may include 3DV view ID and a 3DV layer ID in addition to other information provided in MVC NAL unit header extension.

As discussed above with regard to embodiments 4-7, a decoder 400 may reconstruct a reference picture list using the information provided in the SPS, such as the inter-layer dependency structure provided by NAL unit 17, and use the reference picture list to properly decode 3DV content. For example, based on the 3DV view ID and a 3DV layer ID, the decoder 400 may determine the corresponding layer's (in this case depth layer 3226) role in the inter-layer dependency structure conveyed in the SPS. Here, the 3DV view ID and a 3DV layer ID may indicate that the 2D video layer 3218 should be used as a reference to decode the depth layer 3226.

As also shown in FIG. 32, each other 3DV view for time T0 is composed of NAL units 20 and 21 corresponding to a 2D video layer and a depth layer, respectively, in the 3DV view. The NAL units within views 3208 and 3210 may have the same function as the NAL units in views 1206 and 1208, as discussed above with regard to FIG. 12. Similarly, the set of 3DV views of time T1 is structured in essentially the same way as the set of 3DV views for time T0 except that NAL units 5 in 3DV View 3206 is replaced with NAL units 1 3230 in 3DV View 3212. As discussed above with regard to embodiment 3, a NAL unit 1 includes video data of a coded slice of a non-IDR picture.

Figure 33:
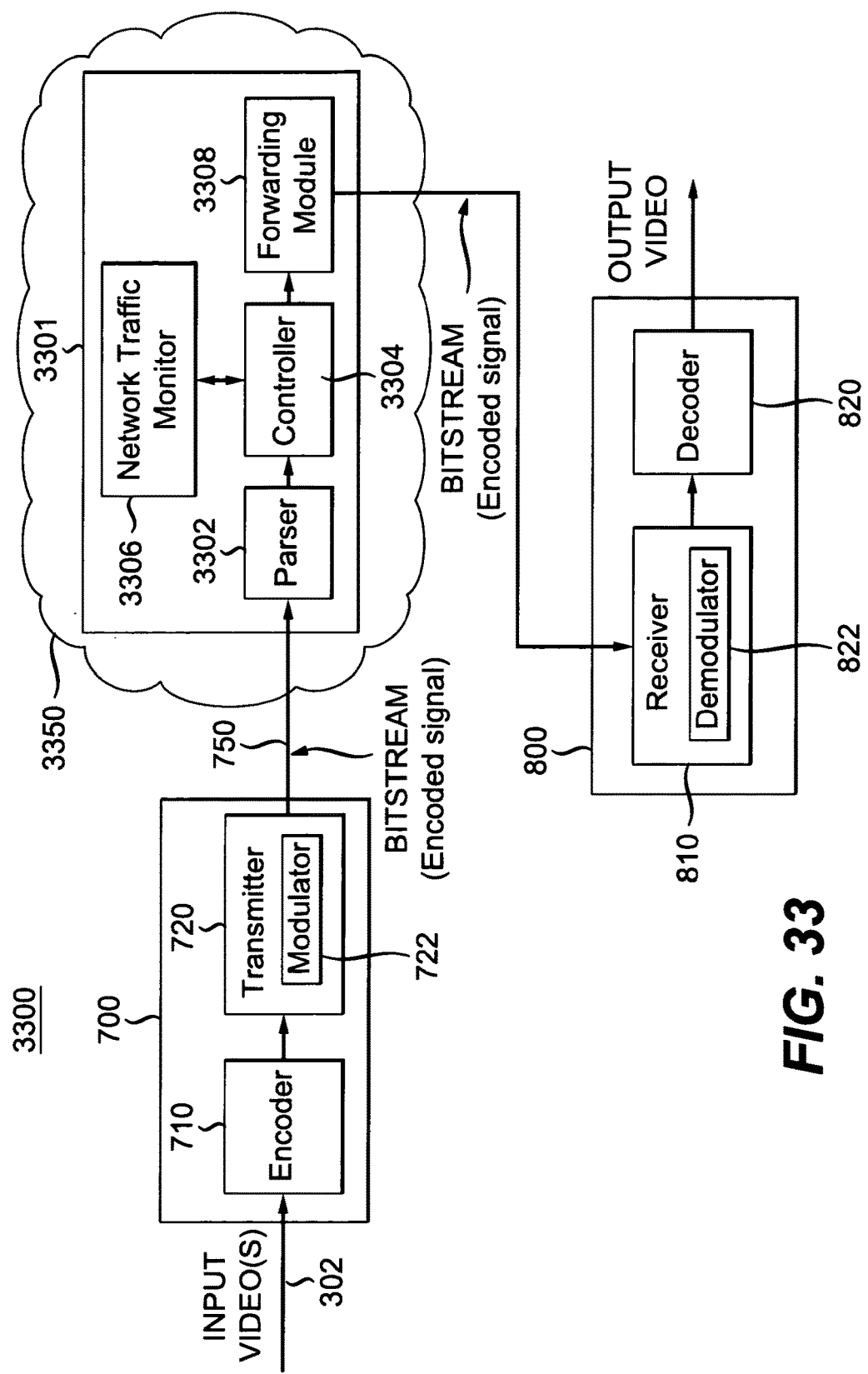
FIG. 33 is a block/flow diagram of an example of a system for managing network traffic by employing inter-layer dependency structures.

With reference now to FIG. 33, a system 3300 for managing network traffic by employing inter-layer dependency structures is illustrated. System 3300 may include transmission system/apparatus 700 and receiving system/apparatus 800 described above with respect to FIG. 7 and FIG. 8. In particular, the encoder 710 of transmission system/apparatus 700 may be implemented by the encoder 300 discussed above with regard to the various implementations described herein. Similarly, the decoder 820 of transmission system/apparatus 800 may be implemented by the decoder 400 discussed above with regard to the various implementations described herein. The input and output of the system 3300 is listed, in FIG. 33, as "input video(s)" and "output video". It should be clear that, at least in this implementation, these refer to 3D videos that include multiple layers.

System 3300 may further include a network device/system 3301 provided in a network 3350 between the transmission system/apparatus 700 and receiving system/apparatus 800. The network 3350 may, for example, be a wired network, such as the internet, a wide area network or a local area network (LAN), or a wireless network, such as a wireless cellular network or a wireless LAN. In turn, the network device 3301 may be implemented as a router in a wired network or as a base station in a wireless network. As illustrated in FIG. 33, the network device 3301 may include a parser 3302, a controller 3304, a network traffic monitor 3306 and a forwarding module 3308. Additionally, each element of network device 3301 may be implemented as hardware elements or a combination of software and hardware. Network device 3301 and the functions of its elements are described in more detail below with regard to method 3400 of FIG. 34, which may be implemented by network device 3301.

Figure 34:
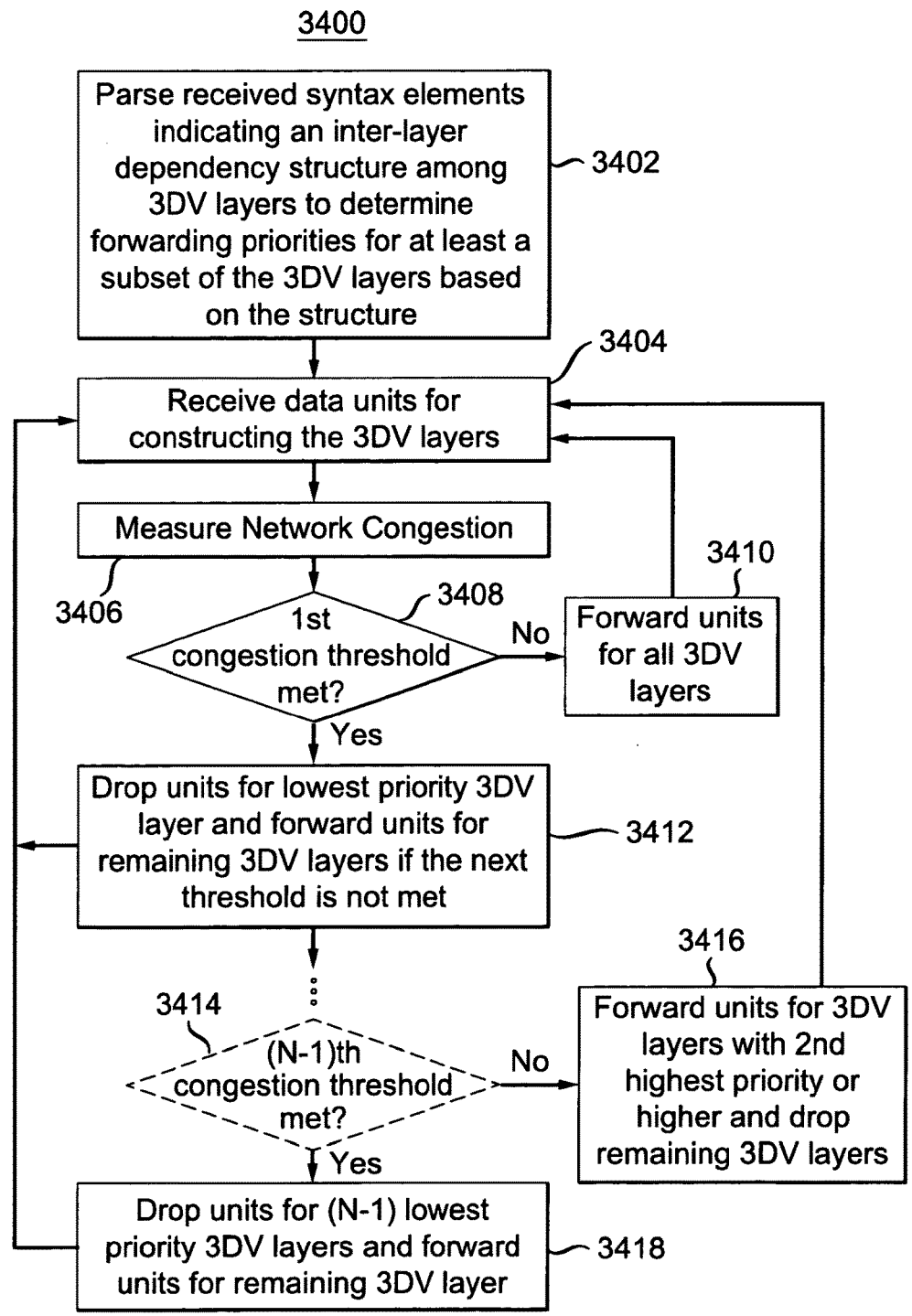
FIG. 34 is a flow diagram of an example of a method for managing network traffic by employing inter-layer dependency structures.

Referring to FIG. 34 with continuing reference to FIG. 33, a method 3400 for managing network resources is provided. Method 3402 may begin at step 3402, in which a parser 3302 may parse received syntax elements indicating an inter-layer dependency structure for 3DV layers to determine forwarding priorities for at least a subset of the 3DV layers based on the structure. For example, the syntax elements may be received from transmission system/apparatus 700 in NAL units 17, which may indicate the inter-dependency structure in accordance with, for example, Tables 13 or 14, as discussed above with regard to embodiments 5-7.

Here, the parser 3302 may determine forwarding priorities in accordance with the importance of 3DV layers as indicated in the inter-dependency structure. For example, the 3DV layer ids may be configured such that the lowest number corresponds to the highest priority while the highest number corresponds to the lowest priority. If the inter-dependency structure of FIG. 15 and the 3DV layer identifiers of Table 1 are employed, the parser 3302 may determine that the 2D video layer has the highest priority, the depth layer has the next highest priority, etc., based on the 3DV layer identifiers. In particular, the 3DV layer identifiers may be ordered in accordance with the importance of its contribution to providing 3DV content. For example, referring to FIG. 2, the depth layer 204 of the 2D video may be considered more important than the occlusion video layer 206 or the occlusion depth layer 208, because it provides a three-dimensional effect to the main object in a view, whereas the occlusion video layer 206 or the occlusion depth layer 208 do not. Variations of determining importance between different 3DV layers can be applied.

For example, one variation may be to base the priority of the layers in accordance with the number of references the layers have in the inter-layer dependency structure or the number reference picture lists in which a particular layer may be included. For example, in response to determining the inter-layer dependency structure and/or the corresponding inter-layer references, the parser 3302 may allocate the highest priority to the layer that is referenced by the most layers while allocating the lowest priority to layers that are referenced the least. For example, in the inter-layer dependency structure of FIG. 15, the 2D video layer would have the highest priority, as it is referenced by three layers, while the depth layer, which is referenced by one layer, would have the next highest priority, etc.

Other variations may be directed to ordering the 3DV layers in accordance with the number of references employed to properly encode/decode the layer. For example, in the inter-dependency structure described above with regard to embodiment 7, the occlusion video, occlusion depth, and the transparency layers may be given the lowest priority because they each employ two (inter-layer) references, the depth layer may be given the next higher priority because it employs one (inter-layer) reference and the 2D vide layer may be given the highest priority because it does not employ any (inter-layer) references.

Further, different combinations may be applied to determine a priority. For example, a weighing function considering both a given layer's importance in rendering a 3D view and the number of layers that reference the given layer may be used to determine forwarding priorities. Moreover, it should be understood that other type of references in addition to the inter-layer references may be considered. For example, the above-described priority determinations may further consider the temporal references and inter-view references on which a particular layer depends. Thus, the above-described reasoning may be applied to any type of references and/or combination of references, such as temporal references and inter-view references, and/or inter-layer references.

At step 3404, the parser 3302 may receive data units for constructing 3DV layers. For example, with reference again to FIG. 11, the parser 3302 may receive NAL units 16, 14, and 5 that are employed to construct a 2D video layer 1118. The parser 3302 may further receive NAL units 16 and 20 that are used to construct a depth layer 1120, etc.

At step 3406, the network traffic monitor 3306 may measure traffic/network congestion on the network 3350. A variety of known network traffic monitors may be employed here, as understood by those of ordinary skill in the art.

At step 3408, the controller 3304, based on congestion measurements received from the network traffic monitor 3306, may determine whether a first congestion threshold is met by the network traffic measured at step 3406. It should be understood that, here, optionally, a plurality of different congestion thresholds may be employed and associated with 3DV layers in accordance with the determined forwarding priorities, which may be based on the inter-layer dependency structure, as discussed above. For example, one congestion threshold may be used for each 3DV layer employed to render the 3DV content or for each droppable 3DV layer. For example, with reference again to Table 1, if the forwarding priorities are determined in accordance with the 3DV layer ID number as discussed above with regard to step 3402, then the first threshold may be associated with the transparency layer, the second threshold, which corresponds to a higher level of network congestion than the first threshold, may be associated with the occlusion depth layer, the third threshold, which corresponds to a higher level of network congestion than the first and second thresholds, may be associated with the occlusion video layer, etc.

Thus, if the first congestion threshold is met, then, at step 3412, the controller 3304 may drop units or NAL units received at step 3404 for the 3DV layer having the lowest priority and may direct the forwarding module 3308 to forward the units for the remaining 3DV layers (if the next threshold is not met) to the receiving system apparatus 800. If the first congestion threshold is not met, then the forwarding module 3308, under the direction of the controller 3304, may forward units for all 3DV layers at step 3410. It should be understood that the threshold determinations may be repeated for each of an N number of 3DV layers. For example, the N number of layers may correspond to the number of layers employed within one or more views to render the 3DV content. As such, the threshold determinations may be repeated for each threshold and unit dropping and forwarding decisions may be made depending on the results.

For example, if after step 3412, the second threshold is not met, then units for N−1 3DV layers may be forwarded by the forwarding module 3308 at step 3412 to the receiving unit 800. Alternatively, if after step 3412, the controller 3304 determines that the first N−2 thresholds are met, then the method may proceed to step 3414, in which the controller 3304 may determine whether the (N−1)th congestion threshold is met. If the (N−1)th congestion threshold is not met, then the forwarding module 3308, under the direction of the controller 3304, may, at step 3416, forward units for the 3DV layers having the highest two priorities. In addition, at step 3416, the controller 3304 may drop the N−2 lowest priority 3DV layers, as the thresholds for the N−2 lowest priority 3DV layers have been met. If the (N−1)th congestion threshold is met, then the forwarding module 3308, under the direction of the controller 3304, may, at step 3418, forward units for the 3DV layer having the highest priority. Additionally, controller 3304 may drop units for (N−1) lowest priority 3DV layers. Accordingly, method 3400 may proceed through threshold determinations such that when the Mth threshold is met and the (M+1)th threshold is not met, then the units, for example, NAL units, for the M lowest priority 3DV layers are dropped and the remaining higher priority layers are forwarded. It should be noted that, in this example, only N−1 thresholds are considered to ensure that at least the highest priority layer is not dropped to ensure that the receiving apparatus/system 800 can decode at least some content. However, variations of method 3400 may be employed. It should also be noted that one or more steps of method 3400 may be repeated periodically to account for any changes in network congestion.

It should be clear that other implementations are possible, other than method 3400. One such implementation is more general and includes accessing syntax elements that indicate an inter-layer dependency structure among three-dimensional video (3DV) layers. This accessing may be performed, for example, by parsing received syntax elements as shown in step 3402.

The implementation also determines a transmission priority for a particular 3DV layer of the 3DV layers based on the structure. A transmission priority may be, for example, a priority related to forwarding a picture (or a part of a picture) or dropping a picture (or a part of a picture) from the stream. The transmission priority may be determined, for example, by determining how many layers use the particular 3DV layer as a reference (inter-layer reference, inter-view reference, and/or temporal reference).

The implementation also determines whether to transmit encoded data belonging to the particular 3DV layer. The determination of whether to transmit is based on the determined transmission priority for the particular 3DV layer and based on an indication of network congestion. Network congestion may be determined, for example, as in step 3406. An indication of network congestion may include, for example, a flag (or set of flags) that indicates whether one or more congestion thresholds have been satisfied, as in steps 3408 and 3414. Other indicators may include, for example, measures of network activity (throughput rates, error rates, numbers or rates of retransmission requests, numbers or rates of acknowledgements, etc.).

A further implementation accesses such a transmission priority, and determines whether to transmit encoded data belonging to the particular 3DV layer based on the accessed transmission priority for the particular 3DV layer and based on an indication of network congestion. This implementation, however, need not access syntax indicating the inter-layer dependency structure among the 3DV layers. This implementation also need not determine, based on the inter-layer dependency structure, the transmission priority.

It should also be clear that a transmission priority may be based, in whole or in part, on other information. Such information may include, for example, a temporal level ID, a priority ID, or a view ID, as related, for example, to AVC, MVC, or SVC systems.

We thus provide one or more implementations having particular features and aspects. However, features and aspects of described implementations may also be adapted for other implementations. Several of the implementations and features described in this application may be used in the context of the H.264/MPEG-4 AVC (AVC) Standard, or the AVC standard with the MVC extension, or the AVC standard with the SVC extension. Additionally, implementations may be used in the context of a coding standard or coding proposals from (a) the Joint Collaborative Team for Video Coding (JCT-VC) from MPEG and ITU-T, (b) the High-performance Video Coding group from MPEG, (c) the Next Generation Video Coding group from the Video Coding Experts Group (VCEG) of ITU-T, (d) the 3D Video Coding group from MPEG, (e) any other group associated with one or more of MPEG or ITU-T, or (f) a standard (proprietary or public) developed by a company. However, these implementations and features may be used in the context of another standard (existing or future), or in a context that does not involve a standard.

Further, implementations may signal information using a variety of techniques including, but not limited to, SEI messages, slice headers, other high level syntax, non-high-level syntax, out-of-band information, datastream data, and implicit signaling. Accordingly, although implementations described herein may be described in a particular context, such descriptions should in no way be taken as limiting the features and concepts to such implementations or contexts.

Additionally, many implementations may be implemented in one or more of an encoder, a decoder, a post-processor processing output from a decoder, or a pre-processor providing input to an encoder. Furthermore, other implementations are contemplated by this disclosure.

Reference in the specification to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase in "one embodiment" or in an "embodiment" or in an "implementation" or in an "implementation", as well any other variations, appearing in various places throughout the specification are not necessarily all referring to the same embodiment.

It is to be appreciated that the use of any of the following "/", "and/or", and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C," such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed Also, as used herein, the words "picture" and "image" are used interchangeably and refer, for example, to all or part (a portion) of a still image or all or part (a portion) of a picture from a video sequence. More generally, a picture refers, for example, to any set of image or video data. A picture may be, for example, a pixel, a macroblock, a slice, a frame, a field, a full picture, a region bounding an object in the picture, the foreground of the picture, the background of the picture, or a particular set of (x,y) coordinates in the picture. Similarly, a "portion" of a picture may be, for example, a pixel, a macroblock, a slice, a frame, a field, a region bounding an object in the picture, the foreground of the picture, the background of the picture, or a particular set of (x,y) coordinates in the picture. As another example, a depth picture (depth image) may be, for example, a complete depth map or a partial depth map that only includes depth information for, for example, a single macroblock of a corresponding video frame.

Additionally, those of skill in the art will appreciate that a layer (or a "video" or "image" or "picture") may refer to any of various video components or their combinations. Such components, or their combinations, include, for example, luminance, chrominance, Y (of YUV or YCbCr or YPbPr or YPcPr), U (of YUV), V (of YUV), Cb (of YCbCr), Cr (of YCbCr), Pb (of YPbPr), Pr (of YPbPr or YPcPr), Pc (of YPcPr), red (of RGB), green (or RGB), blue (of RGB), S-Video, and negatives or positives of any of these components. Further, these different types of components may be used with the described implementations. For example, a YUV set of components may be used with one or more described implementations, and in a typical implementation YUV are combined at the macroblock level. Additionally, other picture types may be used with the implementations and features described herein. Such other picture types may include, for example, pictures that include information other than 2D video, depth, occlusion or background, transparency or edge discontinuities.

Additionally, this application or its claims may refer to "determining" various pieces of information. Determining the information may include one or more of, for example, estimating the information, calculating the information, predicting the information, identifying the information from a list or other set of data, or retrieving the information from memory.

Similarly, "accessing" is intended to be a broad term. Accessing a piece of information may include any operation that, for example, uses, stores, sends, transmits, receives, retrieves, modifies, parses, or provides the information.

Many implementations refer to a "reference". A "reference" may be, for example, the traditional reference in which a pixel-based differential from a reference is used in predicting a source. A reference may also, or alternatively, be used in different ways to predict a source. For example, in one implementation edge location or a measure of edge discontinuity, is used in predicting the source. In general, any information may be borrowed from the reference to aid in predicting the source. The examples of information such as pixel values, edge locations, and a measure of edge discontinuities have been given, but other types of information are possible as well.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding and decoding. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

It should be appreciated that in the above description of implementations various features are sometimes grouped together in a single implementation, figure, or description for the purpose of streamlining the disclosure and aiding in the understanding of one or more of the various aspects. This method of disclosure, however, is not to be interpreted as reflecting an intention that a claimed invention requires more features than are expressly recited in each claim. Rather, as the following claims reflect, inventive aspects may lie in less than all features of a single foregoing disclosed embodiment. Thus, it is understood that each of the claims also provides a separate implementation.

A number of implementations have been described. Nevertheless, it will be further understood that various modifications may be made. For example, elements of different implementations may be combined, supplemented, modified, or removed to produce other implementations. Further, operations may be interchanged among functional blocks. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the following claims.

The invention claimed is:

1. A method comprising:
    generating syntax elements indicating an inter-layer dependency structure among three dimensional video (3DV) layers, the syntax elements relating to a syntax structure defining inter-layer dependencies among 3DV layers wherein the inter-layer dependency structure specifies at least one of:
    b) that an inter-layer prediction reference for an occlusion video layer is the 2D video layer;
    c) that an inter-layer prediction reference for an occlusion depth layer is the depth layer; and
    d) that an inter-layer prediction reference for a transparency layer is the 2D video layer;
    identifying, based on the inter-layer dependency structure, an inter-layer prediction reference for a picture from a layer of the 3DV layers; and
    encoding the picture based, at least in part, on the inter-layer prediction reference.

2. The method of claim 1, further comprising:
    generating a bitstream that includes the encoded picture; and
    providing the encoded picture and the syntax elements for use in decoding the encoded picture.

3. The method of claim 2, wherein the syntax elements are separate from the bitstream.

4. The method of claim 2, wherein the syntax elements are included within the bitstream.

5. The method of claim 2, wherein the syntax elements are included within at least one of network abstraction layer (NAL) unit header, a sequence parameter set (SPS), a picture parameter set (PPS), supplemental enhancement information (SEI) or a slice header.

6. The method of claim 2, wherein the syntax elements explicitly convey the inter-layer dependency structure.

7. The method of claim 6, wherein the syntax elements provide 3DV layer identifiers for each given 3DV layer and wherein the 3DV layer identifiers indicate the inter-layer prediction references for a corresponding given 3DV layer.

8. The method of claim 1, wherein the inter-layer dependency structure is predefined and wherein the syntax elements indicate the inter-layer dependency structure by conveying whether particular 3DV layers are present for each 3DV view.

9. The method of claim wherein the inter-layer dependency structure specifies at least one of:
    b) that inter-layer prediction references for an occlusion video layer are the 2D video layer and the depth layer;
    c) that inter-layer prediction references for an occlusion depth layer are the 2D video layer and the depth layer; and
    d) that inter-layer prediction references for a transparency layer are the 2D video layer and the depth layer.

10. The method of claim 1, wherein the generating of the syntax elements, the identifying of the inter-layer prediction reference, and the encoding of the picture are performed at one or more encoders.

11. A non-transitory processor readable medium having stored thereon instmctions for causing a processor to perform at least the following:
    generating syntax elements indicating an inter-layer dependency structure among three dimensional video (3DV) layers, the syntax elements relating to a syntax structure defining inter-layer dependencies among 3DV layers wherein the inter-layer dependency structure specifies at least one of:
    b) that an inter-layer prediction reference for anocclusion-video layer is the 2D video layer;
    c) that an inter-layer prediction reference for an occlusion depth layer is the depth layer; and
    d) that an inter-layer prediction reference for a transparency layer is the 2D video layer;
    identifying, based on the inter-layer dependency structure, an inter-layer prediction reference for a picture from a layer of the 3DV layers; and encoding the picture based, at least in part, on the inter-layer prediction reference.

12. An apparatus, comprising a processor configured to perform at least the following:
    generating syntax elements indicating an inter-layer dependency structure among three dimensional video (3DV) layers, the syntax elements relating to a syntax structure defining inter-layer dependencies among 3DV layers wherein the inter-layer dependency structure specifies at least one of:
    b) that an inter-layer prediction reference thr an occlusion video layer is the 2D video layer;
    c) that an inter-layer prediction reference for an occlusion depth layer is the depth layer; and d) that an inter-layer prediction reference for a transparency layer is the 2D video layer;
identifying, based on the inter-layer dependency structure, an inter-layer prediction reference for a picture from a layer of the 3DV layers; and
encoding the picture based, at least in part, on the inter-layer prediction reference.

13. An apparatus comprising:
a three-dimensional video (3DV) reference buffer configured to generate syntax elements indicating an inter-layer dependency structure among 3DV layers, the syntax elements relating to a syntax structure defining inter-layer dependencies among 3DV layers, and configured to identify, based on the inter-layer dependency structure, an, inter-layer prediction reference for a picture from a layer of the 3DV layers wherein the inter-layer dependency structure specifies at least one of:
b) that an inter-layer prediction reference for an occlusion video layer is the 2D video layer;
c) that an inter-layer prediction reference for an occlusion depth layer is the depth layer; and
d) that an inter-layer prediction reference for a transparency layer is the 2D video layer; and
a 3DV layer encoder configured to encode the picture based, at least in part, on the inter-layer prediction reference.

14. The apparatus of claim 13 wherein the 3DV layer encoder is further configured to generate a bitstream that includes the encoded picture, and to provide the encoded picture and the syntax elements for use in decoding the encoded picture.

15. An apparatus comprising:
a three-dimensional video (3DV) reference buffer configured to generate syntax elements indicating an inter-layer dependency structure among 3DV layers, the syntax elements relating to a syntax structure defining inter-layer dependencies among 3DV layers, and configured, to identify, based on the inter-layer dependency structure, an inter-layer prediction reference for a picture from a layer of the 3DV layers wherein the inter-layer dependency structure specifies at least one of:
b) that an inter-layer prediction reference for an occlusion video layer is the 2D video layer;
c) that an it ier-layer prediction reference for an occlusion depth layer is the depth layer, and d) that an inter-layer prediction reference for a transparency layer is the 2D video layer;
a 3DV layer encoder configured to encode the picture based, at least in part, on the inter-layer prediction reference; and
a modulator configured to modulate a signal including the encoded picture.

16. A non-transitory processor readable medium having stored thereon a video signal structure, comprising:
one or more syntax portions for syntax elements indicating an inter-layer dependency structure among three-dimensional video (3DV) layers, the syntax elements relating to a syntax structure defining inter-layer dependencies among 3DV layers wherein the inter-layer dependency structure specifies at least one of:
b) that, an inter-layer prediction reference thr an occlusion video layer is the 2D video layer;
c) that an inter-layer prediction reference for an occlusion depth layer is the depth layer; and
d) that an inter-layer prediction reference for a transparency layer is the 2D video layer; and
one or more picture portions for an encoded picture that is encoded based, at least in part, on based on an inter-layer prediction reference from the inter-layer dependency structure, wherein the encoded picture and the syntax elements are provided for use in decoding the encoded picture.

17. A method comprising:
accessing an encoded picture from a bitstream, the picture describing three dimensional video (3DV) information for a particular 3DV layer, from a given view, at a given time; accessing syntax elements indicating an inter-layer dependency structure for a set of 3DV layers that includes the particular 3DV layer, the syntax elements relating to a syntax structure defining inter-layer dependencies among 3DV layers wherein the inter-layer dependency structure specifies at least one of:
b) that an inter-layer prediction reference for an occlusion video layer is the 2D video layer;
c) that an inter-layer prediction reference for an occlusion depth layer is the depth layer; and
d) that an inter-layer prediction reference for a transparency layer is the 2D video layer; and
decoding the encoded picture based, at least in part, on the inter-layer dependency structure.

18. The method of claim 17, further comprising providing the decoded pictures in an output format that indicates the inter-layer dependency structure.

19. The method of claim 18, wherein the output format includes the syntax elements.

20. The method of claim 17, wherein the decoding further comprises constructing a reference picture list for the picture based on the syntax elements.

21. The method of claim 17, wherein the accessing of the encoded picture, the accessing of the syntax elements, and the decoding of the encoded picture are performed at one or more of an encoder or a decoder.

22. A non-transitory processor readable medium having stored thereon instructions for causing a processor to perform at least the following:
accessing an encoded picture from a bitstream, the picture describing three dimensional video (3DV) information for a particular 3DV layer, from a given view, at a given time;
accessing syntax elements indicating an inter-layer dependency structure for a set of 3DV layers that includes the particular 3DV layer, the syntax elements relating to a syntax structure defining inter-layer dependencies among 3DV layers wherein the inter-layer dependency structure specifies at least one of:
b) that an inter-layer prediction reference for an occlusion video layer is the 2D video layer;
c) that an inter-layer prediction reference for an occlusion depth layer is the depth layer, and
d) that an inter-layer prediction reference for a transparency layer is the 2D video layer; and
decoding the encoded picture based, at least in part, on the inter-layer dependency structure.

23. An apparatus, comprising a processor configured to perform at least the following:
accessing an encoded picture from a bitstream, the picture describing three dimensional video (3DV) information for a particular 3DV layer, from a given view, at a given time;
accessing syntax elements indicating an inter-layer dependency structure for a set of 3DV layers that includes the paniculat 3DV layer, the syntax elements relating to a syntax structure defining inter-layer dependencies among 3DV layers wherein the inter-layer dependency structure specifies at least one of:
b) that an inter-layer prediction reference for an occlusion video layer is the 2D video layer;
c) that an inter-layer prediction reference for an occlusion depth layer is the depth layer; and
d) that an inter-layer prediction reference for a transparency layer is the 2D video layer; and
decoding the encoded picture based, at least in part, on the inter-layer dependency structure.

24. An apparatus comprising:
a three-dimensional video (3DV) layer decoder configured to access an encoded picture from a bitstream, the picture describing three-dimensional video (3DV) information for a particular 3DV layer, from a given view, at a given time; and
a 3DV reference buffer configured to access syntax elements indicating an inter-layer dependency structure for a set of 3DV layers that includes the particular 3DV layer, the syntax elements relating to a syntax structure defining inter-layer dependencies among 3DV layers, wherein the 3DV layer decoder is further configured to decode the encoded picture based, at least in part, on the inter-layer dependency structure wherein the inter-layer dependency structure specifies at least one of:
b) that an inter-layer prediction reference torr an occlusion video layer is the 2D video layer;
c) that an inter-layer prediction reference for an occlusion depth layer is the depth layer; and
d) that an inter-layer prediction reference for a transparency layer is the 2D video layer.

25. An, apparatus comprising:
a demodulator configured to demodulate a signal to produce a demodulated bitstream;
a three-dimensional video (3DV) layer decoder configured to access an encoded picture from the demodulated bitstream, the picture describing three dimensional video (3DV) information for a particular 3DV layer, from a given view, at a given time; and
a 3DV reference buffer configured to access syntax elements indicating an inter-layer dependency structure for a set of 3DV layers that includes the particular 3DV layer, the syntax elements relating to a syntax structure defining inter-layer dependencies among 3DV layers, wherein the 3DV layer decoder is further configured to decode the, encoded picture based, at least in part, on the inter-layer dependency structure wherein the inter-layer dependency structure specifies at least one of:
b) that an inter-layer prediction reference for an occlusion video layer is the 2D video layer;
c) that an inter-layer prediction reference for an occlusion depth layer is the depth layer, and d) that an inter-layer prediction reference for a transparency layer is the 2D video layer.

26. A method comprising:
accessing a transmission priority for a particular three-dimensional video (3DV) layer of multiple 3DV layers, the transmission priority being based on an inter-layer dependency structure among the multiple 3DV layers wherein the inter-layer dependency structure specifies at least one of:
b) that an inter-layer prediction reference torr ark occlusion video layer is the 2D video layer;
c) that an utter-layer prediction reference for an occlusion depth layer is the depth layer; and
d) that an inter-layer prediction reference for a transparency layer is the 2D video layer, and
determining whether to transmit encoded data belonging to the particular 3DV layer, the determining of whether to transmit being based on the transmission priority tbr the particular 3DV layer and based on an indication of network congestion.

27. The method of claim 26, further comprising: accessing syntax elements indicating the inter-layer dependency structure among the multiple 3DV layers, the syntax elements relating to a syntax structure defining inter-layer dependencies among 3DV layers; and determining the transmission priority for the particular 3DV layer of the 3DV layers based on the structure.

* * * * *